(12) United States Patent
Abdelghaffar et al.

(10) Patent No.: US 11,770,234 B2
(45) Date of Patent: Sep. 26, 2023

(54) RESOURCE FORMAT INDICATORS IN BANDWIDTH PART MANAGEMENT FOR FULL-DUPLEX RESOURCE ALLOCATION

(71) Applicant: QUALCOMM Incorporated, San Diego, CA (US)

(72) Inventors: Muhammad Sayed Khairy Abdelghaffar, San Jose, CA (US); Ahmed Attia Abotabl, San Diego, CA (US); Yuchul Kim, San Diego, CA (US); Wanshi Chen, San Diego, CA (US); Huilin Xu, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/343,665

(22) Filed: Jun. 9, 2021

(65) Prior Publication Data

US 2022/0014345 A1 Jan. 13, 2022

Related U.S. Application Data

(60) Provisional application No. 63/049,099, filed on Jul. 7, 2020, provisional application No. 63/049,018, filed on Jul. 7, 2020.

(51) Int. Cl.
*H04W 72/04* (2023.01)
*H04L 5/14* (2006.01)
(Continued)

(52) U.S. Cl.
CPC .............. *H04L 5/14* (2013.01); *H04L 1/1614* (2013.01); *H04W 72/0446* (2013.01); *H04W 72/0453* (2013.01); *H04W 72/23* (2023.01)

(58) Field of Classification Search
CPC ..... H04L 1/1614; H04L 5/001; H04L 5/0053; H04L 5/14; H04W 72/0446; H04W 72/0453; H04W 72/23
(Continued)

(56) References Cited

U.S. PATENT DOCUMENTS

2019/0052432 A1\* 2/2019 Islam .................... H04L 5/0094
2020/0107336 A1\* 4/2020 Yang .................... H04L 1/0075
(Continued)

FOREIGN PATENT DOCUMENTS

| EP | 3668211 A1 | 6/2020 |
| EP | 3737056 A1 | 11/2020 |
| WO | WO-2019135286 A1 | 7/2019 |

OTHER PUBLICATIONS

3GPP TSG RAN WG1 #101 Jun. 5, 2020 SFI (slot format indicators).*
(Continued)

*Primary Examiner* — Robert J Lopata
(74) *Attorney, Agent, or Firm* — Holland & Hart LLP

(57) ABSTRACT

Methods, systems, and devices for wireless communications are described. In some systems, a user equipment (UE) may communicate with a base station using an operating bandwidth part (BWP) that includes a first set of frequency resources. The UE may receive a group-common downlink control information (GC-DCI) message from the base station that includes a resource format indicator (RFI) for the UE (e.g., among multiple RFIs for a set of UEs in the GC-DCI) indicating a second set of frequency resources. The UE may modify the operating BWP based on the second (Continued)

set of frequency resources and communicate with the base station using the modified operating BWP. In some examples, the UE may switch the operating BWP to the second set of frequency resources or may reduce the operating BWP to a set of overlapping frequency resources between the first and second sets of frequency resources.

50 Claims, 25 Drawing Sheets

(51) Int. Cl.
*H04W 72/0446* (2023.01)
*H04L 1/1607* (2023.01)
*H04W 72/0453* (2023.01)
*H04W 72/23* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2020/0367253 | A1* | 11/2020 | Kim | H04W 72/23 |
| 2021/0058964 | A1* | 2/2021 | Hooli | H04W 74/008 |
| 2021/0068084 | A1* | 3/2021 | Zhao | H04W 72/0453 |
| 2021/0075579 | A1* | 3/2021 | Liu | H04L 5/0055 |
| 2021/0136734 | A1* | 5/2021 | Nam | H04L 5/0053 |
| 2021/0336759 | A1* | 10/2021 | Abdelghaffar | H04L 5/16 |
| 2021/0400673 | A1* | 12/2021 | Abotabl | H04W 72/23 |
| 2022/0159574 | A1* | 5/2022 | Islam | H04W 52/0216 |
| 2022/0174697 | A1* | 6/2022 | Jung | H04L 1/0003 |
| 2022/0369225 | A1* | 11/2022 | Iyer | H04L 5/0053 |
| 2022/0394743 | A1* | 12/2022 | Park | H04L 1/0067 |

OTHER PUBLICATIONS

Mediatek Inc: "Remaining Issues in GC-PDCCH", 3GPP TSG RAN WG1 Meeting #93, 3GPP Draft, R1-1806780 Remaining Issues in GC-PDCCH_Final, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, pp. 1-3, May 12, 2018 (May 12, 2018), XP051462751, Retrieved from the Internet: URL: http://www.3gpp.org/ftp/tsg%5Fran/WG1%5FRL1/TSGR1%5F93/ Docs [retrieved on May 12, 2018] Section 2, p. 1.

Mediatek Inc: "Wideband Operation for NR-U", 3GPP TSG RAN WG1 #98, 3GPP Draft, R1-1908389_Wideband Operation for NR-U_ MTK_Final, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 26, 2019-Aug. 30, 2019, 6 Pages, Aug. 17, 2019 (Aug. 17, 2019), XP051764998, Retrieved from the Internet: URL: http://www.3gpp. org/ftp/tsg_ran/WG1_RL1/TSGR1_98/Docs/R1-1908389.zip [retrieved on Aug. 17, 2019] Proposal 4, p. second.

Partial International Search Report—PCT/US2021/036775—ISA/ EPO—dated Oct. 29, 2021 (205663WO).

Qualcomm Incorporated: "Summary of GC-PDCCH Carrying SFI", 3GPP TSG RAN WG1 #94bis, 3GPP Draft, R1-1811837_Summary of GC-PDCCH Carrying SFI_V0, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, 3 Pages, Oct. 9, 2018 (Oct. 9, 2018), XP051519163, Retrieved from the Internet: URL: http://www.3gpp.org/ftp/tsg%5Fran/WG1%5FRL1/TSGR1%5F94b/ Docs/R1%2D1811837%2Ezip [retrieved on Oct. 9, 2018] p. third, paragraph first.

International Search Report and Written Opinion—PCT/US2021/ 036775—ISA/EPO—dated Jan. 7, 2022 (205663WO).

* cited by examiner

RESOURCE FORMAT INDICATORS IN BANDWIDTH PART MANAGEMENT FOR FULL-DUPLEX RESOURCE ALLOCATION

CROSS REFERENCE

The present Application for Patent claims the benefit of U.S. Provisional Patent Application No. 63/049,099 by ABDELGHAFFAR et al., entitled "RESOURCE FORMAT INDICATORS FOR FULL-DUPLEX RESOURCE ALLOCATION," filed Jul. 7, 2020, assigned to the assignee hereof, and which is expressly incorporated by reference herein, and U.S. Provisional Patent Application No. 63/049,018 by ABDELGHAFFAR et al., entitled "BANDWIDTH PART MANAGEMENT BASED ON GROUP-COMMON DOWNLINK CONTROL INFORMATION (DCI) FREQUENCY INDICATION," filed Jul. 7, 2020, assigned to the assignee hereof, and which is expressly incorporated by reference herein.

FIELD OF TECHNOLOGY

The following relates to wireless communications, including resource format indicators (RFIs) in bandwidth part (BWP) management for full-duplex resource allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time-division multiple access (TDMA), frequency-division multiple access (FDMA), orthogonal FDMA (OFDMA), or discrete Fourier transform spread orthogonal frequency-division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive signaling to indicate whether resources for a time period are configured for uplink communications or downlink communications. For example, a slot format indicator (SFI) may indicate that a first slot is allocated for uplink transmissions from the UE to a base station, and a second slot is allocated for downlink transmissions from the base station to the UE. However, conventional signaling may be limited capability and flexibility for alternative resource format types.

For example, a UE may communicate with a base station using an active set of frequency resources, which may be referred to as a bandwidth part (BWP). The BWP may span a set of frequency resources in a specific carrier. In some examples, the UE may be configured with multiple BWPs (e.g., one or more uplink BWPs, one or more downlink BWPs, or a combination thereof), where an uplink BWP and a downlink BWP may be active for the UE at a given time. The UE may communicate data, control information, feedback information, or any combination thereof within the active BWPs. In some cases, a base station may allocate a set of frequency resources to the UE for communication. However, the allocated set of frequency resources may fail to correspond to an active BWP for the UE, which may result in inconsistent operation between the UE and the base station, potentially degrading system performance.

SUMMARY

The described techniques relate to improved methods, systems, devices, and apparatuses that support resource format indicators (RFIs) in bandwidth part (BWP) management for full-duplex resource allocation. Generally, the described techniques provide for signaling resource allocations for full-duplex slots. For example, a user equipment (UE) may receive a configuration for interpreting RFIs indicating resource formats (e.g., uplink format, downlink format, full-duplex format) for time periods (e.g., slots) of communication resources allocated to the UE. The UE may additionally receive a control message including an RFI for one or more time periods. Based on the configuration and the RFI, the UE may determine a resource format (e.g., uplink format, downlink format, and full-duplex format) for each time period, and may further determine a frequency resource allocation for each time period including symbols having a full-duplex format.

The described techniques may also provide for improving frequency resource allocation by dynamically updating an operating bandwidth part (BWP) based on frequency resources indicated in a group-common downlink control information (GC-DCI) message. One or more UEs may communicate with a base station as part of a wireless communications system. A UE of the one or more UEs may communicate according to an operating BWP (e.g., an active uplink BWP and an active downlink BWP) that includes a first set of frequency resources. The UEs may receive a GC-DCI message that includes an RFI indicating a second set of frequency resources for the UE for communications in one or more specified slots. However, the second set of frequency resources may not fully overlap with the first set of frequency resources of the operating BWP. The UE may modify the operating BWP based on the second set of frequency resources to determine modified frequency resources for communication.

In some examples, modifying the operating BWP may involve switching the operating BWP to the second set of frequency resources indicated by the RFI. In some other examples, modifying the operating BWP may involve reducing the operating BWP to a set of overlapping frequency resources based on an overlap between the first set of frequency resources and the second set of frequency resources (e.g., without performing a BWP switching operation). By modifying the operating BWP, the UE may support dynamic configuration by a base station for communicating in a slot allocated for downlink and uplink communications.

A method for wireless communication at a UE is described. The method may include communicating with a base station using an operating BWP including a first set of frequency resources in a carrier bandwidth, receiving a GC-DCI message including an RFI indicating a second set of frequency resources, modifying the operating BWP based on the second set of frequency resources, and communicating with the base station using the modified operating BWP.

An apparatus for wireless communication at a UE is described. The apparatus may include a processor, memory coupled with the processor, and instructions stored in the memory. The instructions may be executable by the processor to cause the apparatus to communicate with a base station using an operating BWP including a first set of frequency resources in a carrier bandwidth, receive a GC-DCI message including a RFI indicating a second set of frequency resources, modify the operating BWP based on the second set of frequency resources, and communicate with the base station using the modified operating BWP.

Another apparatus for wireless communication at a UE is described. The apparatus may include means for communicating with a base station using an operating BWP including a first set of frequency resources in a carrier bandwidth, means for receiving a GC-DCI message including a RFI indicating a second set of frequency resources, means for modifying the operating BWP based on the second set of frequency resources, and means for communicating with the base station using the modified operating BWP.

A non-transitory computer-readable medium storing code for wireless communication at a UE is described. The code may include instructions executable by a processor to communicate with a base station using an operating BWP including a first set of frequency resources in a carrier bandwidth, receive a GC-DCI message including a RFI indicating a second set of frequency resources, modify the operating BWP based on the second set of frequency resources, and communicate with the base station using the modified operating BWP.

In some examples of the method, apparatuses, and non-transitory computer-readable medium described herein, the modifying may include operations, features, means, or instructions for switching the operating BWP to the second set of frequency resources based on receiving the GC-DCI message.

In some examples of the method, apparatuses, and non-transitory computer-readable medium described herein, the switching may include operations, features, means, or instructions for switching from a first active uplink BWP to a second active uplink BWP and from a first active downlink BWP to a second active downlink BWP based on receiving the GC-DCI message.

In some examples of the method, apparatuses, and non-transitory computer-readable medium described herein, the modifying may include operations, features, means, or instructions for determining a set of overlapping frequency resources based on an overlap between the first set of frequency resources and the second set of frequency resources and reducing the operating BWP to the set of overlapping frequency resources based on receiving the GC-DCI message.

Some examples of the method, apparatuses, and non-transitory computer-readable medium described herein may further include operations, features, means, or instructions for storing a lookup table including a set of multiple frequency formats, where a frequency format of the set of multiple frequency formats corresponds to a set of frequency resources of a set of multiple sets of frequency resources and determining the second set of frequency resources based on a first frequency format of the set of multiple frequency formats indicated by the RFI.

Some examples of the method, apparatuses, and non-transitory computer-readable medium described herein may further include operations, features, means, or instructions for receiving, from the base station, a radio resource control (RRC) configuration message indicating the set of multiple frequency formats and configuring the lookup table based on the RRC configuration message.

In some examples of the method, apparatuses, and non-transitory computer-readable medium described herein, the lookup table includes, for a set of resources including a set of resource elements, a set of resource blocks, a set of resource block groups, or a combination thereof, a set of multiple bit maps corresponding to the set of multiple sets of frequency resources and a bit map of the set of multiple bit maps includes a set of indication bits for the set of resources, where a first bit value for an indication bit of the set of indication bits indicates an uplink resource configured for a corresponding resource and a second bit value for the indication bit of the set of indication bits indicates a downlink resource configured for the corresponding resource.

In some examples of the method, apparatuses, and non-transitory computer-readable medium described herein, the lookup table includes, for a set of resources including a set of resource elements, a set of resource blocks, a set of resource block groups, or a combination thereof, a set of multiple uplink bit maps and a set of multiple downlink bit maps corresponding to the set of multiple sets of frequency resources, an uplink bit map of the set of multiple uplink bit maps includes a set of uplink indication bits for the set of resources, where a first bit value for an uplink indication bit of the set of uplink indication bits indicates an uplink resource configured for a corresponding resource and a second bit value for the uplink indication bit of the set of uplink indication bits indicates an absence of an uplink resource configured for the corresponding resource, and a downlink bit map of the set of multiple downlink bit maps includes a set of downlink indication bits for the set of resources, where a first bit value for a downlink indication bit of the set of downlink indication bits indicates a downlink resource configured for the corresponding resource and a second bit value for the downlink indication bit of the set of downlink indication bits indicates an absence of a downlink resource configured for the corresponding resource.

In some examples of the method, apparatuses, and non-transitory computer-readable medium described herein, the lookup table includes one or more resource indicator values corresponding to a set of frequency resources of the set of multiple sets of frequency resources, and a resource indicator value of the one or more resource indicator values includes an indication of a starting resource and an indication of a number of resources corresponding to uplink resources or downlink resources.

In some examples of the method, apparatuses, and non-transitory computer-readable medium described herein, the lookup table includes an indication of a uplink starting resource, an indication of a number of uplink resources, and an indication of one or more non-uplink reserved resources and an indication of a downlink starting resource, an indication of a number of downlink resources, and an indication of one or more non-downlink reserved resources corresponding to a set of frequency resources of the set of multiple sets of frequency resources.

In some examples of the method, apparatuses, and non-transitory computer-readable medium described herein, the first frequency format of the set of multiple frequency formats includes a set of uplink resources, a set of downlink resources, and one or more guard bands, where the set of uplink resources may be distinct from the set of downlink resources in a frequency domain and the one or more guard bands separate the set of uplink resources from the set of downlink resources in the frequency domain and the first frequency format of the set of multiple frequency formats includes the set of uplink resources and the set of downlink resources, where the set of uplink resources at least partially overlaps with the set of downlink resources in the frequency domain.

In some examples of the method, apparatuses, and non-transitory computer-readable medium described herein, the RFI indicates a slot frequency format identifier corresponding to the second set of frequency resources.

In some examples of the method, apparatuses, and non-transitory computer-readable medium described herein, the RFI indicates a BWP identifier corresponding to the second set of frequency resources.

In some examples of the method, apparatuses, and non-transitory computer-readable medium described herein, the RFI further indicates a resource bandwidth, and the BWP identifier indicates a superset of frequency resources and the resource bandwidth indicates a set of usable resources of the superset of frequency resources, the second set of frequency resources including the set of usable resources of the superset of frequency resources.

In some examples of the method, apparatuses, and non-transitory computer-readable medium described herein, the GC-DCI message includes a set of multiple RFIs and the method, apparatuses, and non-transitory computer-readable medium may include further operations, features, means, or instructions for receiving, from the base station, an RRC configuration message indicating a position index for the UE and identifying the RFI corresponding to the UE from the set of multiple RFIs corresponding to a set of multiple UEs based on the position index for the UE.

In some examples of the method, apparatuses, and non-transitory computer-readable medium described herein, the communicating may include operations, features, means, or instructions for communicating with the base station in accordance with a full-duplex mode.

Some examples of the method, apparatuses, and non-transitory computer-readable medium described herein may further include operations, features, means, or instructions for identifying a slot configured with concurrent uplink resources and downlink resources based on the RFI and determining a same subcarrier spacing (SCS) corresponding to the uplink resources and the downlink resources in the slot based on the full-duplex mode.

In some examples of the method, apparatuses, and non-transitory computer-readable medium described herein, the communicating may include operations, features, means, or instructions for communicating with the base station in accordance with a half-duplex mode.

Some examples of the method, apparatuses, and non-transitory computer-readable medium described herein may further include operations, features, means, or instructions for identifying a slot configured with concurrent uplink resources and downlink resources based on the RFI and in accordance with a full-duplex-aware mode and determining a first SCS corresponding to the uplink resources in the slot and a second SCS corresponding to the downlink resources in the slot based on the half-duplex mode.

In some examples of the method, apparatuses, and non-transitory computer-readable medium described herein, the operating BWP includes an active uplink BWP and an active downlink BWP.

A method for wireless communication at a base station is described. The method may include communicating with a UE using an operating BWP for the UE including a first set of frequency resources in a carrier bandwidth, transmitting a GC-DCI message including a RFI indicating a second set of frequency resources for the UE, modifying the operating BWP for the UE based on the second set of frequency resources, and communicating with the UE using the modified operating BWP.

An apparatus for wireless communication at a base station is described. The apparatus may include a processor, memory coupled with the processor, and instructions stored in the memory. The instructions may be executable by the processor to cause the apparatus to communicate with a UE using an operating BWP for the UE including a first set of frequency resources in a carrier bandwidth, transmit a GC-DCI message including a RFI indicating a second set of frequency resources for the UE, modify the operating BWP for the UE based on the second set of frequency resources, and communicate with the UE using the modified operating BWP.

Another apparatus for wireless communication at a base station is described. The apparatus may include means for communicating with a UE using an operating BWP for the UE including a first set of frequency resources in a carrier bandwidth, means for transmitting a GC-DCI message including a RFI indicating a second set of frequency resources for the UE, means for modifying the operating BWP for the UE based on the second set of frequency resources, and means for communicating with the UE using the modified operating BWP.

A non-transitory computer-readable medium storing code for wireless communication at a base station is described. The code may include instructions executable by a processor to communicate with a UE using an operating BWP for the UE including a first set of frequency resources in a carrier bandwidth, transmit a GC-DCI message including a RFI indicating a second set of frequency resources for the UE, modify the operating BWP for the UE based on the second set of frequency resources, and communicate with the UE using the modified operating BWP.

In some examples of the method, apparatuses, and non-transitory computer-readable medium described herein, the modifying may include operations, features, means, or instructions for switching the operating BWP for the UE to the second set of frequency resources based on the GC-DCI message.

In some examples of the method, apparatuses, and non-transitory computer-readable medium described herein, the switching may include operations, features, means, or instructions for switching from a first active uplink BWP for the UE to a second active uplink BWP for the UE and from a first active downlink BWP for the UE to a second active downlink BWP for the UE based on the GC-DCI message.

In some examples of the method, apparatuses, and non-transitory computer-readable medium described herein, the modifying may include operations, features, means, or instructions for determining a set of overlapping frequency resources based on an overlap between the first set of frequency resources and the second set of frequency resources and reducing the operating BWP for the UE to the set of overlapping frequency resources based on the GC-DCI message.

Some examples of the method, apparatuses, and non-transitory computer-readable medium described herein may further include operations, features, means, or instructions for selecting the second set of frequency resources for the UE based on the first set of frequency resources.

Some examples of the method, apparatuses, and non-transitory computer-readable medium described herein may further include operations, features, means, or instructions for transmitting, to the UE, an RRC configuration message indicating a set of multiple slot frequency formats, a set of multiple BWP formats, or a combination thereof, where the RFI includes a slot frequency format identifier indicating a slot frequency format of the set of multiple slot frequency formats, a BWP identifier indicating a BWP format of the set of multiple BWP formats, or a combination thereof corresponding to the second set of frequency resources.

Some examples of the method, apparatuses, and non-transitory computer-readable medium described herein may further include operations, features, means, or instructions for transmitting, to the UE, an RRC configuration message indicating a position index for the UE, where the RFI corresponds to the UE based on the position index for the UE.

In some examples of the method, apparatuses, and non-transitory computer-readable medium described herein, the GC-DCI message includes an additional RFI and the method, apparatuses, and non-transitory computer-readable medium may include further operations, features, means, or instructions for transmitting, to an additional UE, an additional RRC configuration message indicating an additional position index for the additional UE, where the additional RFI corresponds to the additional UE based on the additional position index for the additional UE and communicating with the additional UE based on the additional RFI.

In some examples of the method, apparatuses, and non-transitory computer-readable medium described herein, the additional RFI indicates one or more slot formats and the additional RFI does not indicate frequency resources based on the one or more slot formats not including concurrent uplink resources and downlink resources.

In some examples of the method, apparatuses, and non-transitory computer-readable medium described herein, the additional RFI does not indicate frequency resources based on the additional UE operating according to a half-duplex mode.

Some examples of the method, apparatuses, and non-transitory computer-readable medium described herein may further include operations, features, means, or instructions for generating the RFI to indicate one or more slots including concurrent uplink resources and downlink resources for at least a portion of the one or more slots and to indicate the second set of frequency resources based on the one or more slots including the concurrent uplink resources and downlink resources.

A method for wireless communication at a UE is described. The method may include identifying a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format, receiving a control message including a RFI for the one or more time periods, where at least one time period of the one or more time periods includes a set of symbols having a full-duplex format, determining a frequency resource allocation for uplink communications and downlink communications for the set of symbols having the full-duplex format based on the RFI and the configuration, and communicating with a base station based on the determined frequency resource allocation.

An apparatus for wireless communication at a UE is described. The apparatus may include a processor, memory coupled with the processor, and instructions stored in the memory. The instructions may be executable by the processor to cause the apparatus to identify a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format, receive a control message including a RFI for the one or more time periods, where at least one time period of the one or more time periods includes a set of symbols having a full-duplex format, determine a frequency resource allocation for uplink communications and downlink communications for the set of symbols having the full-duplex format based on the RFI and the configuration, and communicate with a base station based on the determined frequency resource allocation.

Another apparatus for wireless communication at a UE is described. The apparatus may include means for identifying a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format, means for receiving a control message including a RFI for the one or more time periods, where at least one time period of the one or more time periods includes a set of symbols having a full-duplex format, means for determining a frequency resource allocation for uplink communications and downlink communications for the set of symbols having the full-duplex format based on the RFI and the configuration, and means for communicating with a base station based on the determined frequency resource allocation.

A non-transitory computer-readable medium storing code for wireless communication at a UE is described. The code may include instructions executable by a processor to identify a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format, receive a control message including a RFI for the one or more time periods, where at least one time period of the one or more time periods includes a set of symbols having a full-duplex format, determine a frequency resource allocation for uplink communications and downlink communications for the set of symbols having the full-duplex format based on the RFI and the configuration, and communicate with a base station based on the determined frequency resource allocation.

Some examples of the method, apparatuses, and non-transitory computer-readable medium described herein may further include operations, features, means, or instructions for determining a resource format for each time period of the one or more time periods based on a first portion of the RFI and identifying an indication of the frequency resource allocation in a second portion of the RFI different from the first portion.

Some examples of the method, apparatuses, and non-transitory computer-readable medium described herein may further include operations, features, means, or instructions for identifying, within the control message, an index associated with the UE indicating a position of the RFI within the control message, monitoring the first portion of the RFI based on the index, and monitoring the second portion of the RFI based on the at least one time period of the one or more time periods including the set of symbols having a full-duplex format.

Some examples of the method, apparatuses, and non-transitory computer-readable medium described herein may further include operations, features, means, or instructions for identifying an indication of the frequency resource allocation in a portion of the control message reserved for indications of frequency resource allocations for a set of multiple RFIs of the control message.

Some examples of the method, apparatuses, and non-transitory computer-readable medium described herein may further include operations, features, means, or instructions for identifying, within the control message, a first index indicating for the UE to monitor a first portion of the control message and identifying, within the control message, a second index indicating for the UE to monitor a second portion of the control message different from the first portion, the second portion including the portion of the control message reserved for indications of frequency resource allocations for the set of multiple RFIs of the control message.

Some examples of the method, apparatuses, and non-transitory computer-readable medium described herein may further include operations, features, means, or instructions for determining a resource format for each time period of the one or more time periods based on a first portion of the RFI, identifying a first time period of the one or more time periods including a first set of symbols having the full-duplex format and a second time period of the one or more time periods including a second set of symbols having a full-duplex format, monitoring a second portion of the RFI based on identifying the first time period including the first set of symbols having the full-duplex format, and monitoring a third portion of the RFI based on identifying the second time period including the second set of symbols having the full-duplex format.

Some examples of the method, apparatuses, and non-transitory computer-readable medium described herein may further include operations, features, means, or instructions for determining a first frequency resource allocation associated with the first set of symbols having the full-duplex format based on monitoring the second portion of the RFI and determining a second frequency resource allocation associated with the second set of symbols having the full-duplex format based on monitoring the third portion of the RFI.

Some examples of the method, apparatuses, and non-transitory computer-readable medium described herein may further include operations, features, means, or instructions for determining a resource format for each time period of the one or more time periods based on the RFI, identifying a first time period of the one or more time periods including a first set of symbols having a full-duplex format and a second time period of the one or more time periods including a second set of symbols having the full-duplex format, and monitoring a portion of the control message reserved for indications of frequency resource allocations for a set of multiple RFIs of the control message based on identifying the first time period including the first set of symbols having the full-duplex format, the second time period including the second set of symbols having the full-duplex format, or both.

Some examples of the method, apparatuses, and non-transitory computer-readable medium described herein may further include operations, features, means, or instructions for determining a first frequency resource allocation associated with the first set of symbols having the full-duplex format based on monitoring the portion of the control message reserved for indications of frequency resource allocations for the set of multiple RFIs of the control message and determining a second frequency resource allocation associated with the second set of symbols having the full-duplex format based on monitoring the portion of the control message reserved for indications of frequency resource allocations for the set of multiple RFIs of the control message.

Some examples of the method, apparatuses, and non-transitory computer-readable medium described herein may further include operations, features, means, or instructions for identifying, from the configuration for interpreting RFIs associated with the UE, a first configuration associated with RFIs indicating a single time period including a set of symbols having a full-duplex format and identifying, from the configuration for interpreting RFIs associated with the UE, a second configuration associated with RFIs indicating two or more time periods including sets of symbols having the full-duplex format.

In some examples of the method, apparatuses, and non-transitory computer-readable medium described herein, the configuration for interpreting RFIs includes a combined configuration including a time resource allocation scheme and a frequency resource allocation scheme and the method, apparatuses, and non-transitory computer-readable medium may include further operations, features, means, or instructions for determining a resource format for each time period of the one or more time periods based on the RFI and the time resource allocation scheme and identifying an indication of the frequency resource allocation for the set of symbols having the full-duplex format based on the RFI and the frequency resource allocation scheme.

Some examples of the method, apparatuses, and non-transitory computer-readable medium described herein may further include operations, features, means, or instructions for identifying, within the control message, an index for each of a set of multiple component carriers associated with the UE, each index indicating a position of the RFI within the control message for each of the set of multiple component carriers.

Some examples of the method, apparatuses, and non-transitory computer-readable medium described herein may further include operations, features, means, or instructions for identifying, within the control message, an index for a first component carrier of a set of multiple component carriers associated with the UE, the index for the first component carrier indicating a position of the RFI within the control message for each of the set of multiple component carriers.

In some examples of the method, apparatuses, and non-transitory computer-readable medium described herein, the configuration for interpreting RFIs associated with the UE may be based on a capability of the UE to recognize the full-duplex format.

Some examples of the method, apparatuses, and non-transitory computer-readable medium described herein may further include operations, features, means, or instructions for identifying, within the control message, an index associated with the UE indicating a position of the RFI within the control message, where the RFI associated with the index may be based on the configuration for interpreting RFIs and the capability of the UE to recognize the full-duplex format.

Some examples of the method, apparatuses, and non-transitory computer-readable medium described herein may further include operations, features, means, or instructions for identifying, within the control message, an index associated with the UE indicating a position of the RFI within the control message, where identifying the index may be based on the configuration for interpreting RFIs and the capability of the UE to recognize the full-duplex format.

Some examples of the method, apparatuses, and non-transitory computer-readable medium described herein may further include operations, features, means, or instructions for receiving the control message may be based on a capability of the UE to recognize the full-duplex format.

Some examples of the method, apparatuses, and non-transitory computer-readable medium described herein may further include operations, features, means, or instructions for receiving, from the base station, an RRC message including an indication of the configuration for interpreting RFIs, where identifying the configuration may be based on receiving the RRC message.

In some examples of the method, apparatuses, and non-transitory computer-readable medium described herein, the frequency resource allocation may be associated with each symbol of the set of symbols having the full-duplex format.

In some examples of the method, apparatuses, and non-transitory computer-readable medium described herein, the control message includes GC-DCI.

In some examples of the method, apparatuses, and non-transitory computer-readable medium described herein, the frequency resource allocation for uplink communications and downlink communications for the set of symbols having the full-duplex format includes a guard band between frequency resources for uplink communications and frequency resources for downlink communications.

In some examples of the method, apparatuses, and non-transitory computer-readable medium described herein, the frequency resource allocation for uplink communications and downlink communications for the set of symbols having the full-duplex format includes an overlap between frequency resources for uplink communications and frequency resources for downlink communications.

A method for wireless communication at a base station is described. The method may include identifying a configuration for interpreting RFIs associated with a UE, the RFIs indicating one or more resource formats associated with one or more time periods of communication resources allocated to the UE, the one or more resource formats including at least one of an uplink format, a downlink format, or a full-duplex format, determining a RFI for the one or more time periods based on the configuration, where at least one time period of the one or more time periods includes a set of symbols having a full-duplex format, determining a frequency resource allocation for uplink communications and downlink communications for the set of symbols having the full-duplex format based on the RFI and the configuration, transmitting, to the UE, a control message including an indication of the RFI for the one or more time periods, and communicating with the UE based on the determined frequency resource allocation.

An apparatus for wireless communication at a base station is described. The apparatus may include a processor, memory coupled with the processor, and instructions stored in the memory. The instructions may be executable by the processor to cause the apparatus to identify a configuration for interpreting RFIs associated with a UE, the RFIs indicating one or more resource formats associated with one or more time periods of communication resources allocated to the UE, the one or more resource formats including at least one of an uplink format, a downlink format, or a full-duplex format, determine a RFI for the one or more time periods based on the configuration, where at least one time period of the one or more time periods includes a set of symbols having a full-duplex format, determine a frequency resource allocation for uplink communications and downlink communications for the set of symbols having the full-duplex format based on the RFI and the configuration, transmit, to the UE, a control message including an indication of the RFI for the one or more time periods, and communicate with the UE based on the determined frequency resource allocation.

Another apparatus for wireless communication at a base station is described. The apparatus may include means for identifying a configuration for interpreting RFIs associated with a UE, the RFIs indicating one or more resource formats associated with one or more time periods of communication resources allocated to the UE, the one or more resource formats including at least one of an uplink format, a downlink format, or a full-duplex format, means for determining a RFI for the one or more time periods based on the configuration, where at least one time period of the one or more time periods includes a set of symbols having a full-duplex format, means for determining a frequency resource allocation for uplink communications and downlink communications for the set of symbols having the full-duplex format based on the RFI and the configuration, means for transmitting, to the UE, a control message including an indication of the RFI for the one or more time periods, and means for communicating with the UE based on the determined frequency resource allocation.

A non-transitory computer-readable medium storing code for wireless communication at a base station is described. The code may include instructions executable by a processor to identify a configuration for interpreting RFIs associated with a UE, the RFIs indicating one or more resource formats associated with one or more time periods of communication resources allocated to the UE, the one or more resource formats including at least one of an uplink format, a downlink format, or a full-duplex format, determine a RFI for the one or more time periods based on the configuration, where at least one time period of the one or more time periods includes a set of symbols having a full-duplex format, determine a frequency resource allocation for uplink communications and downlink communications for the set of symbols having the full-duplex format based on the RFI and the configuration, transmit, to the UE, a control message including an indication of the RFI for the one or more time periods, and communicate with the UE based on the determined frequency resource allocation.

Some examples of the method, apparatuses, and non-transitory computer-readable medium described herein may further include operations, features, means, or instructions for indicating a resource format for each time period of the one or more time periods based on a first portion of the RFI and indicating the frequency resource allocation in a second portion of the RFI different from the first portion.

Some examples of the method, apparatuses, and non-transitory computer-readable medium described herein may further include operations, features, means, or instructions for indicating the frequency resource allocation in a portion of the control message reserved for indications of frequency resource allocations for a set of multiple RFIs of the control message.

Some examples of the method, apparatuses, and non-transitory computer-readable medium described herein may further include operations, features, means, or instructions for indicating, within the control message, a first index indicating for the UE to monitor a first portion of the control message and indicating, within the control message, a second index indicating for the UE to monitor a second portion of the control message different from the first portion, the second portion including the portion of the control message reserved for indications of frequency resource allocations for the set of multiple RFIs of the control message.

Some examples of the method, apparatuses, and non-transitory computer-readable medium described herein may further include operations, features, means, or instructions for determining a resource format for each time period of the one or more time periods based on a first portion of the RFI, identifying a first time period of the one or more time periods including a first set of symbols having the full-duplex format and a second time period of the one or more time periods including a second set of symbols having the full-duplex format, indicating a first frequency resource allocation associated with the first set of symbols having the full-duplex format in a second portion of the RFI, and indicating a second frequency resource allocation associated with the second set of symbols having the full-duplex format in a third portion of the RFI.

Some examples of the method, apparatuses, and non-transitory computer-readable medium described herein may further include operations, features, means, or instructions for determining a resource format for each time period of the one or more time periods based on a first portion of the RFI, identifying a first time period of the one or more time periods including a first set of symbols having the full-duplex format and a second time period of the one or more time periods including a second set of symbols having the full-duplex format, and indicating a first frequency resource allocation associated with the first set of symbols having the full-duplex format, a second frequency resource allocation associated with the second set of symbols having the full-duplex format, or both, in a portion of the control message reserved for indications of frequency resource allocations for a set of multiple RFIs of the control message.

Some examples of the method, apparatuses, and non-transitory computer-readable medium described herein may further include operations, features, means, or instructions for indicating, to the UE via the configuration for interpreting RFIs associated with the UE, a first configuration associated with RFIs indicating a single time period including a set of symbols configure for full-duplex communications and indicating, to the UE via the configuration for interpreting RFIs associated with the UE, a second configuration associated with RFIs indicating two or more time periods including sets of symbols having the full-duplex format.

In some examples of the method, apparatuses, and non-transitory computer-readable medium described herein, the configuration for interpreting RFIs includes a combined configuration including a time resource allocation scheme and a frequency resource allocation scheme and the method, apparatuses, and non-transitory computer-readable medium may include further operations, features, means, or instructions for indicating, to the UE, a resource format for each time period of the one or more time periods based on the RFI and the time resource allocation scheme and indicating, to the UE, the frequency resource allocation for the set of symbols having the full-duplex format based on the RFI and the frequency resource allocation scheme.

Some examples of the method, apparatuses, and non-transitory computer-readable medium described herein may further include operations, features, means, or instructions for indicating, within the control message, an index for each of a set of multiple component carriers associated with the UE, each index indicating a position of the RFI within the control message for each of the set of multiple component carriers.

Some examples of the method, apparatuses, and non-transitory computer-readable medium described herein may further include operations, features, means, or instructions for indicating, within the control message, an index for a first component carrier of a set of multiple component carriers associated with the UE, the index for the first component carrier indicating a position of the RFI within the control message for each of the set of multiple component carriers.

In some examples of the method, apparatuses, and non-transitory computer-readable medium described herein, the configuration for interpreting RFIs associated with the UE may be based on a capability of the UE to recognize the full-duplex format.

Some examples of the method, apparatuses, and non-transitory computer-readable medium described herein may further include operations, features, means, or instructions for indicating, within the control message, an index associated with the UE indicating a position of the RFI within the control message, where the RFI associated with the index may be based on the configuration for interpreting RFIs and the capability of the UE to recognize the full-duplex format.

Some examples of the method, apparatuses, and non-transitory computer-readable medium described herein may further include operations, features, means, or instructions for indicating, within the control message, an index associated with the UE indicating a position of the RFI within the control message, where indicating the index may be based on the configuration for interpreting RFIs and the capability of the UE to recognize the full-duplex format.

Some examples of the method, apparatuses, and non-transitory computer-readable medium described herein may further include operations, features, means, or instructions for transmitting the control message may be based on a capability of the UE to recognize the full-duplex format.

Some examples of the method, apparatuses, and non-transitory computer-readable medium described herein may further include operations, features, means, or instructions for transmitting, to the UE, an RRC message including an indication of the configuration for interpreting RFIs.

In some examples of the method, apparatuses, and non-transitory computer-readable medium described herein, the frequency resource allocation may be associated with each symbol of the set of symbols having the full-duplex format.

In some examples of the method, apparatuses, and non-transitory computer-readable medium described herein, the control message includes GC-DCI.

In some examples of the method, apparatuses, and non-transitory computer-readable medium described herein, the frequency resource allocation for uplink communications and downlink communications for the set of symbols having the full-duplex format includes a guard band between frequency resources for uplink communications and frequency resources for downlink communications.

In some examples of the method, apparatuses, and non-transitory computer-readable medium described herein, the frequency resource allocation for uplink communications and downlink communications for the set of symbols having the full-duplex format includes an overlap between frequency resources for uplink communications and frequency resources for downlink communications.

DETAILED DESCRIPTION

Figure 1:
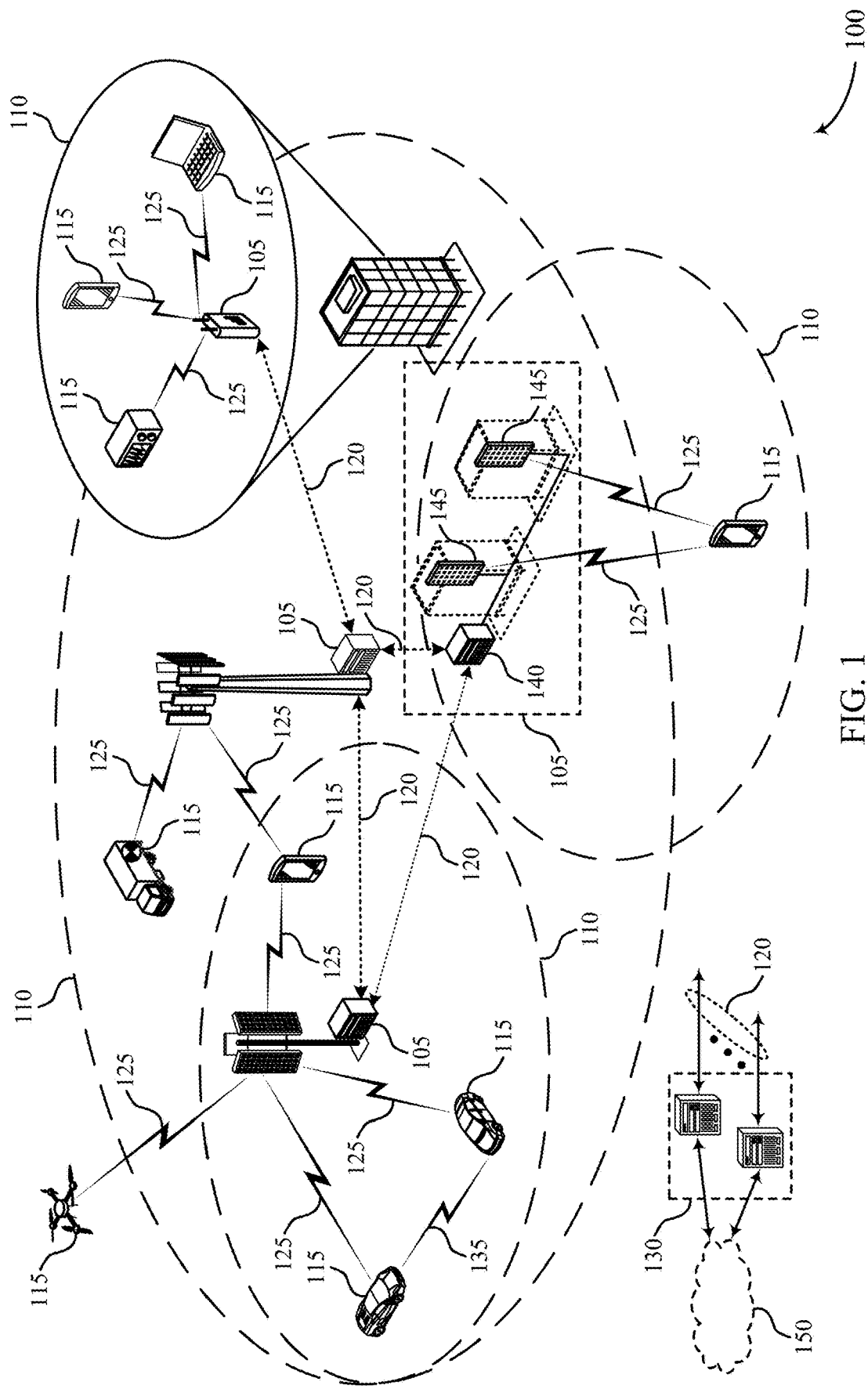
FIGS. 1 and 2 illustrate examples of wireless communications systems that support resource format indicators (RFIs) in bandwidth part (BWP) management for full-duplex resource allocation in accordance with aspects of the present disclosure.

In some wireless communications systems, a user equipment (UE) may receive a resource format indicator (RFI), such as a slot format indicator (SFI). The RFI (e.g., SFI) may indicate a resource format (e.g., uplink format or downlink format) associated with slots allocated for communications at the UE. For example, an SFI may indicate that a first slot is allocated for uplink transmissions from the UE to a base station, and a second slot is allocated for downlink transmissions from the base station to the UE. In some wireless communications, every symbol and/or every frequency resource within a given slot may be configured for the same resource format (e.g., uplink or downlink or flexible). Some UEs may be configured to perform communications using symbols having a full-duplex format (e.g., symbols which include resources for both uplink and downlink communications). However, conventional wireless communications systems operating in time-division duplexing (TDD) may not support signaling which indicates slots including symbols having a full-duplex format within the component carrier bandwidth. Moreover, conventional wireless communications systems may not support signaling frequency resource allocations for symbols having a full-duplex format.

To address the deficiencies associated with conventional resource format signaling, techniques described herein are directed to signaling resource allocations for full-duplex slots. For example, a UE may receive a configuration (e.g., configuration signaling indicating indexes or tables) for interpreting RFIs (e.g., SFIs) indicating resource formats for time periods (e.g., slots) of communication resources allocated to the UE. The resource formats may include an uplink format, a downlink format, a flexible format, or a full-duplex format. In some aspects, configurations for interpreting RFIs which are received and identified by the UE may cause different UEs to interpret the same RFI differently. For example, an RFI indicating an index of "1" may be interpreted differently by a first UE and a second UE depending on their respective configurations.

Subsequently, a UE may additionally receive a control message including an RFI (e.g., SFI) for one or more time periods (e.g., slots). Based on the configuration and the RFI, the UE may determine a resource format (e.g., uplink format, downlink format, and full-duplex format) for each time period, and may further determine a frequency resource allocation for each time period including symbols having a full-duplex format. In some aspects, both resource formats and frequency resource allocations for slots having a full-duplex format may be indicated separately within different portions (e.g., different bits) of the RFI. In additional or alternative aspects, resource formats may be indicated via the RFI, while frequency resource allocations for slots having a full-duplex format may be indicated in a separate, designated portion/field (e.g., reserved portion) of the control message which is reserved for indicating frequency resource allocations. Furthermore, in some aspects, a combined or jointly coded configuration for interpreting RFIs may include both a time resource allocation scheme and a frequency resource allocation scheme. In such cases, a UE may utilize the combined configuration to determine both resource formats and frequency resource allocations from a storage object indicated via an RFI (e.g., SFI storage object indicates both resource format and frequency resource allocation).

In some examples, a UE may be configured to operate in accordance with a full-duplex mode or a full-duplex aware mode. The UE may be configured with a set of frequency resources for communicating with a base station. The set of frequency resources may be referred to as an operating bandwidth part (BWP) and may include an active uplink BWP, an active downlink BWP, or both. In some examples, the UE may receive an RFI, such as an SFI. The RFI may indicate a number of resource formats for a set of slots (e.g., an uplink format, a downlink format, a flexible format, a full-duplex format, or any combination of these or other slot formats) and a set of frequency resources (e.g., a slot frequency format, a BWP pair, a BWP and a corresponding resource bandwidth (RBW), or any other indication of frequency resources) for flexibly configuring the UE. However, the set of frequency resources indicated for communications at the UE may not fully overlap with the configured active BWPs of the UE, which may degrade the UE's performance.

Various aspects of the present disclosure provide techniques for a UE to communicate with a base station in the context of full-duplex operation or full-duplex aware operation. For example, a UE may be configured with an operating BWP (e.g., an active pair of uplink and downlink BWPs) that includes a first set of frequency resources (e.g., including uplink and downlink frequency resources), and the UE may communicate with a base station using the operating BWP. The UE may receive a group-common downlink control information (GC-DCI) message from the base station that includes an RFI (e.g., an SFI) indicating a second set of frequency resources. The GC-DCI message may be an example of a control message including control information for a group of UEs, where each UE receiving the GC-DCI message may identify a subset of the control information relevant to that specific UE. The UE determining the indicated second set of frequency resources may modify the operating BWP based on the second set of frequency resources and may communicate with the base station using the modified operating BWP.

In some examples, modifying the operating BWP based on a set of frequency resources indicated in a downlink message (e.g., the second set of frequency resources) may involve a BWP switch or a BWP reduction. In some cases, the UE may modify the operating BWP by switching the operating BWP to the set of frequency resources indicated in the downlink message. In some other cases, the UE may modify the operating BWP by reducing the operating BWP to a set of frequency resources that overlaps between the first set of frequency resources (e.g., the UE's operating BWP) and the second set of frequency resources (e.g., the frequency resources indicated in the GC-DCI message). In some examples, the UE may support full-duplex operation and communicate with the base station using the modified operating BWP in a full-duplex mode, while in some additional or alternative examples, the UE may support full-duplex aware operation and may communicate with the base station using the modified operating BWP in a half-duplex mode. The second set of frequency resources (e.g., the set of frequency resources indicated by the downlink message) may be indicated via a slot frequency format, a BWP pair, or a BWP and an RBW for the BWP.

In some cases, the UE may modify the operating BWP based on a frequency resource table. For example, the UE may be pre-configured with a frequency resource table, or the UE may generate the frequency resource table based on a configuration procedure (e.g., a radio resource control (RRC) configuration procedure). The set of frequency resources indicated in the downlink message may correspond to the frequency resource table, and the UE may modify the operating BWP based on the frequency resources indicated in the downlink message and the frequency resource table. Modifying an operating BWP based on a set of frequency resources indicated in a downlink message (e.g., a GC-DCI message) may improve system efficiency and decrease signaling latency, for example, by supporting full-duplex operation in full-duplex formatted symbols.

Aspects of the disclosure are initially described in the context of wireless communications systems, resource allocation schemes, and process flows. Aspects of the disclosure are further illustrated by and described with reference to apparatus diagrams, system diagrams, and flowcharts that relate to RFIs in BWP management for full-duplex resource allocation.

FIG. 1 illustrates an example of a wireless communications system 100 that supports RFIs in BWP management for full-duplex resource allocation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency-division duplexing (FDD) and time-division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency-division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time-division multiplexing (TDM) techniques, frequency-division multiplexing (FDM) techniques, or hybrid TDM-FDM techniques. A control region (e.g., a control resource set (CORE- SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 of the wireless communications system 100 may support communications for signaling resource allocations for full-duplex slots allocated for communications at a UE 115. In particular, a UE 115 may receive, from a base station 105, a configuration for interpreting RFIs indicating resource formats (e.g., uplink format, downlink format, flexible format, full-duplex format) for time periods (e.g., slots) of communication resources allocated to the UE 115. The base station 105 may indicate the configuration for interpreting RFIs via RRC signaling, control messages, configuration messages, or any combination thereof. The UE 115 may additionally receive a control message (e.g., a downlink control information (DCI) message) from the base station 105, where the control message includes an RFI for one or more time periods. Based on the configuration and the RFI, the UE 115 may determine a resource format (e.g., uplink format, downlink format, flexible format, and full-duplex format) for each time period, and may further determine a frequency resource allocation for each time period including symbols having a full-duplex format.

For the purposes of the present disclosure, the term "time periods" may be used to refer to any period of time resources allocated for wireless communications. In this regard, the term "time period" may be used interchangeably with the term "slot." However this is not to be regarded as a limitation of the present disclosure. Moreover, the term "RFIs" may refer to any indication, index, table, or storage object which is used to indicate resource formats (e.g., uplink format, downlink format, flexible format, full-duplex format) for slots of resources allocated to a UE 115. In this regard, an RFI may include, but is not limited to, an SFI.

By way of example, a base station 105 may transmit a downlink transmission including an indication of a configuration for interpreting RFIs allocated to the UE 115. In some aspects, configurations for interpreting RFIs which are received and identified by UEs 115 may cause different UEs 115 to interpret the same RFI differently. For example, an RFI indicating an index of "1" may be interpreted differently by a first UE 115 and a second UE 115 depending on their respective configurations. For instance, the first UE 115 may interpret the index of "1" as indicating an uplink resource format, whereas the second UE 115 may interpret the index of "1" as indicating a full-duplex resource format.

Continuing with the same example, the UE 115 may additionally receive a control message (e.g., DCI, GC-DCI) including an RFI for a set of slots allocated to the UE 115. Based on the configuration and the RFI, the UE 115 may determine a resource format (e.g., uplink format, downlink format, and full-duplex format) for each slot, and may further determine a frequency resource allocation for each slot including symbols having a full-duplex format. In some aspects, the RFIs may be indicated in GC-DCI, thereby enabling each respective UE 115 to interpret the same GC-DCI according to the respective configuration associated with the UE 115.

In some aspects, both resource formats and frequency resource allocations for slots having a full-duplex format may be indicated within different portions (e.g., different bits) of the RFI. In additional or alternative aspects, resource formats may be indicated in the RFI, while frequency resource allocations for slots having a full-duplex format may be indicated in a separate, designated (e.g., reserved) portion of the control message which is reserved for indicating frequency resource allocations. Furthermore, in some aspects, a combined configuration for interpreting RFIs may include both a time resource allocation scheme and a frequency resource allocation scheme. In such cases, a UE 115 may utilize the combined configuration to determine both resource formats and frequency resource allocations from a storage object indicated via an RFI (e.g., SFI storage object indicates both resource format and frequency resource allocation).

As an example, a UE 115 may communicate with a base station 105 over a first set of frequency resources, which may be referred to as a BWP or an operating BWP. For example, the UE's operating BWP may be a set of frequency resources allocated for communications to or from the UE 115 according to a radio access technology (RAT), such as NR, LTE, or any other RAT. The BWP may span a set of contiguous or non-contiguous frequency resources in a specific carrier. In some examples, the UE 115 may be configured with multiple BWPs (e.g., one or more uplink BWPs, one or more downlink BWPs, or a combination thereof), where an uplink BWP and a downlink BWP may be active for the UE 115 at a given time. The UE 115 may communicate data, control information, feedback information, or any combination thereof within the active BWPs.

The UE 115 may receive, from a base station 105, a GC-DCI message. For example, the base station 105 may transmit (e.g., broadcast) the GC-DCI message to multiple UEs 115 in a coverage area 110. The GC-DCI message may be an example of any DCI message transmitted to multiple recipients. The message may include control information for multiple UEs 115, such that a UE 115 receiving the GC-DCI message may determine a portion of the control information intended for the UE 115. For example, the UE 115 may identify an RFI included in the GC-DCI message that indicates a second set of frequency resources. In some cases, the second set of frequency resources may not fully overlap with the first set of frequency resources (e.g., a current operating BWP for the UE 115). However, the wireless communications system 100 may support the UE 115 modifying the operating BWP based on the second set of frequency resources.

For example, a UE 115 may communicate with a base station 105 using an operating BWP (e.g., including an active uplink BWP and an active downlink BWP) that includes a first set of frequency resources in a carrier bandwidth. The UE 115 may receive a GC-DCI message that includes an RFI indicating a second set of frequency resources for the UE 115. The UE 115 may modify the operating BWP based on the second set of frequency resources. Modifying the operating BWP may include switching the operating BWP to the second set of frequency resources indicated by the RFI or reducing the operating BWP to a set of overlapping frequency resources based on an overlap between the first set of frequency resources and the second set of frequency resources. The UE 115 may communicate with the base station 105 according to the modified operating BWP (e.g., in a slot allocated for downlink and uplink communications).

The techniques described herein may provide for more flexible resource allocations. In particular, techniques described herein may support signaling for full-duplex formats, as well as signaling for frequency resource allocations associated with time periods including symbols having a full-duplex format. Moreover, by sending a single GC-DCI transmission to a group of UEs 115 which indicates RFIs (e.g., SFIs), base stations 105 may decrease the control signaling used to communicate RFIs, thereby reducing resource and messaging overhead within the wireless communications system 100.

Figure 2:
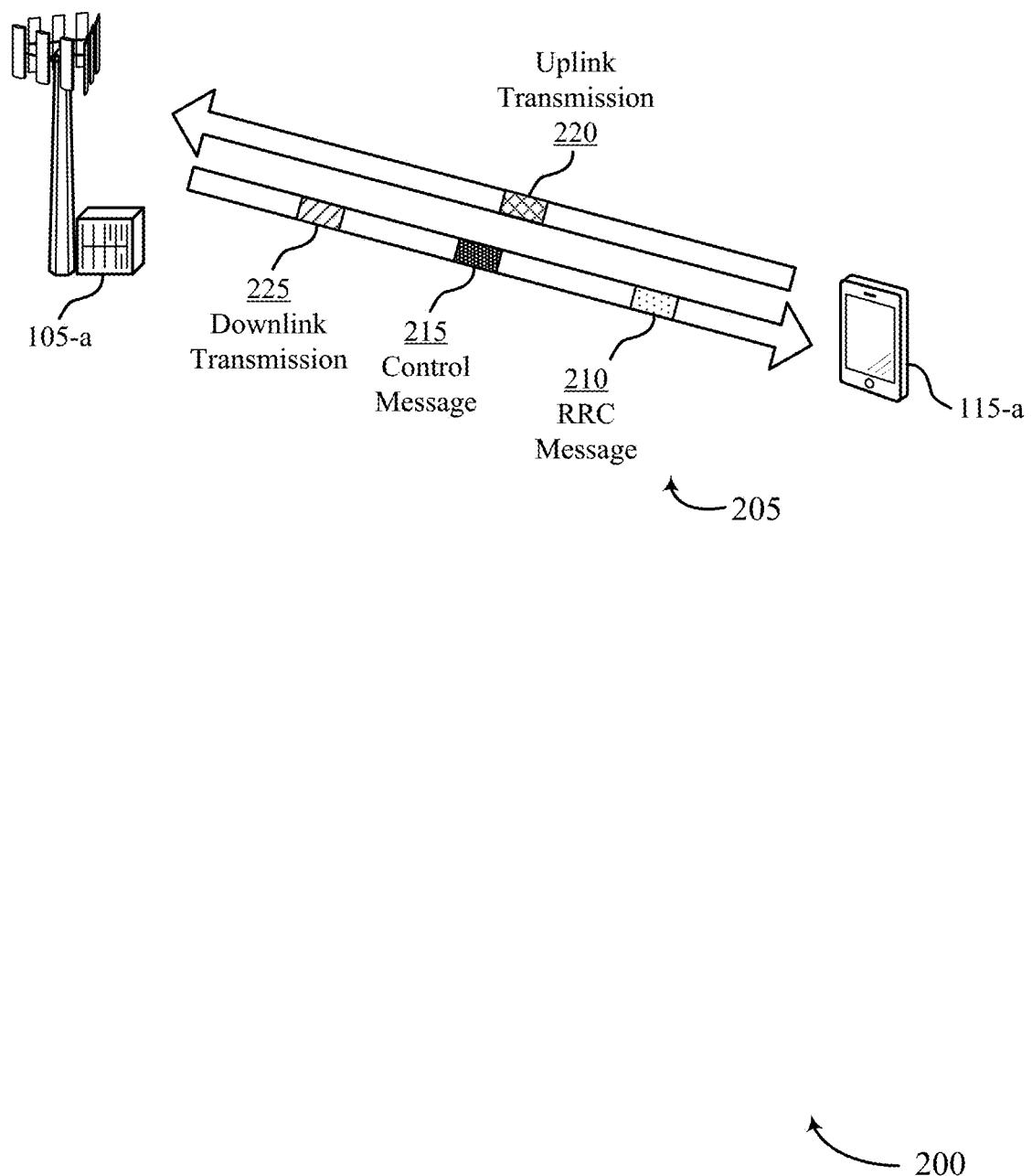

FIG. 2 illustrates an example of a wireless communications system 200 that supports RFIs in BWP management for full-duplex resource allocation in accordance with aspects of the present disclosure. In some examples, wireless communications system 200 may implement aspects of wireless communications system 100. The wireless communications system 200 may include a UE 115-*a* and a base station 105-*a*, which may be examples of UEs 115 and base stations 105, as described with reference to FIG. 1.

The UE 115-*a* may communicate with the base station 105-*a* using a communication link 205. In some cases, the communication link 205 may include an example of an access link (e.g., a Uu link). The communication link 205 may include a bi-directional link that can include both uplink and downlink communication. For example, the UE 115-*a* may transmit uplink transmissions 220, such as uplink control signals or uplink data signals, to the base station 105-*a* using the communication link 205, and the base station 105-*a* may transmit downlink transmissions, such as downlink control signals or downlink data signals, to the UE 115-*a* using the communication link 205.

The UE 115-*a* and the base station 105-*a* of the wireless communications system 200 may support communications for signaling resource allocations for full-duplex slots allocated for communications at a UE 115-*a*. In particular, the UE 115-*a* may receive, from the base station 105-*a*, a configuration (e.g., index, table) for interpreting RFIs indicating resource formats (e.g., uplink format, downlink format, flexible format, full-duplex format) for time periods (e.g., slots) of communication resources allocated to the UE 115-*a*. The UE 115-*a* may additionally receive a control message (e.g., DCI, GC-DCI) from the base station 105, where the control message includes an RFI for one or more time periods. Based on the configuration and the RFI, the UE 115-*a* may determine a resource format (e.g., uplink format, downlink format, and full-duplex format) for each time period, and may further determine a frequency resource allocation for each time period including symbols having a full-duplex format. The UE 115-*a* may then transmit uplink transmissions 220 to the base station 105-*a* based on the determined resource formats, the determined frequency resource allocations, or both.

For example, the base station 105-*a* may transmit an RRC message 210 including an indication of a configuration for interpreting RFIs (e.g., SFIs) associated with the UE 115-*a*. The RFIs may indicate one or more resource formats associated with one or more time periods (e.g., slots) of communication resources allocated to the UE 115-*a*. For example, the one or more resource formats indicated by the RFIs may include a downlink format, an uplink format, or a full-duplex format. In some cases, the base station 105-*a* may transmit the RRC message 210 including the indication of the configuration based on a capability of the UE 115-*a* to recognize the full-duplex format.

In additional or alternative aspects, the configuration for interpreting RFIs indicated in the RRC message 210 may include a time resource allocation scheme and a frequency resource allocation scheme. In this regard, the configuration indicated to the UE 115-*a* may include a configuration for interpreting both resource formats and frequency resource allocations based on values or storage objects indicated in RFIs. In this regard, the configuration for interpreting RFIs may include a joint-configuration which is used to determine both time and frequency resources.

In some aspects, the UE 115-*a* may identify the configuration for interpreting RFIs. In some aspects, the UE 115-*a* may identify the configuration for interpreting RFIs based on receiving the RRC message 210 from the base station 105-*a*. Additionally or alternatively, the UE 115-*a* may be preconfigured with the configuration for interpreting RFIs, and may thereby identify the configuration for interpreting RFIs without receiving the RRC message 210. In some aspects, the UE 115-*a* may identify the configuration for interpreting RFIs based on a capability of the UE 115-*a* to recognize full-duplex formats.

In some aspects, the UE 115-*a* may identify one or more configurations for interpreting RFIs. In particular, RFIs which indicate varying quantities of slots including symbols having a full-duplex format may be associated with different configurations. For example, in some cases, the UE 115-*b* may identify a first configuration associated with RFIs indicating a single time period (e.g., single slot) including a set of symbols having a full-duplex format, and may identify a second configuration associated with RFIs indicating a two or more time periods (e.g., single slot) including a set of symbols having a full-duplex format.

In some aspects, the UE 115-*a* may receive a control message 215 from the base station 105-*a*. The control message 215 may include an RFI (e.g., SFI) for one or more time periods (e.g., slots) of communication resources allocated to the UE 115-*a*. The control message 215 may include DCI, GC-DCI, or the like. For example, the control message may include an enhanced DCI (e.g., DCI 2_0, DCI 2_x) which is used to indicate both resource formats (e.g., uplink format, downlink format, full-duplex format) as well as frequency resource allocations for slots including symbols having a full-duplex format. In some aspects, at least one time period (e.g., at least one slot) of the one or more time periods allocated to the UE 115-a indicated via the control message 215 may include a time period (e.g., slot) including symbols having a full-duplex format.

As noted previously herein, not all UEs 115 may be compatible with full-duplex communications. Accordingly, in some aspects, UEs 115 which are not configured for full-duplex communications may only receive and monitor for "legacy" control messages (e.g., DCI 2_0) which do not indicate full-duplex slots and/or frequency resource allocations for full-duplex slots, and UEs 115 which are configured for full-duplex communications may receive and monitor for both "legacy" control messages (e.g., DCI 2_0) as well as "enhanced" control messages (e.g., enhanced DCI 2_0, DCI 2_x) which indicate full-duplex slots and/or frequency resource allocations for full-duplex slots. In this regard, the UE 115-a may receive the control message 215 based on a capability of the UE 115-a to recognize full-duplex formats. Additionally or alternatively, UEs 115 which are not configured for full-duplex communications may receive enhanced control messages, where resources associated with the UEs 115 within the enhanced control messages may not include indications of full-duplex slots and/or frequency resource allocations for full-duplex slots.

In some cases, UEs 115 which are configured to recognize and communicate with full-duplex slots may be referred to as "full-duplex UEs." Comparatively, UEs 115 which are configured to recognize full-duplex slots but are not configured to communicate with full-duplex slots may be referred to as "full-duplex-aware UEs," while UEs 115 which are not configured to recognize or communicate with full-duplex slots may be referred to as "non-full-duplex-aware UEs."

It is further noted herein that configuring each UE 115 with configurations for interpreting RFIs separately may allow for UEs 115 of varying complexity or sophistication (e.g., UEs 115 which are and/or are not configured for full-duplex communications) to receive and interpret common control messages (e.g., enhanced control messages) and common RFIs. For example, some UEs 115 may not be capable of recognizing full-duplex formats (e.g., non-full-duplex-aware UEs), and may be unable to perform communications via full-duplex formats. However, by separately configuring UEs 115 to interpret control messages 215 and/or RFIs, both UEs 115 which are configured for full-duplex communications (e.g., full-duplex UEs) and UEs 115 which are not configured for full-duplex communications (e.g., full-duplex-aware UEs, non-full-duplex aware UEs) may be able to receive and interpret the same control message 215 and/or the same RFIs. For example, the UE 115-a may be configured (e.g., capable) for full-duplex communications (e.g., full-duplex UE), while a second UE 115 may not be configured (e.g., not capable) for full-duplex communications (e.g., full-duplex-aware UE). In this example, the UE 115-a may be configured to interpret an RFI of "1" as indicating a slot with a full-duplex format, while the second UE 115 may be configured to interpret the RFI of "1" as indicating a slot with an uplink format.

In some aspects, the UE 115-a may identify one or more indexes associated with the UE 115-a. The one or more indexes may include indications for the UE 115-a to monitor certain portions of the control message 215 which are associated with the UE 115-a. In some aspects, the UE 115-a may identify the one or more indexes based on the RRC message 210, the control message 215, other signaling from the base station 105-a, or any combination thereof. Moreover, the UE 115-a may identify the one or more indexes based on a capability of the UE 115-a to recognize full-duplex formats.

For example, the first few slots or bits of the control message 215 may include one or more indexes indicating portions of the control message 215 that the UE 115-a is to monitor to determine resource allocations. For instance, the UE 115-a may identify, within the control message 215, an index associated with the UE 115-a, where the index indicates a position of an RFI associated with the UE 115-a within the control message 215.

In some aspects, the UE 115-a may identify a single index which indicates for the UE 115-a to monitor one or more portions of the control message 215. Additionally or alternatively, the UE 115-a may identify multiple indexes which indicate for the UE 115-a to monitor multiple portions of the control message 215. For example, in some cases, the UE 115-a may identify a first index within the control message 215, where the first index indicates for the UE 115-a to monitor a first portion of the control message 215. Continuing with the same example, the UE 115-a may identify a second index within the control message 215, where the second index indicates for the UE 115-a to monitor a second portion of the control message 215 which is different from the first portion. For instance, the first portion of the control message 215 indicated by the first index may include an RFI, and the second portion of the control message indicated by the second index may include a portion of the control message 215 which is reserved for indications of frequency resource allocations for the RFIs included within the control message 215.

In some aspects, the UE 115-a may identify an index associated with one or more component carriers associated with the UE 115-a. For example, the UE 115-a may identify an index for each component carrier of a set of component carriers associated with the UE 115-a. In this example, each index may indicate a position of an RFI within the control message 215 which is associated with each respective component carrier. In this regard, resource formats and/or frequency resource allocations for full-duplex slots may be indicated separately for each respective component carrier of the UE 115-a.

Additionally or alternatively, the UE 115-a may identity an index for a first component carrier associated with the UE 115-a, where the index for the first component carrier indicates a position of an RFI within the control message 215 which is associated with one or more component carriers associated with the UE 115-a. For example, the RFI may be associated with every component carrier associated with the UE 115-a. In this regard, an index and/or RFI associated with one component carrier of the UE 115-a may be used for additional component carriers of the UE 115-a.

The UE 115-a may monitor the control message 215, or portions of the control message 215, based on the one or more identified indexes. For example, in cases where the UE 115-a identifies a single index indicating a position of an RFI within the control message 215, the UE 115-a may monitor the portion of the control message 215 including the RFI based on identifying the index. By way of another example, in cases where the UE 115-a identifies a first index indicating a position of an RFI within the control message 215, and a second index indicating a portion of the control message 215 reserved for indications of frequency resource allocations, the UE 115-a may monitor portions of the control message 215 including the RFI and the portion of the control message 215 reserved for indications of frequency resource allocations.

In some aspects, the UE 115-*a* may determine a resource format (e.g., uplink format, downlink format, full-duplex format) for each time period (e.g., each slot) of communication resources allocated to the UE 115-*a*. Moreover, the UE 115-*a* may determine a resource format for each time period of communication resources allocated to the UE 115-*a* associated with each component carrier associated with the UE 115-*a*. In this regard, the UE 115-*a* may determine resource formats for each component carrier associated with the UE 115-*a*. In some aspects, the UE 115-*a* may determine the resource formats based on the RRC message 210, the configuration for interpreting RFIs, the control message 215 including the RFI, or any combination thereof. For example, the UE 115-*a* may determine a resource format for each time period based on at least a portion of the RFI within the control message 215.

The UE 115-*a* may additionally identify one or more time periods (e.g., slots) including sets of symbols having a full-duplex format. In this regard, the UE 115-*a* may identify one or more slots having a full-duplex format. In some aspects, the UE 115-*a* may identify the one or more time periods including sets of symbols having a full-duplex format based on the RRC message 210, the configuration for interpreting RFIs, the control message 215 including the RFI, or any combination thereof.

In some aspects, the UE 115-*a* may monitor the control message 215 for portions of the control message 215 associated with frequency resource allocations of the one or more slots including symbols having a full-duplex format. In this regard, the UE 115-*a* may monitor one or more portions of the control message 215 based on identifying the one or more slots including symbols having a full-duplex format. For example, in cases where the UE 115-*a* identifies one or more slots including symbols having a full-duplex format, the UE 115-*a* may monitor portions of the RFI and/or portions of the control message 215 reserved for indications of frequency resource allocations. By way of another example, in cases where the UE 115-*a* does not identify any slots including symbols having a full-duplex format, the UE 115-*a* may refrain from monitoring portions of the RFI and/or portions of the control message 215 reserved for indications of frequency resource allocations.

In some aspects, the UE 115-*a* may determine a frequency resource allocation for the one or more slots including symbols having a full-duplex format. Moreover, the UE 115-*a* may determine a frequency resource allocation for slots including symbols having a full-duplex format on each component carrier associated with the UE 115-*a*. In some aspects, the UE 115-*a* may determine the frequency resource allocation for the slots including symbols with a full-duplex format based on the RRC message 210, the configuration for interpreting RFIs, the control message 215 including the RFI, or any combination thereof. For example, in cases where the UE 115-*a* determines a resource format for each slot based on a first portion (e.g., first bit) of the RFI, the UE 115-*a* may determine the frequency resource allocation based on a second portion (e.g., second bit) of the RFI. By way of another example, the UE 115-*a* may determine the frequency resource allocation based on a portion of the control message 215 reserved for indications of frequency resource allocations for the RFIs of the control message 215.

In cases where the UE 115-*a* identifies two or more slots including sets of symbols with a full-duplex format, the UE 115-*a* may determine multiple frequency resource allocations. For example, the UE 115-*a* may identify a first slot including a first set of symbols having a full-duplex format, and a second slot including a second set of symbols having a full-duplex format. In this example, the UE 115-*a* may determine the resource format for each slot based on a first portion (e.g., first bit) of the RFI, determine a first frequency resource allocation for the first set of symbols having the full-duplex format based on a second portion (e.g., second bit) of the RFI, and determine a second frequency resource allocation for the second set of symbols having the full-duplex format based on a third portion (e.g., third bit) of the RFI. By way of another example, the UE 115-*a* may determine frequency resource allocations for both the first and second sets of symbols having the full-duplex format based on a portion of the control message 215 reserved for indications of frequency resource allocations.

Moreover, as noted previously herein, the UE 115-*a* may be configured with multiple configurations for interpreting RFIs based on a quantity of slots including symbols having a full-duplex format. In this regard, the UE 115-*a* may utilize a first configuration to interpret the control message 215 and/or RFI in cases where the UE 115-*a* identifies a single full-duplex slot, and may utilize a second configuration to interpret the control message 215 and/or RFI in cases where the UE 115-*a* identifies two or more full-duplex slots.

In some aspects, the UE 115-*a* may communicate with the base station 105-*a* based on determining the resource format for each slot and determining the frequency resource allocation for full-duplex slots. For example, the UE 115-*a* may transmit uplink transmissions 220 to the base station 105-*a* based on the determined resource formats and frequency resource allocations, and may receive downlink transmissions 225 from the base station 105-*a* based on the determined resource formats and frequency resource allocations.

The techniques described herein may provide for more flexible resource allocations. In particular, techniques described herein may support signaling for full-duplex formats, as well as signaling for frequency resource allocations associated with time periods including symbols having a full-duplex format. Moreover, by sending a single GC-DCI transmission to a group of UEs 115 which indicates RFIs (e.g., SFIs), the base station 105-*a* may decrease the control signaling used to communicate RFIs, thereby reducing resource and messaging overhead within the wireless communications system 200.

Figure 3:
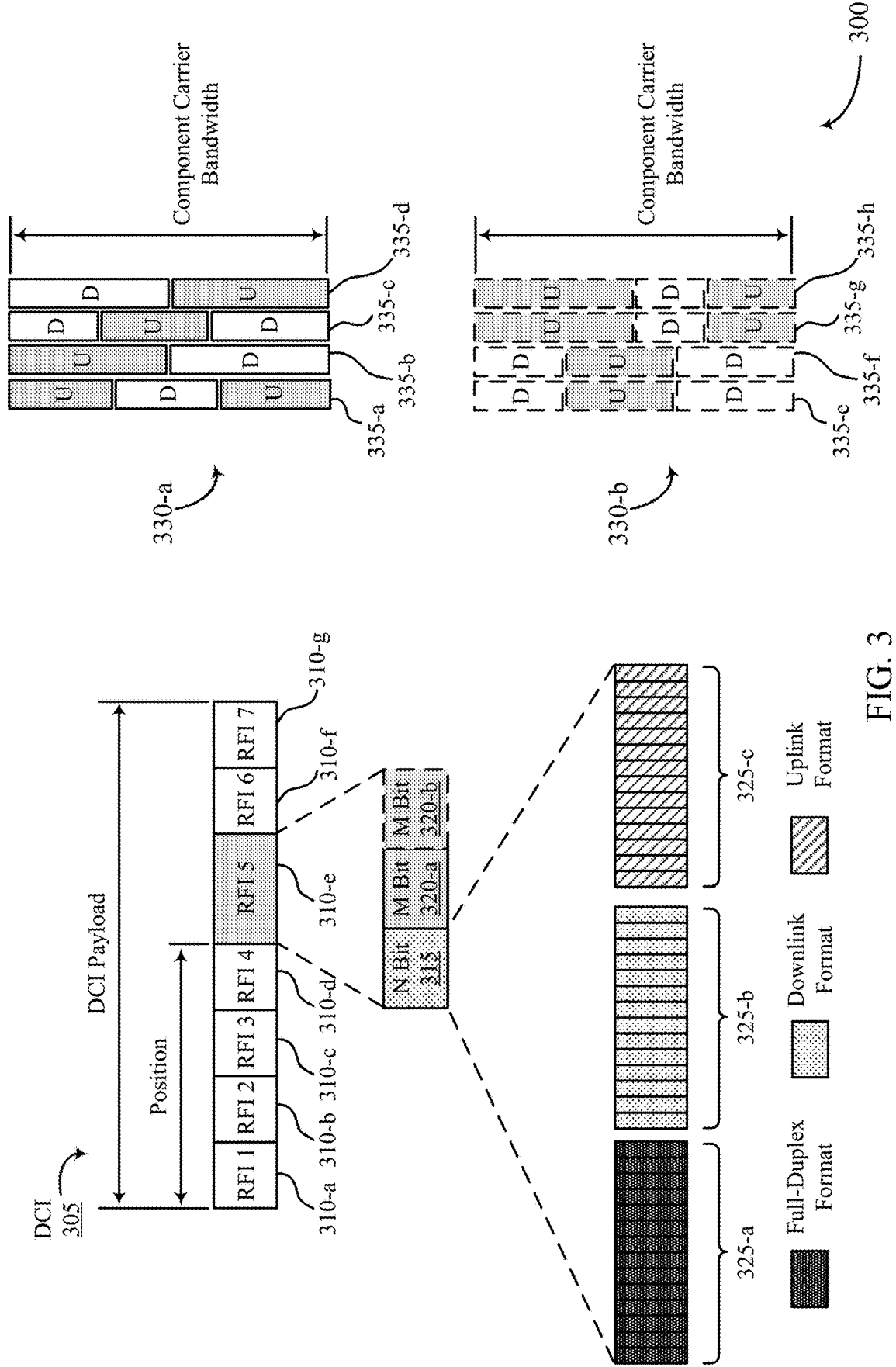
FIGS. 3 through 5 illustrate examples of resource allocation schemes that support RFIs in BWP management for full-duplex resource allocation in accordance with aspects of the present disclosure.

FIG. 3 illustrates an example of a resource allocation scheme 300 that supports RFIs in BWP management for full-duplex resource allocation in accordance with aspects of the present disclosure. In some examples, resource allocation scheme 300 may implement aspects of wireless communications system 100 or 200.

In some aspects, the resource allocation scheme 300 may illustrate an example DCI 305 (e.g., enhanced DCI 2_0, DCI 2_x), and may illustrate how a UE 115-*a* configured for full-duplex communications may receive and interpret enhanced DCI. In some aspects, a DCI 305 illustrated in the resource allocation scheme 300 may illustrate an example of the control message 215 illustrated in FIG. 2.

In some aspects, a UE 115 may identify a configuration for interpreting RFIs 310. Additionally, the UE 115 may receive a control message including one or more RFIs 310. For example, as shown in FIG. 3, the UE 115 may receive a DCI 305, where the DCI 305 includes a set of RFIs 310. The set of RFIs 310 may include a first RFI 310-*a*, a second RFI 310-*b*, a third RFI 310-*c*, a fourth RFI 310-*d*, a fifth RFI 310-*e*, a sixth RFI 310-*f*, and a seventh RFI 310-*g*. In some aspects, the UE 115 may identify one or more indexes associated with the UE 115, where the one or more indexes indicate a position of an RFI associated with the UE 115. In some cases, the one or more indexes may be indicated via an RRC message, within a bit field the DCI 305, or any combination thereof. For example, in some cases, the UE 115 may identify an index in a bit field of the DCI 305, where the index indicates a position of the fifth RFI 310-*e* associated with the UE 115. In some aspects, the one or more indexes may indicate one or more RFIs 310 within the DCI 405 associated with one or more component carriers associated with the UE 115. For example, the UE 115 may identify a first index indicating a first RFI associated with a first component carrier of the UE 115, and may identify a second index indicating a second RFI associated with a second component carrier of the UE 115.

The fifth RFI 310-*e* may be associated with one or more time periods (e.g., slots 325) of communication resources allocated to the UE 115. For example, as shown in FIG. 3, the fifth RFI 310-*e* may be associated with a first slot 325-*a*, a second slot 325-*b*, and a third slot 325-*c*. In some aspects, the UE 115 may monitor the fifth RFI 310-*e* based on identifying the one or more indicators. The fifth RFI 310-*e* may include a first portion 315 (e.g., "N bit") and a second portion 320-*a* (e.g., "M bit"). In some aspects, UE 115 may monitor the first portion 315 of the fifth RFI 310-*e* based on identifying the one or more indexes.

In some aspects, the first portion 315 of the fifth RFI 310-*e* may indicate a resource format for each slot 325 associated with the fifth RFI 310-*e*. For example, as shown in FIG. 3, the first portion 315 of the fifth RFI 310-*e* may indicate a full-duplex format associated with the first slot 325-*a*, a downlink format associated with the second slot 325-*b*, and an uplink format associated with the third slot 325-*c*. In this regard, the UE 115 may determine a resource format for each time period (e.g., each slot 325) based on the first portion 315 of the fifth RFI 310-*e*.

In some aspects, the UE 115 may identify one or more time periods (e.g., one or more slots 325) including symbols having a full-duplex format based on the first portion 315 of the fifth RFI 310-*e*. In cases where the UE 115 identifies one or more slots 325 including symbols having a full-duplex format, the UE 115 may monitor subsequent portions of the fifth RFI 310-*e* in order to identify frequency resource allocations 330 for the respective slots 325 including symbols having a full-duplex format. In some aspects, the UE 115 may identify indications of frequency resource allocations 330 associated with full-duplex formats based on subsequent portions of the fifth RFI 310-*e* (e.g., second portion 320-*a*, third portion 320-*b*).

For example, as shown in FIG. 3, the UE 115 may identify that the first slot 325-*a* includes symbols having a full-duplex format, and may thereby monitor the second portion 320-*a* of the fifth RFI 310-*e* to determine a frequency resource allocation 330-*a* for the first slot 325-*a*. In this example, the second portion 320-*a* may indicate a frequency resource allocation 330-*a* associated with the first slot 325-*a*. The frequency resource allocation 330-*a* may include one or more frequency formats 335. For example, the frequency resource allocation 330-*a* may include a first frequency format 335-*a*, a second frequency format 335-*b*, a third frequency format 335-*c*, and a fourth frequency format 335-*d*. In some aspects, the frequency resource allocation 330-*a* may be associated with each symbol of the first slot 325-*a* which has a full-duplex format.

In cases where the UE 115 identifies multiple slots 325 including symbols having a full-duplex format, the UE 115 may monitor multiple subsequent portions 320 of the fifth RFI 310-*e* to identify frequency resource allocations 330 for the respective slots 325 including symbols having a full-duplex format. For example, in some cases, the UE 115 may identify that the first slot 325-*a* and an additional slot 325 (e.g., second slot 325-*b*, third slot 325-*c*, fourth slot (not shown)) include symbols having a full-duplex format. In this example, the UE 115 may monitor the second portion 320-*a* of the fifth RFI 310-*e* to determine a first frequency resource allocation 330-*a* for the first slot 325-*a*, and may monitor the third portion 320-*b* of the fifth RFI 310-*e* to determine a second frequency resource allocation 330-*b* for the additional slot (not shown). In this example, the third portion 320-*b* of the fifth RFI 310-*e* may indicate the second frequency resource allocation 330-*b* for the additional slot. The second frequency resource allocation 330-*b* may include a first frequency format 335-*e*, a second frequency format 335-*f*, a third frequency format 335-*g*, and a fourth frequency format 335-*h*. In some aspects, the second frequency resource allocation 330-*b* may be associated with each symbol of the fourth slot which has a full-duplex format.

It is noted herein that the UE 115 may refrain from monitoring subsequent portions 320 of the fifth RFI 310-*e* depending on a quantity of slots 325 having a full-duplex format that are identified. For example, in cases where the UE 115 identifies only a single slot 325 (e.g., first slot 325-*a*) having a full-duplex format, the UE 115 may refrain from monitoring the third portion 320-*b* of the fifth RFI 310-*e*. Similarly, in cases where the UE 115 does not identify any slots 325 including symbols having a full-duplex format, the UE 115 may refrain from monitoring subsequent portions (e.g., second portion 320-*a*, third portion 320-*b*) of the fifth RFI 310-*e*.

In some aspects, the frequency resource allocations 330-*a* and 330-*b* may include frequency resources for uplink communications and downlink communications. In some cases, the frequency resource allocations 330-*a* and 330-*b* may include a guard band between frequency resources for uplink communications and frequency resources for downlink communications. Additionally or alternatively, the frequency resource allocations 330-*a* and 330-*b* may include an overlap between frequency resources for uplink communications and frequency resources for downlink communications.

Figure 4:
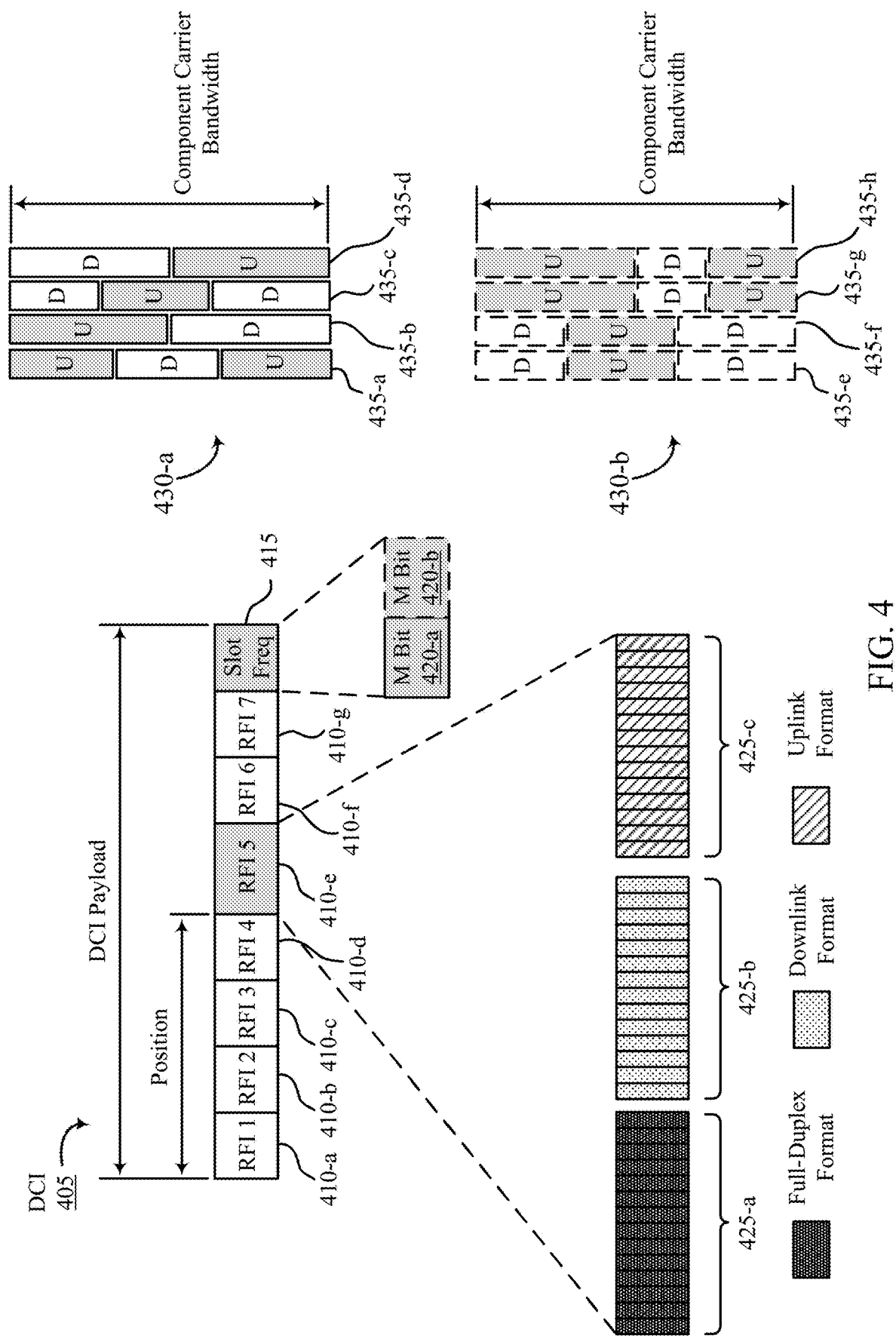

FIG. 4 illustrates an example of a resource allocation scheme 400 that supports RFIs in BWP management for full-duplex resource allocation in accordance with aspects of the present disclosure. In some examples, resource allocation scheme 400 may implement aspects of wireless communications system 100 or 200.

As compared to the resource allocation scheme 300 in which both resource formats and frequency resource allocations are indicated via portions of the fifth RFI 310-*e*, the resource allocation scheme 400 may indicate frequency resource allocations via a reserved portion 415 of the control message (e.g., DCI 405) which is reserved for indications of frequency resource allocations for the set of RFIs 410 indicated in the control message (e.g., DCI 405). In this regard, the resource allocation scheme 400 may indicate resource formats via RFIs 410, and may indicate frequency resource allocations for full-duplex slots 425 via the reserved portion 415.

For example, as noted previously herein, a UE 115 may identify a configuration for interpreting RFIs 410, and may receive a control message (e.g., DCI 405) including one or more RFIs 410. For instance, as shown in FIG. 4, the UE 115 may receive a DCI 405, where the DCI 405 includes a set of RFIs 410. The set of RFIs 410 may include a first RFI 410-*a*, a second RFI 410-*b*, a third RFI 410-*c*, a fourth RFI 410-*d*, a fifth RFI 410-*e*, a sixth RFI 410-*f*, and a seventh RFI 410-*g*. In some aspects, the UE 115 may identify one or more indexes associated with the UE 115, where the one or more indexes indicate one or more portions of the DCI 405 which the UE 115 is to monitor. The one or more indexes may indicate one or more RFIs within the DCI 505 associated with one or more component carriers associated with the UE 115.

For example, the UE 115 may identify (via an RRC message, the DCI 405, or both) a first index indicating for the UE 115 to monitor a first portion of the DCI 405, and a second index indicating for the UE 115 to monitor a second portion of the DCI 405 different from the first portion. In this example, the first portion of the DCI 405 may include the fifth RFI 410-*e*, and the second portion of the DCI 405 may include a reserved portion 415 of the DCI 405 which is reserved for indications of frequency resource allocations for the set of RFIs 410 of the DCI 405.

Continuing with the same example, the UE 115 may monitor the first portion (e.g., the fifth RFI 410-*e*) of the DCI 405 based on identifying the first index. In some aspects, the fifth RFI 410-*e* may indicate a resource format for each time period associated with the fifth RFI 410-*e*. For example, as shown in FIG. 4, the fifth RFI 410-*e* may be associated with three slots 425 (e.g., a first slot 425-*a*, a second slot 425-*b*, and a third slot 425-*c*). In this example, the fifth RFI 410-*e* may indicate a full-duplex format associated with the first slot 425-*a*, a downlink format associated with the second slot 425-*b*, and an uplink format associated with the third slot 425-*c*. In this regard, the UE 115 may determine a resource format for each time period (e.g., each slot 425) based on the fifth RFI 410-*e*.

Similarly, the UE 115 may monitor the second portion (e.g., reserved portion 415) of the DCI 405 based on identifying the second index. In some aspects, the reserved portion 415 may include the last bit of the DCI 405. The reserved portion 415 may include multiple portions which indicate frequency resource allocations 430 for slots 425 including symbols having full-duplex format. In this regard, the UE 115 may monitor none, all, or a subset of the reserved portion 415 dependent upon a quantity of slots 425 which are identified as including symbols having a full-duplex format. For example, in cases where the UE 115 does not identify any full-duplex slots 435, the UE 115 may refrain from monitoring the reserved portion 415. By way of another example, in cases where the UE 115 identifies a single slot 425 (e.g., first slot 425-*a*) including symbols having a full-duplex format, the UE 115 may monitor a first portion 420-*a* of the reserved portion 415. In this example, the first portion 420-*a* of the reserved portion 415 may indicate a first frequency resource allocation 430-*a* for the first slot 435-*a*. By way of another example, in cases where the UE 115 identifies that the first slot 425-*a* and an additional slot (e.g., a second slot 425-*b*, a third slot 425-*c*, an additional slot (not shown)) each include symbols having a full-duplex format, the UE 115 may monitor a first portion 420-*a* and a second portion 420-*b* of the reserved portion 415.

In this example, the first portion 420-*a* of the reserved portion 415 may indicate a first frequency resource allocation 430-*a* for the first slot 435-*a*, and the second portion 420-*b* may indicate a second frequency resource allocation 430-*b* for the fourth slot. The first frequency resource allocation 430-*a* may include a frequency format 435-*a*, a frequency format 435-*b*, a frequency format 435-*c*, and a frequency format 435-*d*. Likewise, the second frequency resource allocation 430-*b* may include a frequency format 435-*e*, a frequency format 435-*f*, a frequency format 435-*g*, and a frequency format 435-*h*.

In some aspects, the frequency resource allocations 430-*a* and 430-*b* may include frequency resources for uplink communications and downlink communications. In some cases, the frequency resource allocations 430-*a* and 430-*b* may include a guard band between frequency resources for uplink communications and frequency resources for downlink communications. Additionally or alternatively, the frequency resource allocations 430-*a* and 430-*b* may include an overlap between frequency resources for uplink communications and frequency resources for downlink communications.

Figure 5:
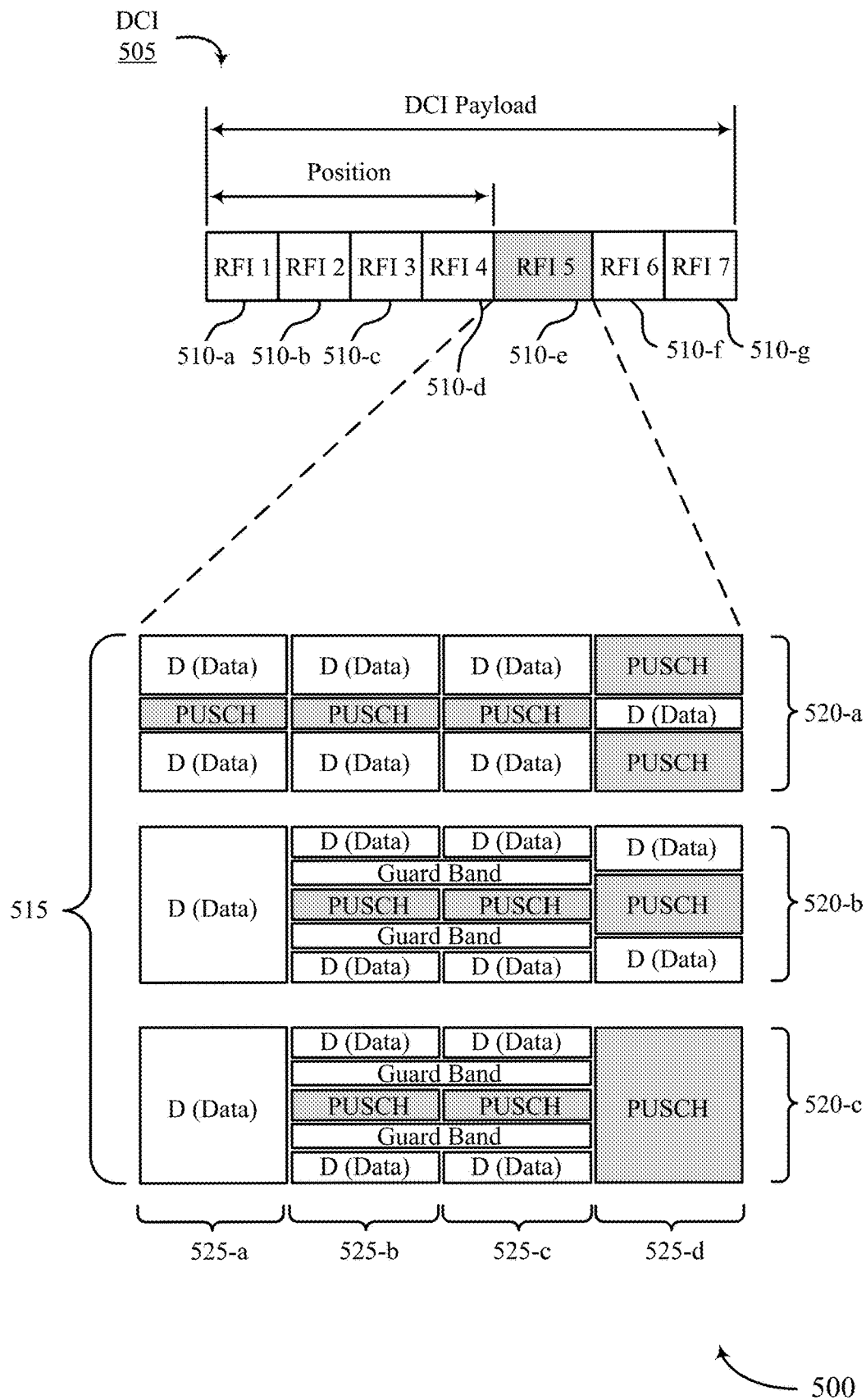

FIG. 5 illustrates an example of a resource allocation scheme 500 that supports RFIs in BWP management for full-duplex resource allocation in accordance with aspects of the present disclosure. In some examples, resource allocation scheme 500 may implement aspects of wireless communications system 100 or 200.

In additional or alternative aspects, a configuration for interpreting RFIs may include a combined configuration including a time resource allocation scheme and a frequency resource allocation scheme. In such cases, a UE 115 may use the combined configuration to interpret both resource formats and frequency resource allocations based on an RFI 510.

For example, a UE 115 may identify a configuration for interpreting RFIs 510, where the configuration includes a combined configuration including a time resource allocation scheme and a frequency resource allocation scheme. Additionally, the UE 115 may receive a control message including one or more RFIs 510. For example, as shown in FIG. 5, the UE 115 may receive a DCI 505, where the DCI 505 includes a set of RFIs 510. The set of RFIs 510 may include a first RFI 510-*a*, a second RFI 510-*b*, a third RFI 510-*c*, a fourth RFI 510-*d*, a fifth RFI 510-*e*, a sixth RFI 510-*f*, and a seventh RFI 510-*g*. In some aspects, the UE 115 may identify one or more indexes associated with the UE 115, where the one or more indexes indicate a position of an RFI associated with the UE 115. In some cases, the one or more indexes may be indicated via an RRC message, within a bit field the DCI 505, or any combination thereof. For example, in some cases, the UE 115 may identify an index in a bit field of the DCI 505, where the index indicates a position of the fifth RFI 510-*e* associated with the UE 115. In some aspects, the one or more indexes may indicate one or more RFIs 510 within the DCI 405 associated with one or more component carriers associated with the UE 115.

In some aspects, the fifth RFI 510-*e* may be associated with one or more time periods of communication resources allocated to the UE 115. For example, as shown in FIG. 5, the fifth RFI 510-*e* may be associated with a first slot 525-*a*, a second slot 525-*b*, a third slot 525-*c*, and a fourth slot 525-*d*. Additionally, the fifth RFI 510-*e* may include a storage object 515 (e.g., table, index) including one or more joint time-frequency formats 520. For example, the storage object 515 may include first joint time-frequency format 520-*a*, a second joint time-frequency format 520-*b*, and a third joint time-frequency format 520-*c*. The joint time-frequency formats 520 may indicate both a resource format (e.g., uplink format, downlink format, full-duplex format) associated with each slot 525, as well as a frequency resource allocation for each slot 525 including a full-duplex format.

Accordingly, in some aspects, the UE 115 may determine a resource format for each slot 525 based on the fifth RFI 510-e and the time resource allocation scheme of the configuration for interpreting RFIs 510. Additionally, the UE 115 may determine a frequency resource allocation for each full-duplex slot 525 based on the fifth RFI 510-e and the frequency resource allocation scheme of the configuration for interpreting RFIs 510.

In some aspects, the frequency resource allocations indicated in the joint time-frequency formats 520 may include frequency resources for uplink communications and downlink communications. In some cases, the frequency resource allocations indicated in the joint time-frequency formats 520 may include a guard band between frequency resources for uplink communications and frequency resources for downlink communications. Additionally or alternatively, the frequency resource allocations indicated in the joint time-frequency formats 520 may include an overlap between frequency resources for uplink communications and frequency resources for downlink communications.

Figure 6:
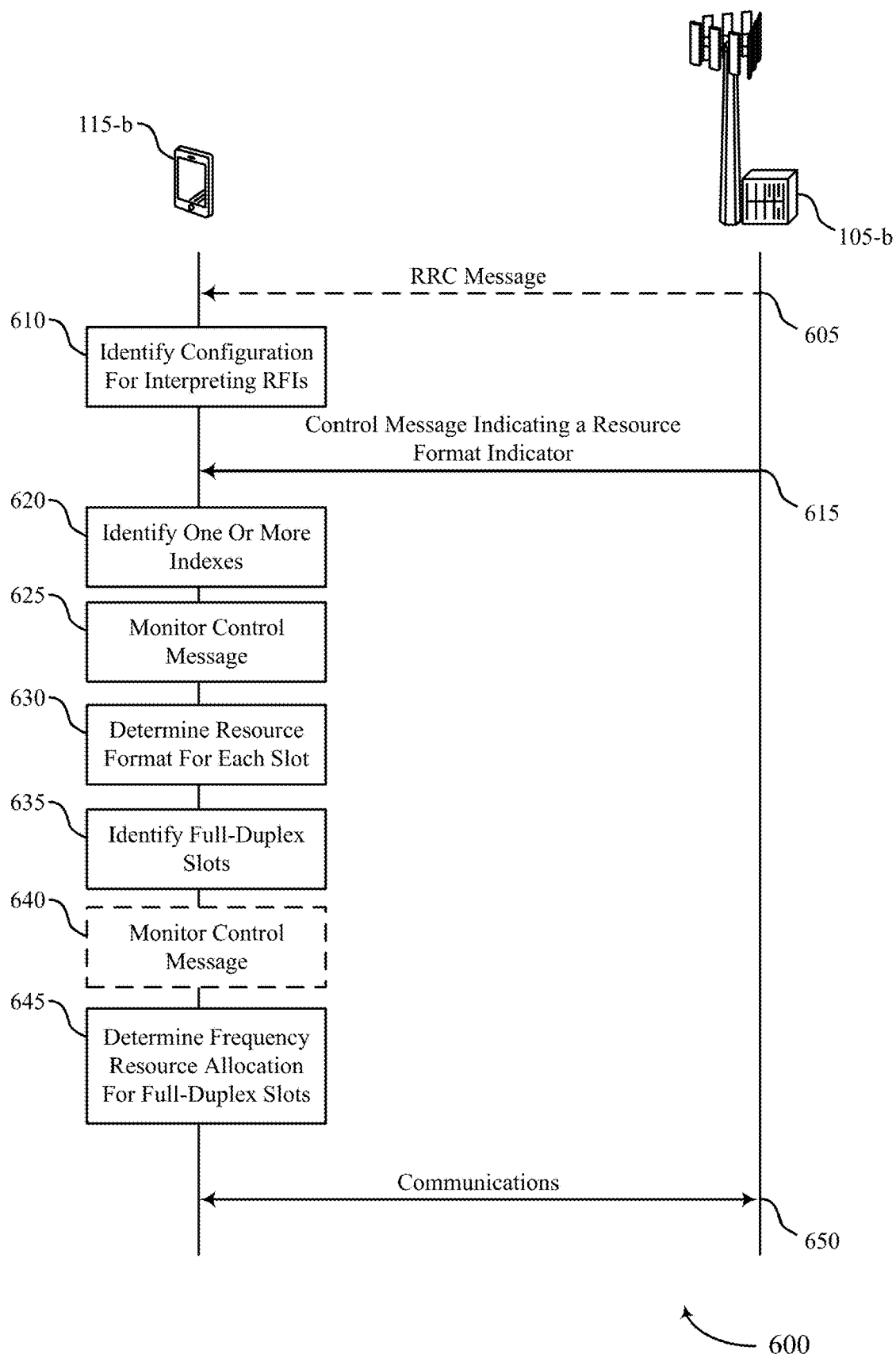
FIG. 6 illustrates an example of a process flow that supports RFIs in BWP management for full-duplex resource allocation in accordance with aspects of the present disclosure.

FIG. 6 illustrates an example of a process flow 600 that supports RFIs in BWP management for full-duplex resource allocation in accordance with aspects of the present disclosure. In some examples, process flow 600 may implement, or be implemented by, aspects of wireless communications systems 100 or 200 or resource allocation schemes 300, 400, or 500. For example, the process flow 600 may illustrate identifying a configuration for interpreting RFIs, determining a resource format for one or more slots, determining a frequency resource allocation for full-duplex slots, and communicating based on the determined resource formats and/or determined frequency resource allocations, as described with reference to FIGS. 1 through 5, among other aspects. The process flow 600 may include a UE 115-b and a base station 105-b, which may be examples of UEs 115 and base stations 105, as described with reference to FIGS. 1 and 2.

In some examples, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 605, the base station 105 may transmit an RRC message including an indication of a configuration for interpreting RFIs (e.g., SFIs) associated with the UE 115-b. The RFIs may indicate one or more resource formats associated with one or more time periods of communication resources allocated to the UE 115-b. For example, the one or more resource formats indicated by the RFIs may include a downlink format, an uplink format, or a full-duplex format. In this regard, the indication of the configuration for interpreting RFIs may include a configuration for how the UE 115-b is to interpret index values of an RFI, and determine resource formats based on the index value.

In additional or alternative aspects, the configuration for interpreting RFIs indicated in the RRC message may include a time resource allocation scheme and a frequency resource allocation scheme. In this regard, the configuration indicated to the UE 115-b may include a configuration for interpreting both resource formats and frequency resource allocations based on RFIs. In this regard, the configuration for interpreting RFIs may include a joint-configuration which is used to determine both time and frequency resources.

At 610, the UE 115-b may identify the configuration for interpreting RFIs. In some aspects, the UE 115-e may identify the configuration for interpreting RFIs based on receiving the RRC message from the base station at 605. Additionally or alternatively, the UE 115-b may be preconfigured with the configuration for interpreting RFIs, and may thereby identify the configuration at 610 without receiving the RRC message at 605. In some aspects, the UE 115-b may identify the configuration for interpreting RFIs based on a capability of the UE 115-b to recognize full-duplex formats.

In some aspects, the UE 115-b may identify one or more configurations for interpreting RFIs. For example, in some cases, the UE 115-b may identify a first configuration associated with RFIs indicating a single time period (e.g., single slot) including a set of symbols having a full-duplex format, and may identify a second configuration associated with RFIs indicating a two or more time periods (e.g., single slot) including a set of symbols having a full-duplex format.

At 615, the UE 115-b may receive a control message from the base station 105-b. The control message may include an RFI (e.g., SFI) for one or more time periods (e.g., slots) of communication resources allocated to the UE 115-b. The control message may include DCI, GC-DCI, or the like. For example, the control message may include an enhanced DCI (e.g., DCI 2_0, DCI 2_x) which is used to indicate both resource formats (e.g., uplink format, downlink format, full-duplex format) as well as frequency resource allocations for slots having a full-duplex format. In some aspects, at least one time period (e.g., at least one slot) of the one or more time periods allocated to the UE 115-b and associated with the control message may include a time period (e.g., slot) including a set of symbols having a full-duplex format (e.g., full-duplex slot). In some aspects, the UE 115-b may receive the control message at 615 based on a capability of the UE 115-b to recognize full-duplex formats.

At 620, the UE 115-b may identify one or more indexes associated with the UE 115-b. The one or more indexes may include indications for the UE 115-b to monitor certain portions of the control message which are pertinent to the UE 115-b. In some aspects, the UE 115-b may identify the one or more indexes based on the RRC message received at 605, the control message received at 615, other signaling from the base station 105-b, or any combination thereof. Moreover, the UE 115-b may identify the one or more indexes based on a capability of the UE 115-b to recognize full-duplex formats. For example, the first few slots of the control message received at 615 may include one or more indexes indicating portions of the control message that the UE 115-b is to monitor to determine resource allocations. For instance, the UE 115-b may identify, within the control message, an index associated with the UE 115-b, where the index indicates a position of an RFI associated with the UE 115-b within the control message.

In some aspects, the UE 115-b may identify a single index which indicates for the UE 115-b to monitor one or more portions of the control message. Additionally or alternatively, the UE 115-b may identify multiple indexes which indicate for the UE 115-b to monitor multiple portions of the control message. For example, in some cases, the UE 115-b may identify a first index within the control message, where the first index indicates for the UE 115-b to monitor a first portion of the control message. Continuing with the same example, the UE 115-b may identify a second index within the control message, where the second index indicates for the UE 115-b to monitor a second portion of the control message which is different from the first portion. For instance, the first portion of the control message indicated by the first index may include an RFI, and the second portion of the control message indicated by the second index may include a portion of the control message which is reserved for indications of frequency resource allocations for the RFIs included within the control message.

At 635, the UE 115-b may monitor the control message, or portions of the control message. In some aspects, the UE 115-b may monitor the control message, or portions of the control message, based on identifying the one or more indexes at 620. For example, in cases where the UE 115-b identifies a single index indicating a position of an RFI within the control message, the UE 115-b may monitor the portion of the control message including the RFI based on identifying the indication. By way of another example, in cases where the UE 115-b identifies a first index indicating a position of an RFI within the control message, and a second index indication a position of the control message reserved for indications of frequency resource allocations, the UE 115-b may monitor portions of the control message including the RFI and the portion of the control message reserved for indications of frequency resource allocations.

At 630, the UE 115-b may determine a resource format (e.g., uplink format, downlink format, full-duplex format) for each time period (e.g., each slot) allocated to the UE 115-b. In some aspects, the UE 115-b may determine the resource formats at 630 based on the RRC message at 605, identifying the configuration for interpreting RFIs at 610, receiving the control message and RFI at 615, identifying the one or more indexes at 620, monitoring the control message at 625, or any combination thereof. For example, the UE 115-b may determine a resource format for each time period based on at least a portion of the RFI.

At 635, the UE 115-b may identify one or more time periods (e.g., slots) including a set of symbols having a full-duplex format. In this regard, the UE 115-b may identify one or more slots having a full-duplex format. In some aspects, the UE 115-b may identify the one or more time periods including sets of symbols having a full-duplex format based on receiving the RRC message including the configuration at 605, identifying the configuration at 610, receiving the control message and RFI at 615, identifying the one or more indexes at 620, monitoring the control message at 625, determining the resource format for each slot at 635, or any combination thereof.

At 640, the UE 115-b may monitor the control message. In some aspects, the UE 115-b may monitor the control message for portions of the control message associated with frequency resource allocations of the one or more full-duplex slots identified at 635. In this regard, the UE 115-b may monitor one or more portions of the control message based on identifying the one or more full-duplex slots at 635. For example, in cases where the UE 115-b identifies one or more slots including a set of full-duplex symbols at 635, the UE 115-b may monitor portions of the RFI and/or portions of the control message reserved for indications of frequency resource allocations. By way of another example, in cases where the UE 115-b does not identify any full-duplex symbols at 635, the UE 115-b may refrain from monitoring portions of the RFI and/or portions of the control message reserved for indications of frequency resource allocations.

At 645, the UE 115-b may determine a frequency resource allocation for the one or more slots including sets of symbols having a full-duplex format. In some aspects, the UE 115-b may determine the frequency resource allocation for the slots including sets of symbols with a full-duplex format based on receiving the RRC message including the configuration at 605, identifying the configuration at 610, receiving the control message and RFI at 615, identifying the one or more indexes at 620, monitoring the control message at 625, determining the resource format for each slot at 635, monitoring the control message at 645, or any combination thereof.

For example, in cases where the UE 115-b determines a resource format for each slot based on a first portion (e.g., first bit) of the RFI at 630, the UE 115-b may determine the frequency resource allocation at 645 based on a second portion (e.g., second bit) of the RFI. By way of another example, the UE 115-b may determine the frequency resource allocation at 645 based on a portion of the control message reserved for indications of frequency resource allocations for the RFIs of the control message.

In cases where the UE 115-b identifies two or more slots including sets of symbols with a full-duplex format, the UE 115-b may determine multiple frequency resource allocations at 645. For example, at 635, the UE 115-b may identify a first slot including a first set of symbols having a full-duplex format, and a second slot including a second set of symbols having a full-duplex format. In this example, the UE 115-b may determine the resource format for each slot based on a first portion (e.g., first bit) of the RFI, determine a first frequency resource allocation for the first set of symbols having the full-duplex format based on a second portion (e.g., second bit) of the RFI, and determine a second frequency resource allocation for the second set of symbols having the full-duplex format based on a third portion (e.g., third bit) of the RFI. By way of another example, the UE 115-b may determine frequency resource allocations for both the first and second sets of symbols having the full-duplex format based on a portion of the control message reserved for indications of frequency resource allocations.

At 650, the UE 115-b may communicate with the base station 105-b. In some aspects, the UE 115-b may communicate with the base station 105-b based on determining the resource format for each slot at 630 and determining the frequency resource allocation at 645. For example, the UE 115-b may transmit uplink transmissions to the base station 105-b based on the determined resource formats and frequency resource allocations, and may receive downlink transmissions from the base station 105-b based on the determined resource formats and frequency resource allocations.

The techniques described herein may provide for more flexible resource allocations. In particular, techniques described herein may support signaling for full-duplex formats, as well as signaling for frequency resource allocations associated with time periods including symbols having a full-duplex format. Moreover, by sending a single GC-DCI transmission to a group of UEs 115 which indicates RFIs (e.g., SFIs), the base station 105-b may decrease the control signaling used to communicate RFIs, thereby reducing resource and messaging overhead within wireless communications systems.

Figure 7:
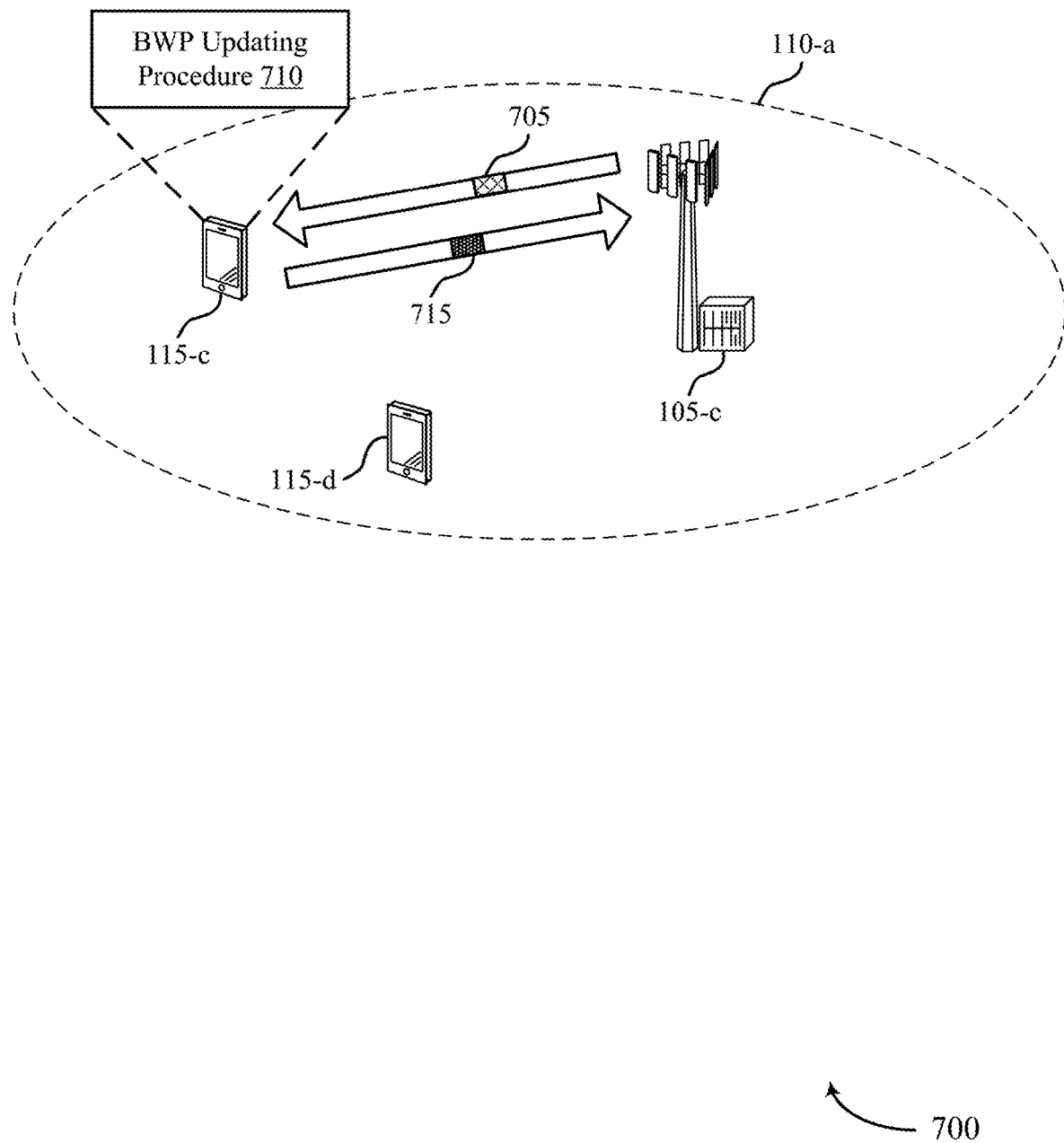
FIG. 7 illustrates an example of a wireless communications system that supports RFIs in BWP management for full-duplex resource allocation in accordance with aspects of the present disclosure.

FIG. 7 illustrates an example of a wireless communications system 700 that supports RFIs in BWP management for full-duplex resource allocation in accordance with aspects of the present disclosure. In some examples, the wireless communications system 700 may implement aspects of wireless communications systems 100 or 200. Wireless communications system 700 may include base station 105-c, UE 115-c, and UE 115-d, which may correspond to a base station 105 and UEs 115 as described with reference to FIGS. 1 and 2. Base station 105-c may be associated with coverage area 110-*a*, and UE 115-*c* and UE 115-*d* may communicate with base station 105-*c*. UE 115-*c* may perform a BWP updating procedure 710 based on receiving a control message 705 (e.g., a GC-DCI message) from base station 105-*c* to dynamically update an active BWP for communication.

UE 115-*c* and UE 115-*d* may be associated with base station 105-*c*. In some cases, UE 115-*c* may be pre-configured with a frequency resource table, while in some additional or alternative cases, UE 115-*c* may generate a frequency resource table as part of an RRC procedure. For example, base station 105-*c* may transmit an RRC configuration message indicating configurations for the frequency resource table to UE 115-*c*. The frequency resource table may include a number of frequency resource configurations for a component carrier. For example, the frequency resource table may include a number of configurations that allocate uplink and downlink frequency resources within a component carrier.

UE 115-*c* may communicate with base station 105-*c* in accordance with an operating BWP. For example, UE 115-*c* may be configured with the operating BWP as part of an RRC procedure or based on other UE-specific signaling. The operating BWP may include an active uplink BWP, an active downlink BWP, or both for a component carrier in which UE 115-*c* may communicate. UE 115-*c* may receive a control message 705 (e.g., a GC-DCI message) in accordance with the operating BWP. The control message 705 may include a resource format indication, such as an SFI, for UE 115-*c*. An SFI may indicate one or more slot formats (e.g., an uplink format, a downlink format, a flexible format, a full-duplex format, or any other format including combinations of these formats) and a set of frequency resources (e.g., a slot frequency format, a BWP pair, or a BWP and an RBW). In some cases, the control message 705 may include the set of frequency resources based on the SFI indicating a full-duplex format (e.g., a format including one or more symbols allocated for uplink and downlink communications) for one or more slots. In some cases, the base station 105-*c* may transmit a GC-DCI to UE 115-*c* and UE 115-*d*. UE 115-*c* may identify a relevant SFI based on an SFI position or index associated with UE 115-*c*, while UE 115-*d* may identify a relevant SFI (e.g., a different SFI or the same SFI) based on an SFI position or index associated with UE 115-*d*.

UE 115-*c* may perform a BWP updating procedure 710 based on receiving the control message 705. For example, UE 115-*c* may perform the BWP updating procedure 710 based on receiving a GC-DCI message that indicates a set of frequency resources for UE 115-*c*, indicates a slot corresponding to a full-duplex format for UE 115-*c*, or both. As part of the BWP updating procedure 710, UE 115-*c* may modify the operating BWP based on the set of frequency resources indicated in the control message 705. In some cases, the set of frequency resources may correspond to a slot frequency format, and UE 115-*c* may modify the operating BWP by reducing the operating BWP to frequency resources of the operating BWP that overlap with the frequency resources of the slot frequency format. Reducing an operating BWP to frequency resources that overlap with a slot frequency format may reduce system latency (e.g., as compared to performing a BWP switching procedure, which may involve channel estimation procedures or other calibration processes to determine parameters for communicating in the switched BWP).

In some other examples, as part of the BWP updating procedure 710, UE 115-*c* may modify the operating BWP by switching the operating BWP to the set frequency resources indicated in the control message 705 (e.g., a different operating BWP). The set of frequency resources may correspond to a slot frequency format, and UE 115-*c* may modify the operating BWP by switching the operating BWP to the slot frequency format indicated in the control message 705. For example, a full-duplex UE may update the operating BWP to an uplink band and a downlink band indicated by the slot frequency format information and operate in a full-duplex mode. In some additional or alternative examples, a full-duplex aware UE (e.g., a UE that may identify full-duplex resources but may operate in a half-duplex mode) may switch the operating BWP to a new BWP indicated by the slot frequency format information and operate in a half-duplex mode.

In some cases, the set of frequency resources indicated in the control message 705 may correspond to a BWP identifier (ID), and UE 115-*c* may modify the operating BWP based on the BWP ID. For example, UE 115-*c* may be configured with a number of BWP IDs (e.g., for a component carrier, based on an RRC procedure). The control message 705 may indicate a BWP ID, and UE 115-*c* may modify the operating BWP based on the indicated BWP ID (e.g., by switching to an uplink and downlink BWP pair corresponding to the BWP ID). In some additional or alternative examples, the set of frequency resources indicated in the control message 705 may correspond to a BWP and an RBW (e.g., a usable portion of the bandwidth for UE 115-*c*) for the BWP.

UE 115-*c* may transmit an uplink message 715 to base station 105-*c* based on the BWP updating procedure 710. For example, UE 115-*c* may transmit the uplink message 715 to base station 105-*c* according to the resources indicated in the control message 705. In some cases, UE 115-*c* and base station 105-*c* may communicate according to a full-duplex mode of operation, in which UE 115-*c* may receive a downlink message concurrent to transmitting the uplink message 715. The downlink transmissions and uplink transmission may occur in the modified operating BWP for UE 115-*c*. In some examples, base station 105-*c* may perform a similar BWP updating procedure 710 to UE 115-*d* to track the active BWPs for communications with UE 115-*d*.

Figure 8:
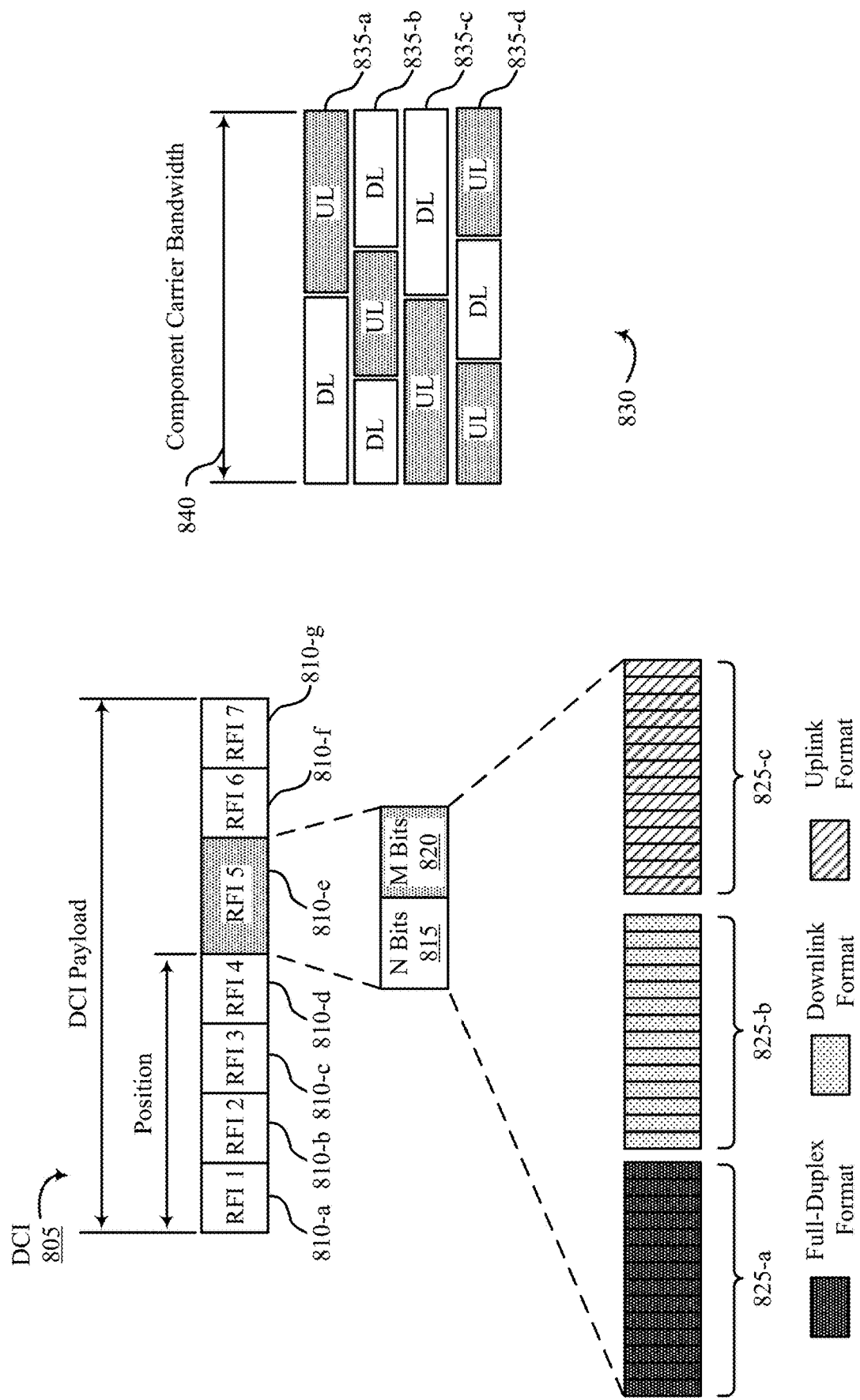
FIGS. 8 through 10 illustrate examples of resource allocation schemes that support RFIs in BWP management for full-duplex resource allocation in accordance with aspects of the present disclosure.

FIG. 8 illustrates an example of a resource allocation scheme 800 that supports RFIs in BWP management for full-duplex resource allocation in accordance with aspects of the present disclosure. In some example, the resource allocation scheme 800 may implement aspects of wireless communications systems 100, 200, or 700. Aspects of the resource allocation scheme 800 may be implemented by a UE 115, the components of a UE 115, a base station 105, or the components of a base station 105 as described herein.

The resource allocation scheme 800 may be based on a DCI 805 (e.g., a DCI message of DCI format 2_0, enhanced DCI format 2_0, or any other DCI format supporting information for a group of UEs 115, DCI 2_X). The resource allocation scheme 800 may illustrate how a full-duplex or full-duplex aware UE 115 may be configured for communications with a base station 105. The DCI 805 may be an example of the control message 705 described with reference to FIG. 7. In some cases, the DCI 805 may include a DCI payload including RFI 810-*a*, RFI 810-*b*, RFI 810-*c*, RFI 810-*d*, RFI 810-*e*, RFI 810-*f*, and RFI 810-*g*. In some cases, the DCI payload may include additional or alternative information for a group of UEs 115.

A UE 115 may identify a configuration for interpreting RFIs 810. The UE 115 may receive a control message including one or more RFIs 810 and may determine slot information based on the configuration. For example, as shown in FIG. 8, the UE 115 may receive a DCI 805, where the DCI 805 includes a set of RFIs 810. The UE 115 may identify one or more indexes associated with the UE 115, where the one or more indexes indicate a position of an RFI 810 associated with the UE 115. For example, as described with reference to FIG. 7, UE 115-c may identify an RFI at a first index (e.g., RFI 810-e) and UE 115-d may identify an RFI at a second index (e.g., RFI 810-a). In this way, the DCI 805 may be a GC-DCI; a group of UEs 115 may receive the DCI 805 and determine different, UE-specific information from the DCI 805. In some cases, the one or more indexes may be indicated via an RRC message, within a bit field of a DCI message, or any combination thereof. For example, the UE 115 may identify an index in an RRC configuration message (e.g., a positionInDCI value), where the index indicates a position of an RFI 810 associated with the UE 115. The index may indicate one or more RFIs 810 within the DCI 805 associated with one or more component carriers of the UE 115. In some cases, the UE 115 may identify a first index indicating a first RFI 810 associated with a first component carrier of the UE 115 and a second index indicating a second RFI 810 associated with a second component carrier of the UE 115.

RFI 810-e may be associated with one or more time periods (e.g., slots 825) of communication resources allocated for the UE 115. For example, as shown in FIG. 8, RFI 810-e may be associated with a first slot 825-a, a second slot 825-b, and a third slot 825-c. The UE 115 may decode the RFI 810-e based on identifying the one or more indexes. The RFI 810-e may include a first portion 815 (e.g., including N bits) and a second portion 820 (e.g., including M bits). In some cases, the UE 115 may decode the first portion 815 of the RFI 810-e based on identifying the one or more indexes and may decode the second portion 820 based on information included in the first portion 815.

The first portion 815 of the RFI 810-e may configure time resource information for one or more UEs 115. In some cases, the first portion 815 of the RFI 810-e may indicate a resource format for each slot 825 associated with the RFI 810-e. For example, as shown in FIG. 8, the first portion 815 of the RFI 810-e may indicate a full-duplex format associated with the first slot 825-a, a downlink format associated with the second slot 825-b, and an uplink format associated with the third slot 825-c. A slot 825 may contain any combination of full-duplex format symbols, downlink format symbols, uplink format symbols, or flexible format symbols. The UE 115 may determine a resource format for each time period (e.g., each slot 825, each symbol of each slot 825, etc.) associated with RFI 810-e based on the first portion 815 of the RFI 810-e.

In some cases, the UE 115 may identify one or more time periods (e.g., one or more slots 825) that include symbols corresponding to a full-duplex format based on the first portion 815 of the RFI 810-e. If the UE 115 identifies one or more slots 825 that include symbols corresponding to a full-duplex format, the UE 115 may decode a subsequent portion of the RFI 810-e to identify a set of frequency resources 835 of the frequency resource allocation. The UE 115 may store a frequency resource table 830 associated with a component carrier 840 in memory. This frequency resource table 830 may be pre-configured at the UE 115 or configured by a base station 105 (e.g., using RRC signaling). In some cases, the UE 115 may identify an indication of a set of frequency resources 835 based on a slot 825 including one or more symbols associated with a full-duplex format or the second portion 820 of the RFI 810-e including the indication of the set of frequency resources 835.

For example, as shown in FIG. 8, the UE 115 may identify that the first slot 825-a includes symbols having a full-duplex format and may decode the second portion 820 of the RFI 810-e to determine a set of frequency resources 835 from the frequency resource table 830. For example, the frequency resource table 830 (e.g., a lookup table in memory or some other format for storing multiple sets of frequency resource allocations) may include a first set of frequency resources 835-a, a second set of frequency resources 835-b, a third set of frequency resources 835-c, and a fourth set of frequency resources 835-d. In some cases, the frequency resource table 830 may be associated with a component carrier, and the UE 115 may be associated with multiple components carriers. The second portion 820 of the RFI 810-e may indicate a set of frequency resources 835 of the frequency resource table 830, a specific component carrier 840, or a combination thereof.

In some examples, the number of bits, M, included in the second portion 820 of the RFI 810-e may be based on the number of configured sets of frequency resources 835 at the UE 115. For example, to support a selection between four sets of frequency resources 835, the second portion 820 may include 2 bits, with a bit value {00} indicating the first set of frequency resources 835-a, a bit value {01} indicating the second set of frequency resources 835-b, a bit value {10} indicating the third set of frequency resources 835-c, and a bit value {11} indicating the fourth set of frequency resources 835-d. As such, the size of the second portion 820 of the RFI 810-e may be dynamic (e.g., based on the indication options for the UE 115). Similarly, the number of bits, N, for the first portion 815 of the RFI 810-e may be dynamic based on the indication options for slot format combinations. For example, the UE 115 may store a number of slot format combination IDs corresponding to combinations of slot formats, and the base station 105 may indicate a slot format combination (e.g., the combination of slot 825-a, slot 825-b, and slot 825-c) using a bit value in the first portion 815 to indicate a slot format combination ID.

A set of frequency resources 835 of the frequency resource table 830 may correspond to a slot frequency format, a BWP pair, a BWP and an RBW, or some combination of these or other frequency allocations. The UE 115 may modify an operating BWP (e.g., an active uplink BWP and an active downlink BWP) based on the indicated set of frequency resources 835. In some examples, the UE 115 may modify the operating BWP upon determining the indicated set of frequency resources 835. In some other examples, the UE 115 may modify the operating BWP prior to the slot 825 including one or more full-duplex format symbols (e.g., slot 825-a). The UE 115 may continue to communicate according to the modified operating BWP in subsequent slots 825 (e.g., even in slots 825 not including full-duplex format symbols). In some cases, a set of frequency resources 835 may include a guard band between frequency resources for uplink communications and frequency resources for downlink communications. Additionally or alternatively, a set of frequency resources 835 may include an overlap between frequency resources for uplink communications and frequency resources for downlink communications.

Figure 9:
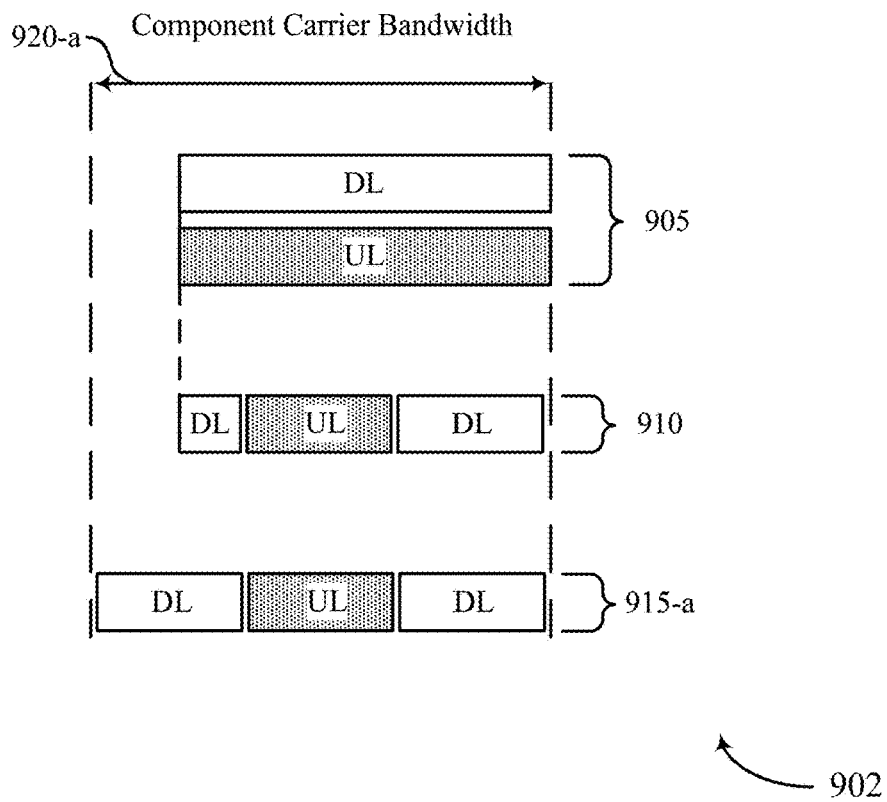
Figure 9:
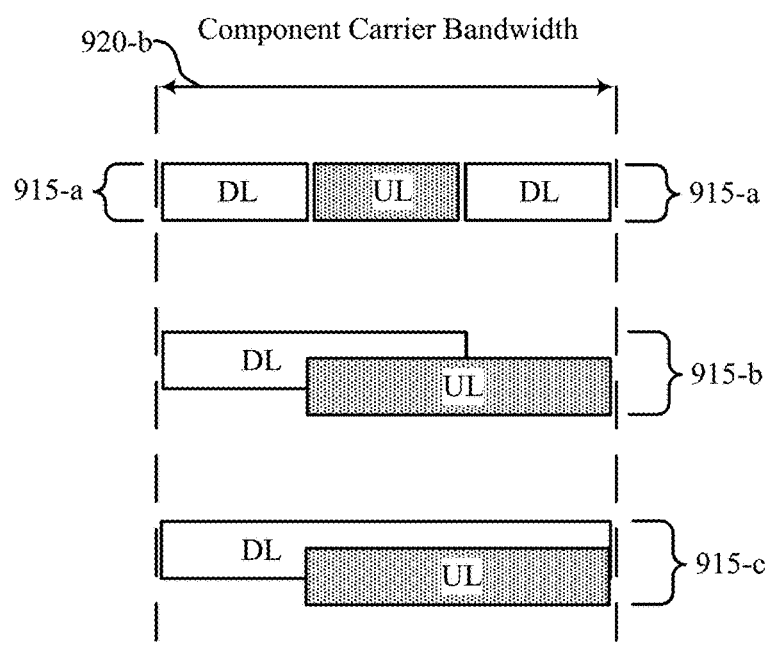

FIG. 9 illustrates an example of resource allocation schemes 901 and 902 that support RFIs in BWP management for full-duplex resource allocation in accordance with aspects of the present disclosure. In some examples, the resource allocation schemes 901 and 902 may implement aspects of wireless communications systems 100, 200, or 700. The techniques described in reference to resource allocation schemes 901 and 902 may be implemented by a UE 115 or its components as described herein. Additionally or alternatively, a base station 105 or its components may implement one or more of the techniques described herein to track operating (e.g., active) BWPs for one or more UEs 115.

A UE 115 may be associated with an operating BWP 905, receive a downlink message (e.g., a control message 705 as described with reference to FIG. 7, a DCI 805 as described with reference to FIG. 8), and modify the operating BWP 905 based on the received downlink message. In some cases, the UE 115 may be a full-duplex UE or a full-duplex aware UE, and the downlink message may indicate one or more resources corresponding to a full-duplex format. Modifying an operating BWP 905 based on receiving the downlink message may improve resource efficiency and reduce communication latency.

The UE 115 may be associated with an operating BWP 905 corresponding to component carrier 920-a. In some cases, component carriers 920-a and 920-b may correspond to the same component carrier of the UE 115. In some cases, the operating BWP 905 may include an uplink BWP and a downlink BWP. The uplink BWP may include a set of frequency resources allocated for the UE 115 to transmit uplink messages and the downlink BWP may include a set of frequency resources allocated for the UE 115 to receive downlink messages. The UE 115 may receive a downlink message from the base station 105 that includes an SFI indicating a set of frequency resources 915 (e.g., frequency resources 915-a), modify the operating BWP 905 based on the set of frequency resources 915, and communicate with the base station using the modified BWP.

In some cases, the UE 115 may reduce the operating BWP 905 to a modified BWP 910 such that the frequency resources of the modified BWP 910 correspond to the overlapping frequency resources of the operating BWP 905 and the indicated set of frequency resources 915-a. For example, the UE 115 may reduce the operating BWP 905 to modified BWP 910, and the frequency resources of modified BWP 910 may correspond to the overlapping uplink frequency resources and the overlapping downlink frequency resources of the operating BWP 905 and the set of frequency resources 915-a. In this way, the UE 115 may communicate using a functional BWP that may not correspond to a configured BWP for the UE 115, but instead may correspond to a subset of frequency resources for a BWP configured for the UE 115. Reducing an operating BWP 905 to frequency resources that overlap with the set of frequency resources 915 indicated in a downlink message may reduce system latency, as the UE 115 may refrain from performing a BWP switch (e.g., including channel estimation). That is, because the UE 115 has previously configured the operating BWP 905, using a reduced BWP that includes resources already configured for the operating BWP 905 (and no resources not configured for the operating BWP 905) may reduce the processing overhead associated with modifying the operating BWP.

In some cases, the UE 115 may switch the operating BWP 905 to a modified BWP such that the frequency resources of the modified BWP correspond to the set of frequency resources 915-a indicated in the downlink message. For example, the UE 115 may switch the uplink and/or downlink resources of the operating BWP 905 to the uplink and/or downlink resources of the set of frequency resources 915-a. As such, a base station 105 may trigger a BWP switch at the UE 115 using a GC-DCI message.

In some additional or alternative examples, the uplink resources of the set of frequency resources 915 may overlap with the downlink resources of the set of frequency resources 915. As shown in the set of frequency resources 915-b, a portion of the uplink resources may overlap with a portion of the downlink resources. As shown in the set of frequency resources 915-c, all of the uplink resources may overlap with a portion of the downlink resources. In some cases, the UE 115 may activate and/or deactivate a number of antennas based on the received downlink message, the modified BWP, or both. Switching the frequency resources of an operating BWP 905 based on a set of frequency resources 915 indicated in a downlink message may improve data throughput.

In some cases, the set of frequency resources 915 may correspond to a slot frequency indication. The slot frequency indication may indicate or identify a frequency format for the UE 115 (e.g., a set of frequency resources 835 as described with reference to FIG. 8). In some additional or alternative cases, the set of frequency resources 915 may correspond to a BWP indication. For example, a base station 105 may configure the UE 115 with a number of BWP frequency resource configurations to match the uplink and/or downlink frequency bands used in slots corresponding to a full-duplex format as part of an RRC procedure, and the slot frequency indication may include a BWP indication. The BWP indication may indicate or identify a pair of BWPs, including an uplink BWP and a downlink BWP for use in the slots corresponding to a full-duplex format (e.g., and, in some cases, subsequent slots after a BWP switch or reduction). For communicating with a base station 105 in slots corresponding to a full-duplex format, a full-duplex and/or a full-duplex aware UE may switch uplink and downlink resources to the uplink and downlink resources indicated by the BWP indication. A full-duplex aware UE may operate in a half-duplex mode during the slots that correspond to a full-duplex format. In some cases, the half-duplex pattern may be based on an RRC configuration or may be indicated in a DCI message. A full-duplex UE may operate in a full-duplex mode (e.g., concurrent uplink and downlink communication) during the slots that correspond to a full-duplex format. In some additional or alternative cases, the set of frequency resources 915 may include an indication of a BWP as well as an RBW for the BWP for the slots corresponding to a full-duplex format.

The SCS of uplink resources corresponding to the modified BWP may be the same or different from the SCS of downlink resources corresponding to the modified BWP. For example, the uplink SCS may be the same as the downlink SCS for a UE 115 operating according to a full-duplex mode (e.g., for full-duplex frequency-division duplexing (FDD) operation). In some cases, the uplink SCS may be the same as the downlink SCS because the uplink and downlink symbols corresponding to the full-duplex format may be shared within a slot (e.g., supporting concurrent downlink and uplink communications). In some additional or alternative examples, the uplink SCS may be different from the downlink SCS for a UE operating according to a half-duplex mode (e.g., for half-duplex time-division duplexing (TDD) operation by a full-duplex aware UE 115). In some cases, a downlink message (e.g., an SFI in a DCI message, an RRC configuration message, etc.) may indicate one or more SCS configurations (e.g., SCS1, SCS2), and the UE 115 may determine the SCS for the uplink resources and the SCS for the downlink resources based on the indicated one or more SCS configurations.

A UE 115 may modify the operating BWP 905 based on the set of frequency resources 915 or an indication of the set of frequency resources 915. The UE 115 may modify the operating BWP 905 based additionally or alternatively on a frequency resource table. The UE may generate or identify a number of frequency resource tables for one or more component carriers. In some cases, a frequency resource table may include one or more bit maps. For example, a bit map may indicate a communication direction (e.g., uplink or downlink) for a frequency range based on the value and index of each bit. The index of each bit may correspond to a frequency range within a component carrier, and the value of each bit may correspond to a communication direction. In some additional or alternative examples, a first bit map may be used to indicate frequency resources for a first communication direction (e.g., uplink), and a second bit map may be used to indicate frequency resources for a second communication direction. The index of each bit in the first and second bit maps may indicate a frequency resource (e.g., a resource element (RE), a resource block (RB), a resource block group (RBG), or some combination thereof) within a component carrier and the value of each bit may indicate a status (e.g., an active status, an inactive status, an available status, an unavailable status). Using an uplink bit map and a downlink bit map may improve resource flexibility. For example, the use of an uplink bit map as well as a downlink bit map may facilitate the use of guard bands between uplink and downlink resources and/or the use of overlapping uplink and downlink resources.

In some additional or alternative cases, the frequency resource table may include one or more resource indication values (RIVs) to represent a disjoint frequency allocation. An RIV may indicate both a frequency starting location (e.g., a RE, an RB, or an RBG starting location) and a number of frequency resources (e.g., a number of REs, RBs, RBGs, or a combination thereof). In some examples, the UE 115 may store one or more RIVs indicating uplink frequency resources and one or more RIVs indicating downlink frequency resources. In some cases, the frequency resource table may include a frequency resource starting location, a number of frequency resources, and one or more reserved resources. For example, for uplink resource allocation, the uplink frequency resources may span from the frequency resource starting location for the number of frequency resources, except for any reserved resources in the span (which may be reserved for downlink or no communications). The reserved resources may correspond to uplink resources, downlink resources, or a guard band. Including reserved resources in the frequency scheduling table may reduce system interference.

A half-duplex UE (e.g., a non-full-duplex UE, a non-full-duplex aware UE) may receive a set of frequency resources 915 and refrain from modifying an operating BWP 905 based on a mode of operation corresponding to the UE (e.g., a half-duplex mode). In some cases, a base station 105 may refrain from indicating frequency resources 915 to a non-full-duplex aware UE in a GC-DCI message. For example, an RFI transmitted in a GC-DCI message for one or more UEs that are not full-duplex aware may not include a second portion indicating frequency configuration information. A full-duplex UE may receive frequency information in a GC-DCI message and may consider the uplink and downlink bands of the indicated set of frequency resources 915 (or a portion that overlaps with the previous operating BWP 905) as the new operating BWP 905. A full-duplex aware UE may switch or reduce the uplink and downlink resources of the operating BWP 905 based on the indicated set of frequency resources 915 and operate in a half-duplex mode.

Figure 10:
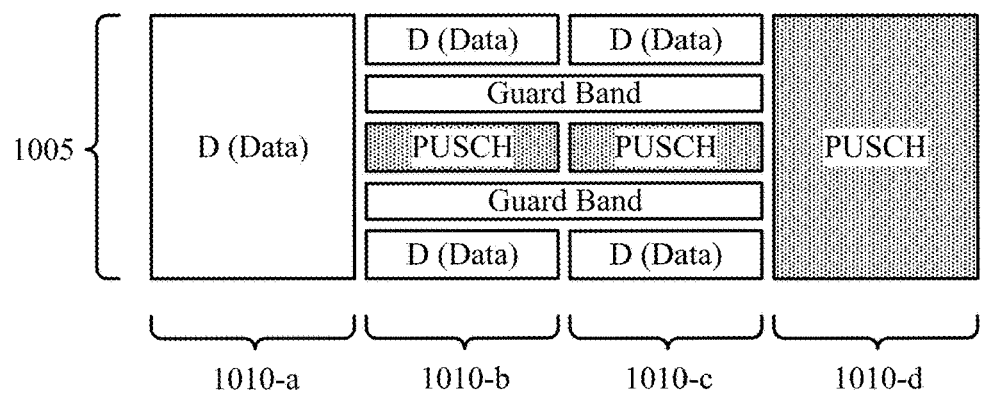
Figure 10:
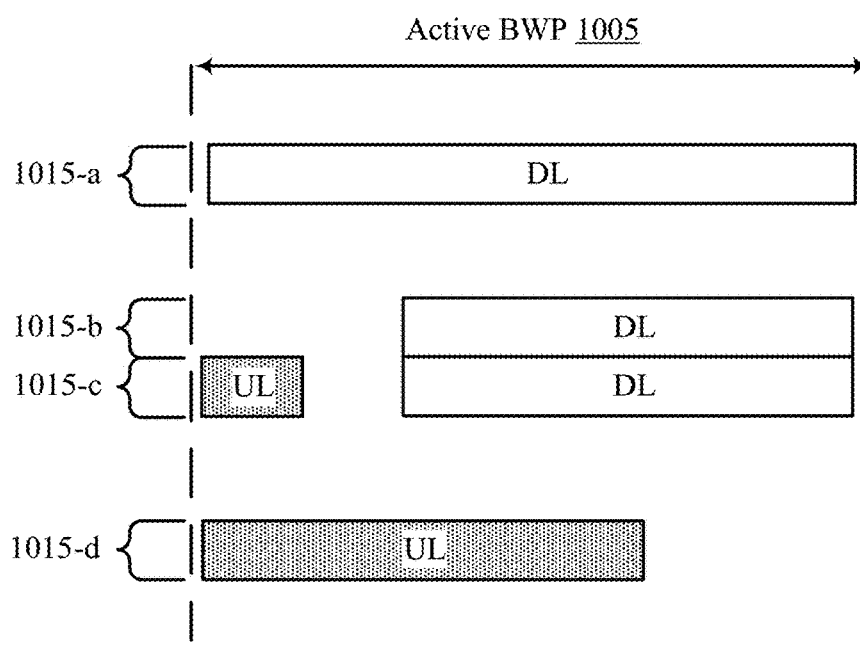

FIG. 10 illustrates an example of a resource allocation scheme 1000 that supports RFIs in BWP management for full-duplex resource allocation in accordance with aspects of the present disclosure. In some examples, the resource allocation scheme 1000 may implement aspects of the wireless communications systems 100, 200, or 700. The resource allocation scheme 1000 may support one or more RBWs indicating the usable resources in a BWP for a UE 115, as described with reference to FIGS. 7 through 9.

The frequency resource allocations indicated in a joint time-frequency format 1001 may include frequency resources for uplink communications and downlink communications. The joint time-frequency format 1001 may be associated with one or more time periods of communication resources allocated to a UE. For example, as shown in FIG. 10, the joint time-frequency format 1001 may be associated with a first slot 1010-*a*, a second slot 1010-*b*, a third slot 1010-*c*, and a fourth slot 1010-*d*.

In some cases, the frequency resource allocations indicated in the joint time-frequency format 1001 may include a guard band between frequency resources for uplink communications and frequency resources for downlink communications. For example, the usable bandwidth within a BWP may be reduced or compromised due to the uplink band (e.g., for physical uplink shared channel (PUSCH) transmission) and/or the guard band present in the second slot 1010-*b* and the third slot 1010-*c*. The RBWs 1015, as shown in 1002, may mitigate the negative effects of uplink and downlink resources both being present within a BWP. In some cases, a UE may identify an RBW 1015 based on a DCI and communicate with a base station based on the identified RBW 1015. For example, the UE may identify RBW 1015-*c* based on a frequency indication in a GC-DCI message and may transmit uplink data according to the uplink bandwidth indicated in RBW 1015-*c* and receive downlink data according to the downlink bandwidth indicated in RBW 1015-*c*. These bandwidths may be subsets of an active BWP 1005 for the UE, where the subsets support guard bands between uplink and downlink transmissions. The RBWs 1015 (e.g., RBW 1015-*a*, RBW 1015-*b*, RBW 1015-*c*, and RBW 1015-*d*) may be within the BWP of the UE, which may reduce or eliminate bandwidth switching delays associated with the UE. In some examples, a base station 105 may jointly indicate a BWP identifier (ID) and an RBW ID in a GC-DCI message to configure a UE 115 with a frequency slot format for full-duplex operation.

Figure 11:
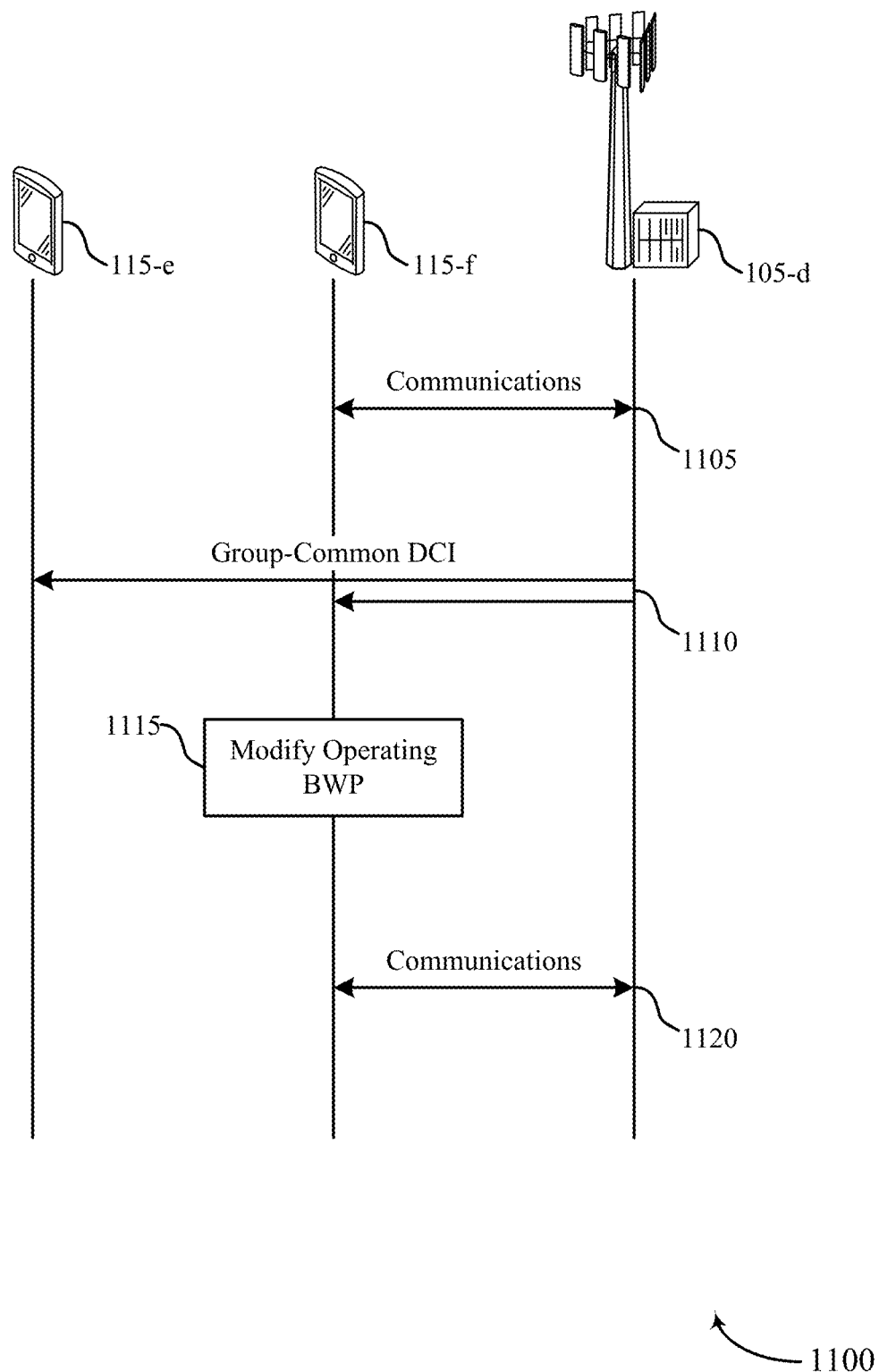
FIG. 11 illustrates an example of a process flow that supports RFIs in BWP management for full-duplex resource allocation in accordance with aspects of the present disclosure.

FIG. 11 illustrates an example of a process flow 1100 that supports RFIs in BWP management for full-duplex resource allocation in accordance with aspects of the present disclosure. In some examples, the process flow 1100 may implement aspects of the wireless communications systems 100, 200, or 700. The process flow 1100 includes base station 105-*d*, UE 115-*e*, and UE 115-*f*. These may be examples of the corresponding devices described with reference to FIGS. 1 through 10. The UE 115-*e* and/or base station 105-*d* may modify an operating (e.g., active) BWP and communicate based on the modified operating BWP. Alternative examples of the following may be implemented, where some steps are performed in a different order than described or are not performed at all. In some cases, steps may include additional features not mentioned below, or further steps may be added.

At 1105, UE 115-*e* may communicate with base station 105-*d* using an operating BWP that includes a first set of frequency resources in a carrier bandwidth. In some cases, the operating BWP may be considered an active BWP, and in some additional or alternative cases, the operating BWP may be based on an RRC procedure. The operating BWP may include an active uplink BWP and an active downlink BWP.

At 1110, UE 115-*e* may receive a GC-DCI message that includes an RFI (e.g., an SFI) indicating a second set of resources. In some cases, UE 115-*f* may additionally receive the GC-DCI. For example, the GC-DCI message may be an example of UE group common signaling and may address one or more UEs 115 based on a slot format (SF) radio network temporary identifier (RNTI) (e.g., as part of the SlotFormatIndicator parameter structure). Each of the UEs 115 may decode the GC-DCI payload, but each UE 115 may extract the information relevant to that specific UE 115. For example, UE 115-*e* may identify one or more RFIs that correspond to UE 115-*e* in the GC-DCI message (e.g., based on one or more positionInDCI values for UE 115-*e* indicating one or more starting positions for information relevant to UE 115-*e*). In some cases, the one or more RFIs may indicate a number of resource formats (e.g., an uplink format, a downlink format, a flexible format, or a full-duplex format) and a set of frequency resources (e.g., a slot frequency format, a BWP pair, or a BWP and an RBW). As such, the RFIs may support reconfiguring time resources, frequency resources, or both for flexible slots, flexible symbols, or both.

The number of bits corresponding to each RFI in the GC-DCI message may vary. For example, a UE 115 may extract from the DCI, for a single SFI, a number of bits based on the number of supported slot format combination IDs, the number of supported slot frequency format IDs, or a combination thereof. The UEs 115 may receive an indication of the actual size of the GC-DCI message, of the actual size of one or more RFIs in the GC-DCI message, or some combination thereof using a DCI-PayloadSize information element within a SlotFormatIndicator parameter structure. Using such information, UE 115-*e* may determine the second set of frequency resources allocated for UE 115-*e* in the GC-DCI message.

At 1115, UE 115-*e* may modify the operating BWP based on the second set of frequency resources. In some cases, UE 115-*e* may modify the BWP by switching the operating BWP to the second set of frequency resources, while in some additional or alternative cases, UE 115-*e* may modify the BWP by determining a set of overlapping frequency resources based on an overlap between the first set of frequency resources and the second set of frequency resources and reducing the operating BWP to the set of overlapping frequency resources.

At 1120, UE 115-*e* may communicate with base station 105-*d* using the modified BWP. In some case, UE 115-*e* may communicate with base station 105-*d* based on a full-duplex mode, while in some additional or alternative cases, UE 115-*e* may communicate with base station 105-*d* based on a full-duplex aware mode.

Figure 12:
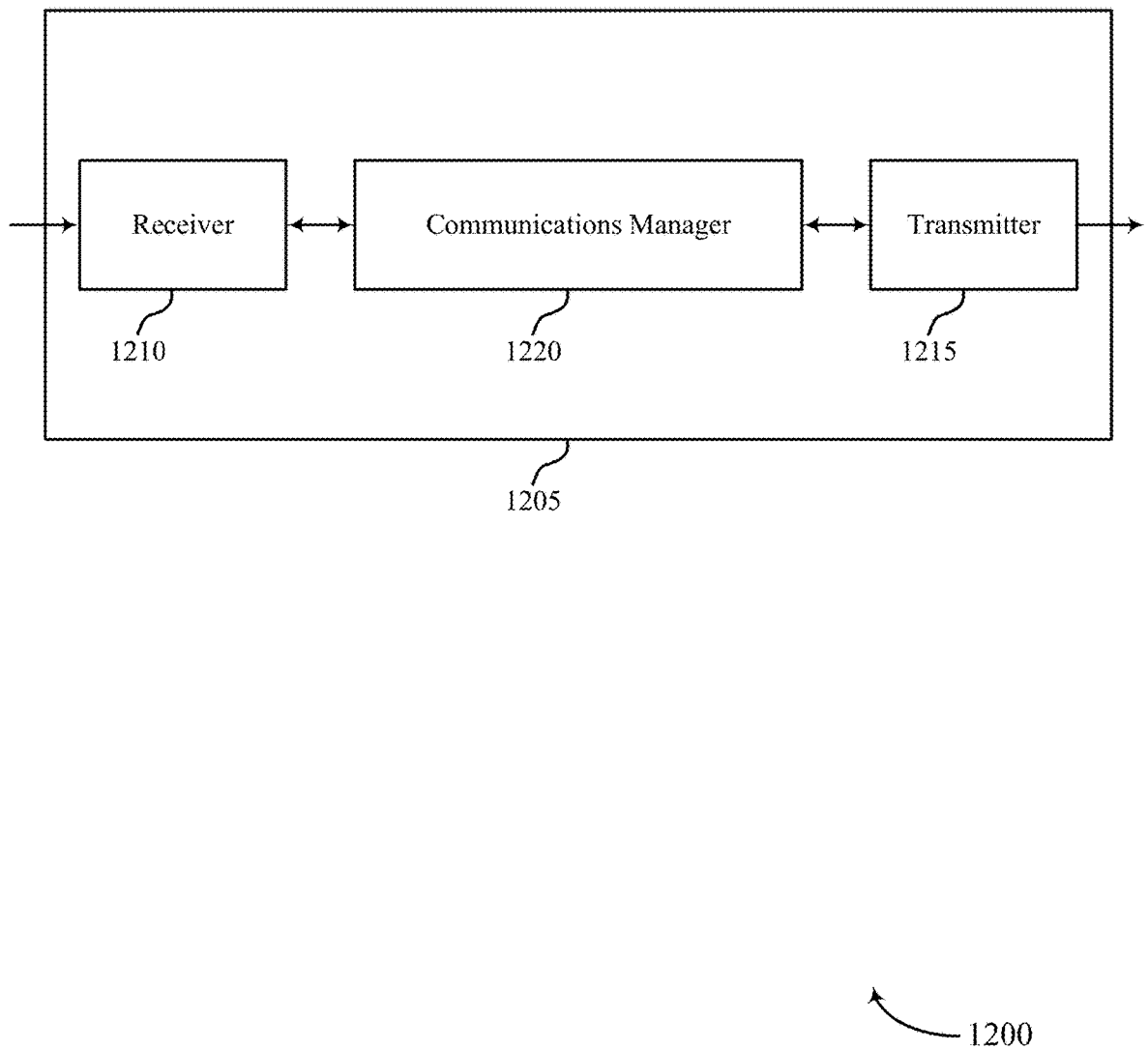
FIGS. 12 and 13 show block diagrams of devices that support RFIs in BWP management for full-duplex resource allocation in accordance with aspects of the present disclosure.

FIG. 12 shows a block diagram 1200 of a device 1205 that supports RFIs in BWP management for full-duplex resource allocation in accordance with aspects of the present disclosure. The device 1205 may be an example of aspects of a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to RFIs in BWP management for full-duplex resource allocation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to RFIs in BWP management for full-duplex resource allocation). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of RFIs in BWP management for full-duplex resource allocation as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. For example, the communications manager 1220 may be configured as or otherwise support a means for communicating with a base station using an operating BWP including a first set of frequency resources in a carrier bandwidth. The communications manager 1220 may be configured as or otherwise support a means for receiving a GC-DCI message including an RFI indicating a second set of frequency resources. The communications manager 1220 may be configured as or otherwise support a means for modifying the operating BWP based on the second set of frequency resources. The communications manager 1220 may be configured as or otherwise support a means for communicating with the base station using the modified operating BWP.

Additionally or alternatively, the communications manager 1220 may support wireless communication at a UE in accordance with examples as disclosed herein. For example, the communications manager 1220 may be configured as or otherwise support a means for identifying a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format. The communications manager 1220 may be configured as or otherwise support a means for receiving a control message including an RFI for the one or more time periods, where at least one time period of the one or more time periods includes a set of symbols having a full-duplex format. The communications manager 1220 may be configured as or otherwise support a means for determining a frequency resource allocation for uplink communications and downlink communications for the set of symbols having the full-duplex format based on the RFI and the configuration. The communications manager 1220 may be configured as or otherwise support a means for communicating with a base station based on the determined frequency resource allocation.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing and more efficient utilization of communication resources based on identifying a configuration for interpreting RFIs and receiving a GC-DCI that indicates one or more RFIs.

Figure 13:
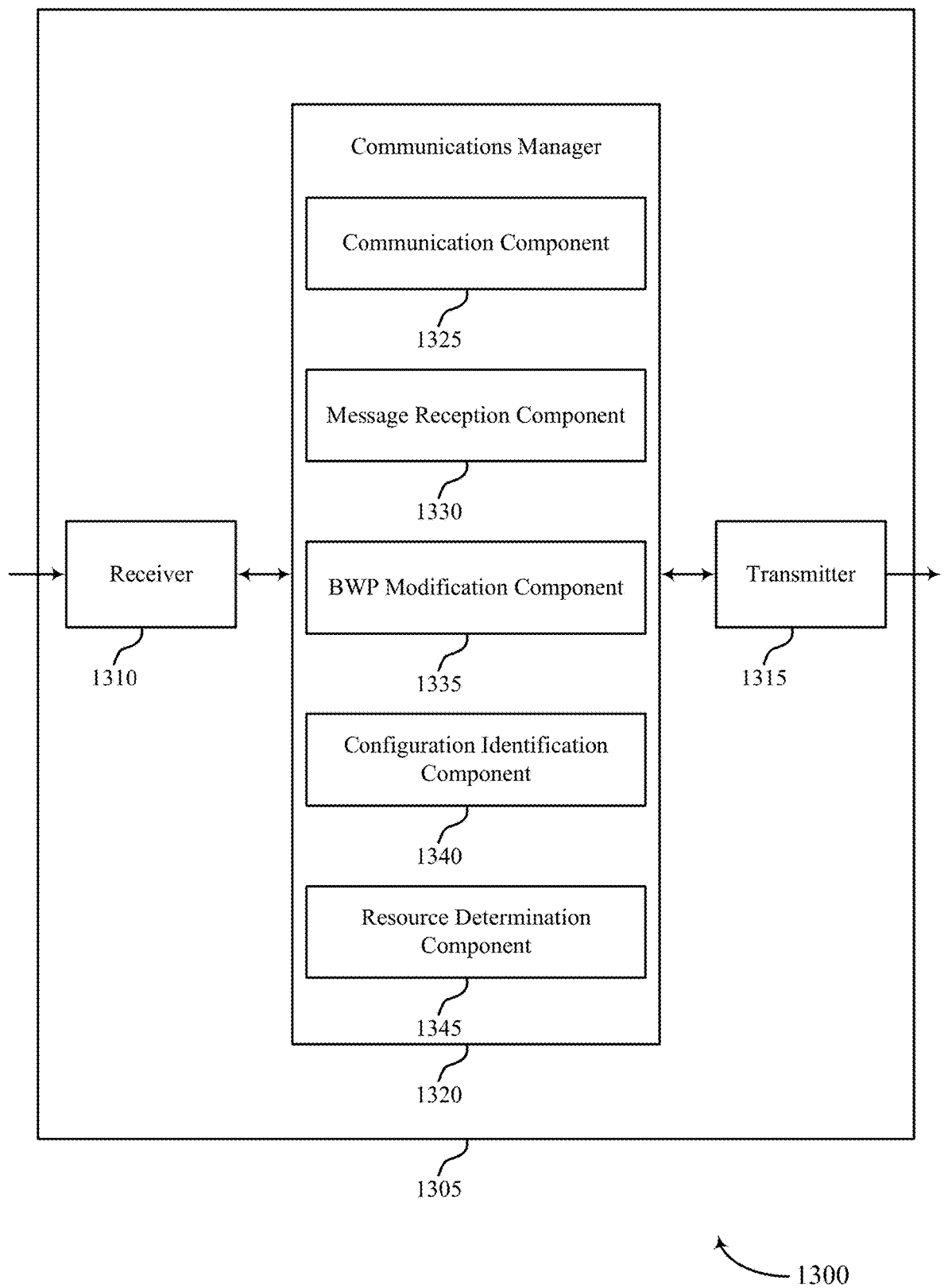

FIG. 13 shows a block diagram 1300 of a device 1305 that supports RFIs in BWP management for full-duplex resource allocation in accordance with aspects of the present disclosure. The device 1305 may be an example of aspects of a device 1205 or a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to RFIs in BWP management for full-duplex resource allocation). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to RFIs in BWP management for full-duplex resource allocation). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of RFIs in BWP management for full-duplex resource allocation as described herein. For example, the communications manager 1320 may include a communication component 1325, a message reception component 1330, a BWP modification component 1335, a configuration identification component 1340, a resource determination component 1345, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a UE in accordance with examples as disclosed herein. The communication component 1325 may be configured as or otherwise support a means for communicating with a base station using an operating BWP including a first set of frequency resources in a carrier bandwidth. The message reception component 1330 may be configured as or otherwise support a means for receiving a GC-DCI message including an RFI indicating a second set of frequency resources. The BWP modification component 1335 may be configured as or otherwise support a means for modifying the operating BWP based on the second set of frequency resources. The communication component 1325 may be configured as or otherwise support a means for communicating with the base station using the modified operating BWP.

Additionally or alternatively, the communications manager 1320 may support wireless communication at a UE in accordance with examples as disclosed herein. The configuration identification component 1340 may be configured as or otherwise support a means for identifying a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format. The message reception component 1330 may be configured as or otherwise support a means for receiving a control message including an RFI for the one or more time periods, where at least one time period of the one or more time periods includes a set of symbols having a full-duplex format. The resource determination component 1345 may be configured as or otherwise support a means for determining a frequency resource allocation for uplink communications and downlink communications for the set of symbols having the full-duplex format based on the RFI and the configuration. The communication component 1325 may be configured as or otherwise support a means for communicating with a base station based on the determined frequency resource allocation.

Figure 14:
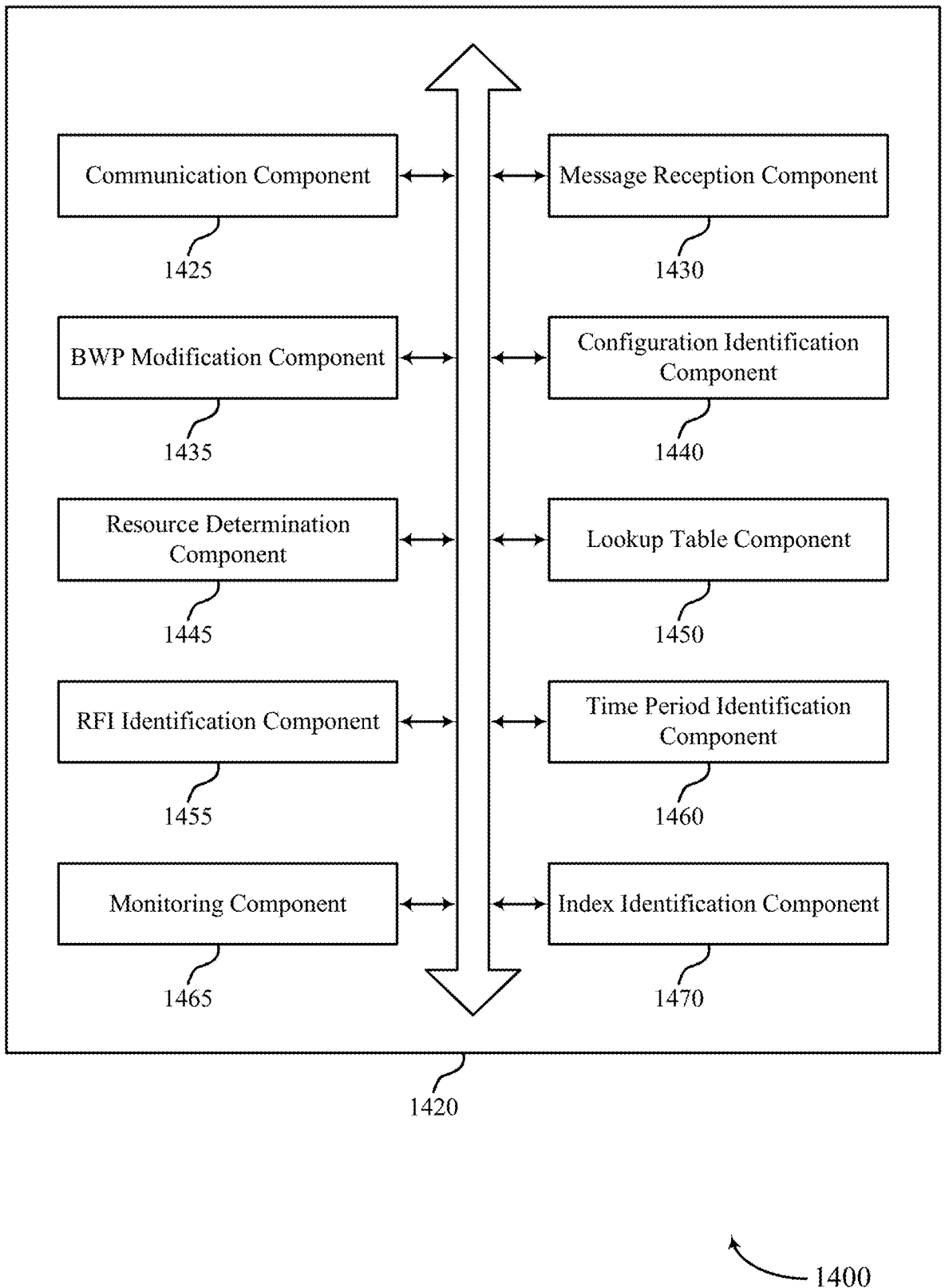
FIG. 14 shows a block diagram of a communications manager that supports RFIs in BWP management for full-duplex resource allocation in accordance with aspects of the present disclosure.

FIG. 14 shows a block diagram 1400 of a communications manager 1420 that supports RFIs in BWP management for full-duplex resource allocation in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of RFIs in BWP management for full-duplex resource allocation as described herein. For example, the communications manager 1420 may include a communication component 1425, a message reception component 1430, a BWP modification component 1435, a configuration identification component 1440, a resource determination component 1445, a lookup table component 1450, an RFI identification component 1455, a time period identification component 1460, a monitoring component 1465, an index identification component 1470, or any combination thereof. Each of these components may communicate, directly or indirectly, with one another (e.g., via one or more buses).

The communications manager 1420 may support wireless communication at a UE in accordance with examples as disclosed herein. The communication component 1425 may be configured as or otherwise support a means for communicating with a base station using an operating BWP including a first set of frequency resources in a carrier bandwidth. The message reception component 1430 may be configured as or otherwise support a means for receiving a GC-DCI message including an RFI indicating a second set of frequency resources. The BWP modification component 1435 may be configured as or otherwise support a means for modifying the operating BWP based on the second set of frequency resources. In some examples, the communication component 1425 may be configured as or otherwise support a means for communicating with the base station using the modified operating BWP. In some examples, the operating BWP includes an active uplink BWP and an active downlink BWP.

In some examples, to support modifying, the BWP modification component 1435 may be configured as or otherwise support a means for switching the operating BWP to the second set of frequency resources based on receiving the GC-DCI message. In some examples, to support switching, the BWP modification component 1435 may be configured as or otherwise support a means for switching from a first active uplink BWP to a second active uplink BWP and from a first active downlink BWP to a second active downlink BWP based on receiving the GC-DCI message.

In some examples, to support modifying, the resource determination component 1445 may be configured as or otherwise support a means for determining a set of overlapping frequency resources based on an overlap between the first set of frequency resources and the second set of frequency resources. In some examples, to support modifying, the BWP modification component 1435 may be configured as or otherwise support a means for reducing the operating BWP to the set of overlapping frequency resources based on receiving the GC-DCI message.

In some examples, the lookup table component 1450 may be configured as or otherwise support a means for storing a lookup table including a set of multiple frequency formats, where a frequency format of the set of multiple frequency formats corresponds to a set of frequency resources of a set of multiple sets of frequency resources. In some examples, the resource determination component 1445 may be configured as or otherwise support a means for determining the second set of frequency resources based on a first frequency format of the set of multiple frequency formats indicated by the RFI.

In some examples, the message reception component 1430 may be configured as or otherwise support a means for receiving, from the base station, a radio resource control configuration message indicating the set of multiple frequency formats. In some examples, the lookup table component 1450 may be configured as or otherwise support a means for configuring the lookup table based on the radio resource control configuration message.

In some examples, the lookup table includes, for a set of resources including a set of resource elements, a set of resource blocks, a set of resource block groups, or a combination thereof, a set of multiple bit maps corresponding to the set of multiple sets of frequency resources. In some examples, a bit map of the set of multiple bit maps includes a set of indication bits for the set of resources, where a first bit value for an indication bit of the set of indication bits indicates an uplink resource configured for a corresponding resource and a second bit value for the indication bit of the set of indication bits indicates a downlink resource configured for the corresponding resource.

In some examples, the lookup table includes, for a set of resources including a set of resource elements, a set of resource blocks, a set of resource block groups, or a combination thereof, a set of multiple uplink bit maps and a set of multiple downlink bit maps corresponding to the set of multiple sets of frequency resources. In some examples, an uplink bit map of the set of multiple uplink bit maps includes a set of uplink indication bits for the set of resources, where a first bit value for an uplink indication bit of the set of uplink indication bits indicates an uplink resource configured for a corresponding resource and a second bit value for the uplink indication bit of the set of uplink indication bits indicates an absence of an uplink resource configured for the corresponding resource. In some examples, a downlink bit map of the set of multiple downlink bit maps includes a set of downlink indication bits for the set of resources, where a first bit value for a downlink indication bit of the set of downlink indication bits indicates a downlink resource configured for the corresponding resource and a second bit value for the downlink indication bit of the set of downlink indication bits indicates an absence of a downlink resource configured for the corresponding resource.

In some examples, the lookup table includes one or more resource indicator values corresponding to a set of frequency resources of the set of multiple sets of frequency resources. In some examples, a resource indicator value of the one or more resource indicator values includes an indication of a starting resource and an indication of a number of resources corresponding to uplink resources or downlink resources.

In some examples, the lookup table includes an indication of a uplink starting resource, an indication of a number of uplink resources, and an indication of one or more non-uplink reserved resources and an indication of a downlink starting resource, an indication of a number of downlink resources, and an indication of one or more non-downlink reserved resources corresponding to a set of frequency resources of the set of multiple sets of frequency resources.

In some examples, the first frequency format of the set of multiple frequency formats includes a set of uplink resources, a set of downlink resources, and one or more guard bands, where the set of uplink resources is distinct from the set of downlink resources in a frequency domain and the one or more guard bands separate the set of uplink resources from the set of downlink resources in the frequency domain. In some examples, the first frequency format of the set of multiple frequency formats includes the set of uplink resources and the set of downlink resources, where the set of uplink resources at least partially overlaps with the set of downlink resources in the frequency domain.

In some examples, the RFI indicates a slot frequency format identifier corresponding to the second set of frequency resources. In some examples, the RFI indicates a BWP identifier corresponding to the second set of frequency resources. In some examples, the RFI further indicates a resource bandwidth. In some examples, the BWP identifier indicates a superset of frequency resources and the resource bandwidth indicates a set of usable resources of the superset of frequency resources, the second set of frequency resources including the set of usable resources of the superset of frequency resources.

In some examples, the GC-DCI message includes a set of multiple RFIs, and the message reception component 1430 may be configured as or otherwise support a means for receiving, from the base station, a radio resource control configuration message indicating a position index for the UE. In some examples, the GC-DCI message includes a set of multiple RFIs, and the RFI identification component 1455 may be configured as or otherwise support a means for identifying the RFI corresponding to the UE from the set of multiple RFIs corresponding to a set of multiple UEs based on the position index for the UE.

In some examples, to support communicating, the communication component 1425 may be configured as or otherwise support a means for communicating with the base station in accordance with a full-duplex mode.

In some examples, the RFI identification component 1455 may be configured as or otherwise support a means for identifying a slot configured with concurrent uplink resources and downlink resources based on the RFI. In some examples, the resource determination component 1445 may be configured as or otherwise support a means for determining a same SCS corresponding to the uplink resources and the downlink resources in the slot based on the full-duplex mode.

In some examples, to support communicating, the communication component 1425 may be configured as or otherwise support a means for communicating with the base station in accordance with a half-duplex mode.

In some examples, the RFI identification component 1455 may be configured as or otherwise support a means for identifying a slot configured with concurrent uplink resources and downlink resources based on the RFI and in accordance with a full-duplex-aware mode. In some examples, the resource determination component 1445 may be configured as or otherwise support a means for determining a first SCS corresponding to the uplink resources in the slot and a second SCS corresponding to the downlink resources in the slot based on the half-duplex mode.

Additionally or alternatively, the communications manager 1420 may support wireless communication at a UE in accordance with examples as disclosed herein. The configuration identification component 1440 may be configured as or otherwise support a means for identifying a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format. In some examples, the message reception component 1430 may be configured as or otherwise support a means for receiving a control message including an RFI for the one or more time periods, where at least one time period of the one or more time periods includes a set of symbols having a full-duplex format. In some examples, receiving the control message is based on a capability of the UE to recognize the full-duplex format. In some examples, the control message includes a GC-DCI.

The resource determination component 1445 may be configured as or otherwise support a means for determining a frequency resource allocation for uplink communications and downlink communications for the set of symbols having the full-duplex format based on the RFI and the configuration. In some examples, the frequency resource allocation for uplink communications and downlink communications for the set of symbols having the full-duplex format includes a guard band between frequency resources for uplink communications and frequency resources for downlink communications. In some examples, the frequency resource allocation for uplink communications and downlink communications for the set of symbols having the full-duplex format includes an overlap between frequency resources for uplink communications and frequency resources for downlink communications.

In some examples, the communication component 1425 may be configured as or otherwise support a means for communicating with a base station based on the determined frequency resource allocation.

In some examples, the resource determination component 1445 may be configured as or otherwise support a means for determining a resource format for each time period of the one or more time periods based on a first portion of the RFI. In some examples, the resource determination component 1445 may be configured as or otherwise support a means for identifying an indication of the frequency resource allocation in a second portion of the RFI different from the first portion.

In some examples, the index identification component 1470 may be configured as or otherwise support a means for identifying, within the control message, an index associated with the UE indicating a position of the RFI within the control message. In some examples, the monitoring component 1465 may be configured as or otherwise support a means for monitoring the first portion of the RFI based on the index. In some examples, the monitoring component 1465 may be configured as or otherwise support a means for monitoring the second portion of the RFI based on the at least one time period of the one or more time periods including the set of symbols having a full-duplex format.

In some examples, the resource determination component 1445 may be configured as or otherwise support a means for identifying an indication of the frequency resource allocation in a portion of the control message reserved for indications of frequency resource allocations for a set of multiple RFIs of the control message. In some examples, the frequency resource allocation is associated with each symbol of the set of symbols having the full-duplex format.

In some examples, the index identification component 1470 may be configured as or otherwise support a means for identifying, within the control message, a first index indicating for the UE to monitor a first portion of the control message. In some examples, the index identification component 1470 may be configured as or otherwise support a means for identifying, within the control message, a second index indicating for the UE to monitor a second portion of the control message different from the first portion, the second portion including the portion of the control message reserved for indications of frequency resource allocations for the set of multiple RFIs of the control message.

In some examples, the resource determination component 1445 may be configured as or otherwise support a means for determining a resource format for each time period of the one or more time periods based on a first portion of the RFI. In some examples, the time period identification component 1460 may be configured as or otherwise support a means for identifying a first time period of the one or more time periods including a first set of symbols having the full-duplex format and a second time period of the one or more time periods including a second set of symbols having a full-duplex format. In some examples, the monitoring component 1465 may be configured as or otherwise support a means for monitoring a second portion of the RFI based on identifying the first time period including the first set of symbols having the full-duplex format. In some examples, the monitoring component 1465 may be configured as or otherwise support a means for monitoring a third portion of the RFI based on identifying the second time period including the second set of symbols having the full-duplex format.

In some examples, the resource determination component 1445 may be configured as or otherwise support a means for determining a first frequency resource allocation associated with the first set of symbols having the full-duplex format based on monitoring the second portion of the RFI. In some examples, the resource determination component 1445 may be configured as or otherwise support a means for determining a second frequency resource allocation associated with the second set of symbols having the full-duplex format based on monitoring the third portion of the RFI.

In some examples, the resource determination component 1445 may be configured as or otherwise support a means for determining a resource format for each time period of the one or more time periods based on the RFI. In some examples, the time period identification component 1460 may be configured as or otherwise support a means for identifying a first time period of the one or more time periods including a first set of symbols having a full-duplex format and a second time period of the one or more time periods including a second set of symbols having the full-duplex format. In some examples, the monitoring component 1465 may be configured as or otherwise support a means for monitoring a portion of the control message reserved for indications of frequency resource allocations for a set of multiple RFIs of the control message based on identifying the first time period including the first set of symbols having the full-duplex format, the second time period including the second set of symbols having the full-duplex format, or both.

In some examples, the resource determination component 1445 may be configured as or otherwise support a means for determining a first frequency resource allocation associated with the first set of symbols having the full-duplex format based on monitoring the portion of the control message reserved for indications of frequency resource allocations for the set of multiple RFIs of the control message. In some examples, the resource determination component 1445 may be configured as or otherwise support a means for determining a second frequency resource allocation associated with the second set of symbols having the full-duplex format based on monitoring the portion of the control message reserved for indications of frequency resource allocations for the set of multiple RFIs of the control message.

In some examples, the configuration identification component 1440 may be configured as or otherwise support a means for identifying, from the configuration for interpreting RFIs associated with the UE, a first configuration associated with RFIs indicating a single time period including a set of symbols having a full-duplex format. In some examples, the configuration identification component 1440 may be configured as or otherwise support a means for identifying, from the configuration for interpreting RFIs associated with the UE, a second configuration associated with RFIs indicating two or more time periods including sets of symbols having the full-duplex format.

In some examples, the configuration for interpreting RFIs includes a combined configuration including a time resource allocation scheme and a frequency resource allocation scheme, and the resource determination component 1445 may be configured as or otherwise support a means for determining a resource format for each time period of the one or more time periods based on the RFI and the time resource allocation scheme. In some examples, the configuration for interpreting RFIs includes a combined configuration including a time resource allocation scheme and a frequency resource allocation scheme, and the resource determination component 1445 may be configured as or otherwise support a means for identifying an indication of the frequency resource allocation for the set of symbols having the full-duplex format based on the RFI and the frequency resource allocation scheme. In some examples, the configuration for interpreting RFIs associated with the UE is based on a capability of the UE to recognize the full-duplex format.

In some examples, the index identification component 1470 may be configured as or otherwise support a means for identifying, within the control message, an index for each of a set of multiple component carriers associated with the UE, each index indicating a position of the RFI within the control message for each of the set of multiple component carriers.

In some examples, the index identification component 1470 may be configured as or otherwise support a means for identifying, within the control message, an index for a first component carrier of a set of multiple component carriers associated with the UE, the index for the first component carrier indicating a position of the RFI within the control message for each of the set of multiple component carriers.

In some examples, the index identification component 1470 may be configured as or otherwise support a means for identifying, within the control message, an index associated with the UE indicating a position of the RFI within the control message, where the RFI associated with the index is based on the configuration for interpreting RFIs and the capability of the UE to recognize the full-duplex format.

In some examples, the index identification component 1470 may be configured as or otherwise support a means for identifying, within the control message, an index associated with the UE indicating a position of the RFI within the control message, where identifying the index is based on the configuration for interpreting RFIs and the capability of the UE to recognize the full-duplex format.

In some examples, the message reception component 1430 may be configured as or otherwise support a means for receiving, from the base station, a radio resource control message including an indication of the configuration for interpreting RFIs, where identifying the configuration is based on receiving the radio resource control message.

Figure 15:
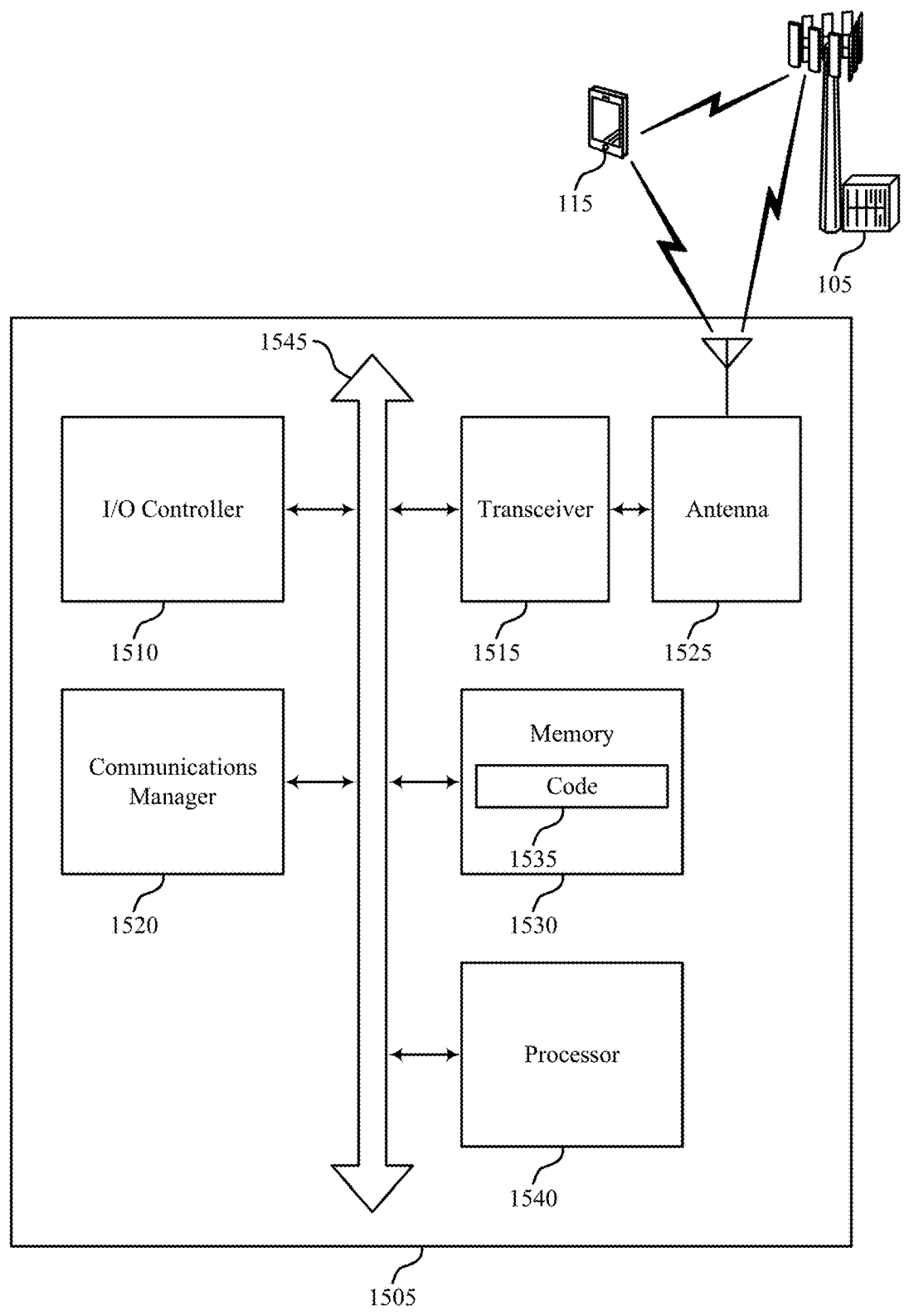
FIG. 15 shows a diagram of a system including a device that supports RFIs in BWP management for full-duplex resource allocation in accordance with aspects of the present disclosure.

FIG. 15 shows a diagram of a system 1500 including a device 1505 that supports RFIs in BWP management for full-duplex resource allocation in accordance with aspects of the present disclosure. The device 1505 may be an example of or include the components of a device 1205, a device 1305, or a UE 115 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include random access memory (RAM) and read-only memory (ROM). The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a basic I/O system (BIOS) which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting RFIs in BWP management for full-duplex resource allocation). For example, the device 1505 or a component of the device 1505 may include a processor 1540 and memory 1530 coupled to the processor 1540, the processor 1540 and memory 1530 configured to perform various functions described herein.

The communications manager 1520 may support wireless communication at a UE in accordance with examples as disclosed herein. For example, the communications manager 1520 may be configured as or otherwise support a means for communicating with a base station using an operating BWP including a first set of frequency resources in a carrier bandwidth. The communications manager 1520 may be configured as or otherwise support a means for receiving a GC-DCI message including an RFI indicating a second set of frequency resources. The communications manager 1520 may be configured as or otherwise support a means for modifying the operating BWP based on the second set of frequency resources. The communications manager 1520 may be configured as or otherwise support a means for communicating with the base station using the modified operating BWP.

Additionally or alternatively, the communications manager 1520 may support wireless communication at a UE in accordance with examples as disclosed herein. For example, the communications manager 1520 may be configured as or otherwise support a means for identifying a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format. The communications manager 1520 may be configured as or otherwise support a means for receiving a control message including an RFI for the one or more time periods, where at least one time period of the one or more time periods includes a set of symbols having a full-duplex format. The communications manager 1520 may be configured as or otherwise support a means for determining a frequency resource allocation for uplink communications and downlink communications for the set of symbols having the full-duplex format based on the RFI and the configuration. The communications manager 1520 may be configured as or otherwise support a means for communicating with a base station based on the determined frequency resource allocation.

By including or configuring the communications manager 1520 in accordance with examples as described herein, the device 1505 may support techniques for improved communication efficiency and reduced latency based on identifying a configuration for interpreting RFIs and receiving a GC-DCI indicating one or more RFIs.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of RFIs in BWP management for full-duplex resource allocation as described herein, or the processor 1540 and the memory 1530 may be otherwise configured to perform or support such operations.

Figure 16:
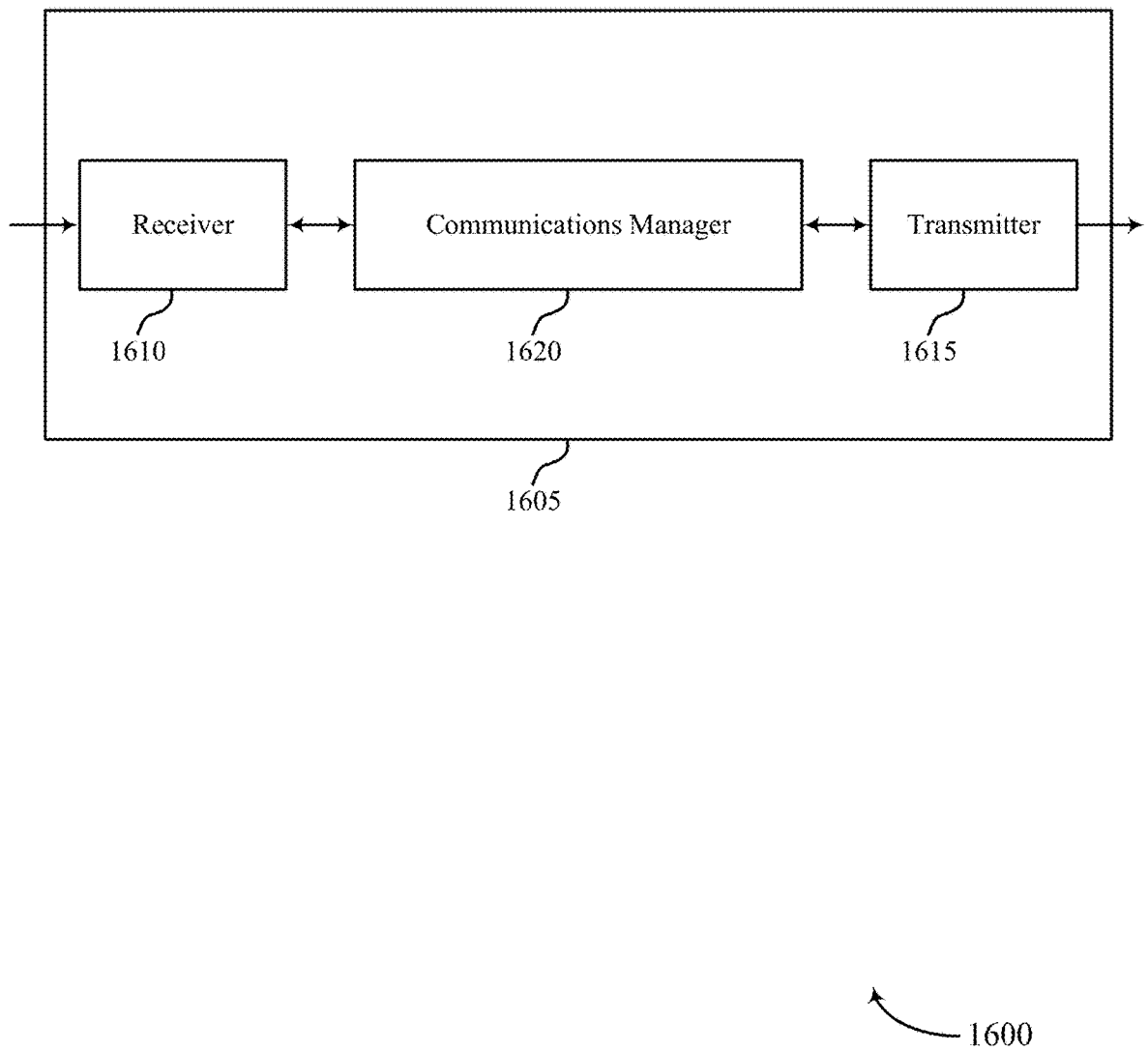
FIGS. 16 and 17 show block diagrams of devices that support RFIs in BWP management for full-duplex resource allocation in accordance with aspects of the present disclosure.

FIG. 16 shows a block diagram 1600 of a device 1605 that supports RFIs in BWP management for full-duplex resource allocation in accordance with aspects of the present disclosure. The device 1605 may be an example of aspects of a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to RFIs in BWP management for full-duplex resource allocation). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to RFIs in BWP management for full-duplex resource allocation). In some examples, the transmitter 1615 may be co-located with a receiver 1610 in a transceiver module. The transmitter 1615 may utilize a single antenna or a set of multiple antennas.

The communications manager 1620, the receiver 1610, the transmitter 1615, or various combinations thereof or various components thereof may be examples of means for performing various aspects of RFIs in BWP management for full-duplex resource allocation as described herein. For example, the communications manager 1620, the receiver 1610, the transmitter 1615, or various combinations or components thereof may support a method for performing one or more of the functions described herein.

In some examples, the communications manager 1620, the receiver 1610, the transmitter 1615, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1620, the receiver 1610, the transmitter 1615, or various combinations or components thereof may be implemented in code (e.g., as communications management software or firmware) executed by a processor. If implemented in code executed by a processor, the functions of the communications manager 1620, the receiver 1610, the transmitter 1615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1620 may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. For example, the communications manager 1620 may be configured as or otherwise support a means for communicating with a UE using an operating BWP for the UE including a first set of frequency resources in a carrier bandwidth. The communications manager 1620 may be configured as or otherwise support a means for transmitting a GC-DCI message including an RFI indicating a second set of frequency resources for the UE. The communications manager 1620 may be configured as or otherwise support a means for modifying the operating BWP for the UE based on the second set of frequency resources. The communications manager 1620 may be configured as or otherwise support a means for communicating with the UE using the modified operating BWP.

Additionally or alternatively, the communications manager 1620 may support wireless communication at a base station in accordance with examples as disclosed herein. For example, the communications manager 1620 may be configured as or otherwise support a means for identifying a configuration for interpreting RFIs associated with a UE, the RFIs indicating one or more resource formats associated with one or more time periods of communication resources allocated to the UE, the one or more resource formats including at least one of an uplink format, a downlink format, or a full-duplex format. The communications manager 1620 may be configured as or otherwise support a means for determining an RFI for the one or more time periods based on the configuration, where at least one time period of the one or more time periods includes a set of symbols having a full-duplex format. The communications manager 1620 may be configured as or otherwise support a means for determining a frequency resource allocation for uplink communications and downlink communications for the set of symbols having the full-duplex format based on the RFI and the configuration. The communications manager 1620 may be configured as or otherwise support a means for transmitting, to the UE, a control message including an indication of the RFI for the one or more time periods. The communications manager 1620 may be configured as or otherwise support a means for communicating with the UE based on the determined frequency resource allocation.

By including or configuring the communications manager 1620 in accordance with examples as described herein, the device 1605 (e.g., a processor controlling or otherwise coupled to the receiver 1610, the transmitter 1615, the communications manager 1620, or a combination thereof) may support techniques for reduced processing and more efficient utilization of communication resources based on identifying a configuration for interpreting RFIs and transmitting a GC-DCI that indicates one or more RFIs.

Figure 17:
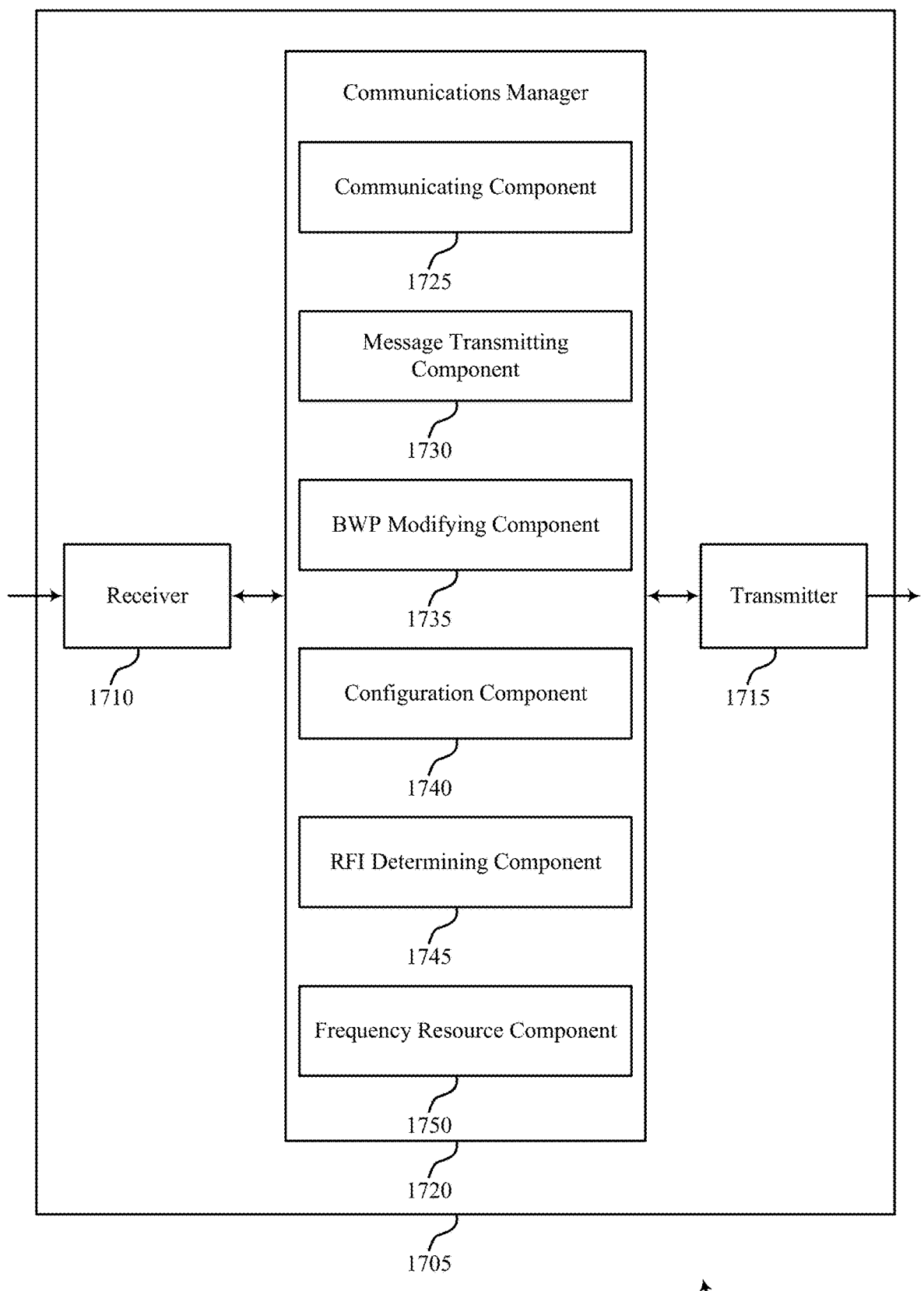

FIG. 17 shows a block diagram 1700 of a device 1705 that supports RFIs in BWP management for full-duplex resource allocation in accordance with aspects of the present disclosure. The device 1705 may be an example of aspects of a device 1605 or a base station 105 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to RFIs in BWP management for full-duplex resource allocation). Information may be passed on to other components of the device 1705. The receiver 1710 may utilize a single antenna or a set of multiple antennas.

The transmitter 1715 may provide a means for transmitting signals generated by other components of the device 1705. For example, the transmitter 1715 may transmit information such as packets, user data, control information, or any combination thereof associated with various information channels (e.g., control channels, data channels, information channels related to RFIs in BWP management for full-duplex resource allocation). In some examples, the transmitter 1715 may be co-located with a receiver 1710 in a transceiver module. The transmitter 1715 may utilize a single antenna or a set of multiple antennas.

The device 1705, or various components thereof, may be an example of means for performing various aspects of RFIs in BWP management for full-duplex resource allocation as described herein. For example, the communications manager 1720 may include a communicating component 1725, a message transmitting component 1730, a BWP modifying component 1735, a configuration component 1740, an RFI determining component 1745, a frequency resource component 1750, or any combination thereof. The communications manager 1720 may be an example of aspects of a communications manager 1620 as described herein. In some examples, the communications manager 1720, or various components thereof, may be configured to perform various operations (e.g., receiving, monitoring, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to receive information, transmit information, or perform various other operations as described herein.

The communications manager 1720 may support wireless communication at a base station in accordance with examples as disclosed herein. The communicating component 1725 may be configured as or otherwise support a means for communicating with a UE using an operating BWP for the UE including a first set of frequency resources in a carrier bandwidth. The message transmitting component 1730 may be configured as or otherwise support a means for transmitting a GC-DCI message including an RFI indicating a second set of frequency resources for the UE. The BWP modifying component 1735 may be configured as or otherwise support a means for modifying the operating BWP for the UE based on the second set of frequency resources. The communicating component 1725 may be configured as or otherwise support a means for communicating with the UE using the modified operating BWP.

Additionally or alternatively, the communications manager 1720 may support wireless communication at a base station in accordance with examples as disclosed herein. The configuration component 1740 may be configured as or otherwise support a means for identifying a configuration for interpreting RFIs associated with a UE, the RFIs indicating one or more resource formats associated with one or more time periods of communication resources allocated to the UE, the one or more resource formats including at least one of an uplink format, a downlink format, or a full-duplex format. The RFI determining component 1745 may be configured as or otherwise support a means for determining an RFI for the one or more time periods based on the configuration, where at least one time period of the one or more time periods includes a set of symbols having a full-duplex format. The frequency resource component 1750 may be configured as or otherwise support a means for determining a frequency resource allocation for uplink communications and downlink communications for the set of symbols having the full-duplex format based on the RFI and the configuration. The message transmitting component 1730 may be configured as or otherwise support a means for transmitting, to the UE, a control message including an indication of the RFI for the one or more time periods. The communicating component 1725 may be configured as or otherwise support a means for communicating with the UE based on the determined frequency resource allocation.

Figure 18:
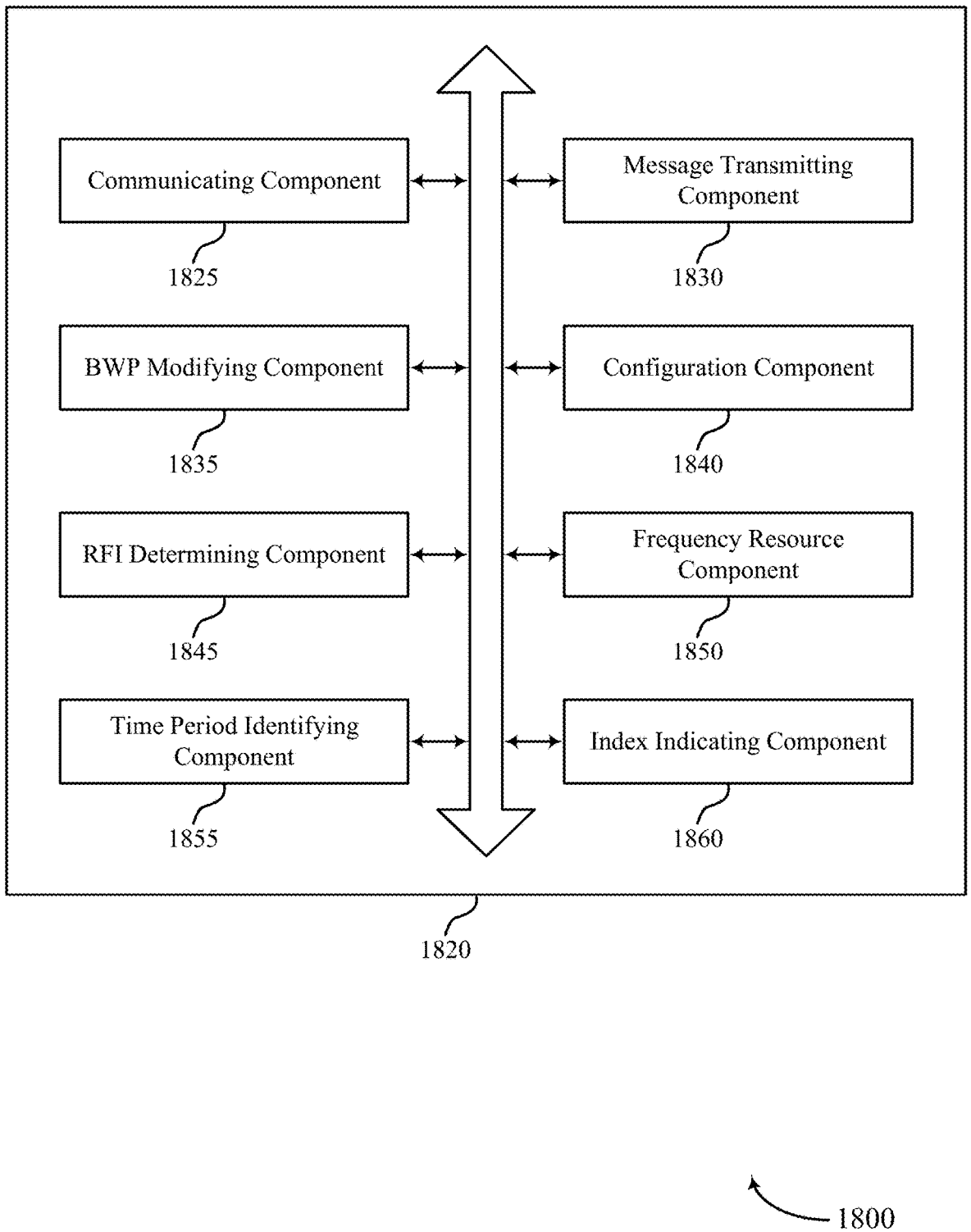
FIG. 18 shows a block diagram of a communications manager that supports RFIs in BWP management for full-duplex resource allocation in accordance with aspects of the present disclosure.

FIG. 18 shows a block diagram 1800 of a communications manager 1820 that supports RFIs in BWP management for full-duplex resource allocation in accordance with aspects of the present disclosure. The communications manager 1820 may be an example of aspects of a communications manager 1620, a communications manager 1720, or both, as described herein. The communications manager 1820, or various components thereof, may be an example of means for performing various aspects of RFIs in BWP management for full-duplex resource allocation as described herein. For example, the communications manager 1820 may include a communicating component 1825, a message transmitting component 1830, a BWP modifying component 1835, a configuration component 1840, an RFI determining component 1845, a frequency resource component 1850, a time period identifying component 1855, an index indicating component 1860, or any combination thereof. Each of these components may communicate, directly or indirectly, with one another (e.g., via one or more buses).

The communications manager 1820 may support wireless communication at a base station in accordance with examples as disclosed herein. The communicating component 1825 may be configured as or otherwise support a means for communicating with a UE using an operating BWP for the UE including a first set of frequency resources in a carrier bandwidth. The message transmitting component 1830 may be configured as or otherwise support a means for transmitting a GC-DCI message including an RFI indicating a second set of frequency resources for the UE. The BWP modifying component 1835 may be configured as or otherwise support a means for modifying the operating BWP for the UE based on the second set of frequency resources. In some examples, the communicating component 1825 may be configured as or otherwise support a means for communicating with the UE using the modified operating BWP.

In some examples, to support modifying, the BWP modifying component 1835 may be configured as or otherwise support a means for switching the operating BWP for the UE to the second set of frequency resources based on the GC-DCI message. In some examples, to support switching, the BWP modifying component 1835 may be configured as or otherwise support a means for switching from a first active uplink BWP for the UE to a second active uplink BWP for the UE and from a first active downlink BWP for the UE to a second active downlink BWP for the UE based on the GC-DCI message.

In some examples, to support modifying, the frequency resource component 1850 may be configured as or otherwise support a means for determining a set of overlapping frequency resources based on an overlap between the first set of frequency resources and the second set of frequency resources. In some examples, to support modifying, the BWP modifying component 1835 may be configured as or otherwise support a means for reducing the operating BWP for the UE to the set of overlapping frequency resources based on the GC-DCI message. In some examples, the frequency resource component 1850 may be configured as or otherwise support a means for selecting the second set of frequency resources for the UE based on the first set of frequency resources.

In some examples, the message transmitting component 1830 may be configured as or otherwise support a means for transmitting, to the UE, a radio resource control configuration message indicating a set of multiple slot frequency formats, a set of multiple BWP formats, or a combination thereof, where the RFI includes a slot frequency format identifier indicating a slot frequency format of the set of multiple slot frequency formats, a BWP identifier indicating a BWP format of the set of multiple BWP formats, or a combination thereof corresponding to the second set of frequency resources.

In some examples, the message transmitting component 1830 may be configured as or otherwise support a means for transmitting, to the UE, a radio resource control configuration message indicating a position index for the UE, where the RFI corresponds to the UE based on the position index for the UE.

In some examples, the GC-DCI message includes an additional RFI, and the message transmitting component 1830 may be configured as or otherwise support a means for transmitting, to an additional UE, an additional radio resource control configuration message indicating an additional position index for the additional UE, where the additional RFI corresponds to the additional UE based on the additional position index for the additional UE. In some examples, the GC-DCI message includes an additional RFI, and the communicating component 1825 may be configured as or otherwise support a means for communicating with the additional UE based on the additional RFI.

In some examples, the additional RFI indicates one or more slot formats. In some examples, the additional RFI does not indicate frequency resources based on the one or more slot formats not including concurrent uplink resources and downlink resources. In some examples, the additional RFI does not indicate frequency resources based on the additional UE operating according to a half-duplex mode.

In some examples, the RFI determining component 1845 may be configured as or otherwise support a means for generating the RFI to indicate one or more slots including concurrent uplink resources and downlink resources for at least a portion of the one or more slots and to indicate the second set of frequency resources based on the one or more slots including the concurrent uplink resources and downlink resources.

Additionally or alternatively, the communications manager 1820 may support wireless communication at a base station in accordance with examples as disclosed herein. The configuration component 1840 may be configured as or otherwise support a means for identifying a configuration for interpreting RFIs associated with a UE, the RFIs indicating one or more resource formats associated with one or more time periods of communication resources allocated to the UE, the one or more resource formats including at least one of an uplink format, a downlink format, or a full-duplex format. The RFI determining component 1845 may be configured as or otherwise support a means for determining an RFI for the one or more time periods based on the configuration, where at least one time period of the one or more time periods includes a set of symbols having a full-duplex format.

The frequency resource component 1850 may be configured as or otherwise support a means for determining a frequency resource allocation for uplink communications and downlink communications for the set of symbols having the full-duplex format based on the RFI and the configuration. In some examples, the frequency resource allocation is associated with each symbol of the set of symbols having the full-duplex format.

In some examples, the message transmitting component 1830 may be configured as or otherwise support a means for transmitting, to the UE, a control message including an indication of the RFI for the one or more time periods. In some examples, transmitting the control message is based on a capability of the UE to recognize the full-duplex format. In some examples, the control message includes GC-DCI. In some examples, the communicating component 1825 may be configured as or otherwise support a means for communicating with the UE based on the determined frequency resource allocation.

In some examples, the RFI determining component 1845 may be configured as or otherwise support a means for indicating a resource format for each time period of the one or more time periods based on a first portion of the RFI. In some examples, the frequency resource component 1850 may be configured as or otherwise support a means for indicating the frequency resource allocation in a second portion of the RFI different from the first portion.

In some examples, the frequency resource component 1850 may be configured as or otherwise support a means for indicating the frequency resource allocation in a portion of the control message reserved for indications of frequency resource allocations for a set of multiple RFIs of the control message. In some examples, the frequency resource allocation for uplink communications and downlink communications for the set of symbols having the full-duplex format includes a guard band between frequency resources for uplink communications and frequency resources for downlink communications. In some examples, the frequency resource allocation for uplink communications and downlink communications for the set of symbols having the full-duplex format includes an overlap between frequency resources for uplink communications and frequency resources for downlink communications.

In some examples, the message transmitting component 1830 may be configured as or otherwise support a means for indicating, within the control message, a first index indicating for the UE to monitor a first portion of the control message. In some examples, the message transmitting component 1830 may be configured as or otherwise support a means for indicating, within the control message, a second index indicating for the UE to monitor a second portion of the control message different from the first portion, the second portion including the portion of the control message reserved for indications of frequency resource allocations for the set of multiple RFIs of the control message.

In some examples, the RFI determining component 1845 may be configured as or otherwise support a means for determining a resource format for each time period of the one or more time periods based on a first portion of the RFI. In some examples, the time period identifying component 1855 may be configured as or otherwise support a means for identifying a first time period of the one or more time periods including a first set of symbols having the full-duplex format and a second time period of the one or more time periods including a second set of symbols having the full-duplex format. In some examples, the frequency resource component 1850 may be configured as or otherwise support a means for indicating a first frequency resource allocation associated with the first set of symbols having the full-duplex format in a second portion of the RFI. In some examples, the frequency resource component 1850 may be configured as or otherwise support a means for indicating a second frequency resource allocation associated with the second set of symbols having the full-duplex format in a third portion of the RFI.

In some examples, the RFI determining component 1845 may be configured as or otherwise support a means for determining a resource format for each time period of the one or more time periods based on a first portion of the RFI. In some examples, the time period identifying component 1855 may be configured as or otherwise support a means for identifying a first time period of the one or more time periods including a first set of symbols having the full-duplex format and a second time period of the one or more time periods including a second set of symbols having the full-duplex format.

In some examples, the frequency resource component 1850 may be configured as or otherwise support a means for indicating a first frequency resource allocation associated with the first set of symbols having the full-duplex format, a second frequency resource allocation associated with the second set of symbols having the full-duplex format, or both, in a portion of the control message reserved for indications of frequency resource allocations for a set of multiple RFIs of the control message.

In some examples, the configuration component 1840 may be configured as or otherwise support a means for indicating, to the UE via the configuration for interpreting RFIs associated with the UE, a first configuration associated with RFIs indicating a single time period including a set of symbols configure for full-duplex communications. In some examples, the configuration component 1840 may be configured as or otherwise support a means for indicating, to the UE via the configuration for interpreting RFIs associated with the UE, a second configuration associated with RFIs indicating two or more time periods including sets of symbols having the full-duplex format. In some examples, the configuration for interpreting RFIs associated with the UE is based on a capability of the UE to recognize the full-duplex format.

In some examples, the configuration for interpreting RFIs includes a combined configuration including a time resource allocation scheme and a frequency resource allocation scheme, and the RFI determining component 1845 may be configured as or otherwise support a means for indicating, to the UE, a resource format for each time period of the one or more time periods based on the RFI and the time resource allocation scheme. In some examples, the configuration for interpreting RFIs includes a combined configuration including a time resource allocation scheme and a frequency resource allocation scheme, and the frequency resource component 1850 may be configured as or otherwise support a means for indicating, to the UE, the frequency resource allocation for the set of symbols having the full-duplex format based on the RFI and the frequency resource allocation scheme.

In some examples, the index indicating component 1860 may be configured as or otherwise support a means for indicating, within the control message, an index for each of a set of multiple component carriers associated with the UE, each index indicating a position of the RFI within the control message for each of the set of multiple component carriers.

In some examples, the index indicating component 1860 may be configured as or otherwise support a means for indicating, within the control message, an index for a first component carrier of a set of multiple component carriers associated with the UE, the index for the first component carrier indicating a position of the RFI within the control message for each of the set of multiple component carriers.

In some examples, the index indicating component 1860 may be configured as or otherwise support a means for indicating, within the control message, an index associated with the UE indicating a position of the RFI within the control message, where the RFI associated with the index is based on the configuration for interpreting RFIs and the capability of the UE to recognize the full-duplex format.

In some examples, the index indicating component 1860 may be configured as or otherwise support a means for indicating, within the control message, an index associated with the UE indicating a position of the RFI within the control message, where indicating the index is based on the configuration for interpreting RFIs and the capability of the UE to recognize the full-duplex format.

In some examples, the message transmitting component 1830 may be configured as or otherwise support a means for transmitting, to the UE, a radio resource control message including an indication of the configuration for interpreting RFIs.

Figure 19:
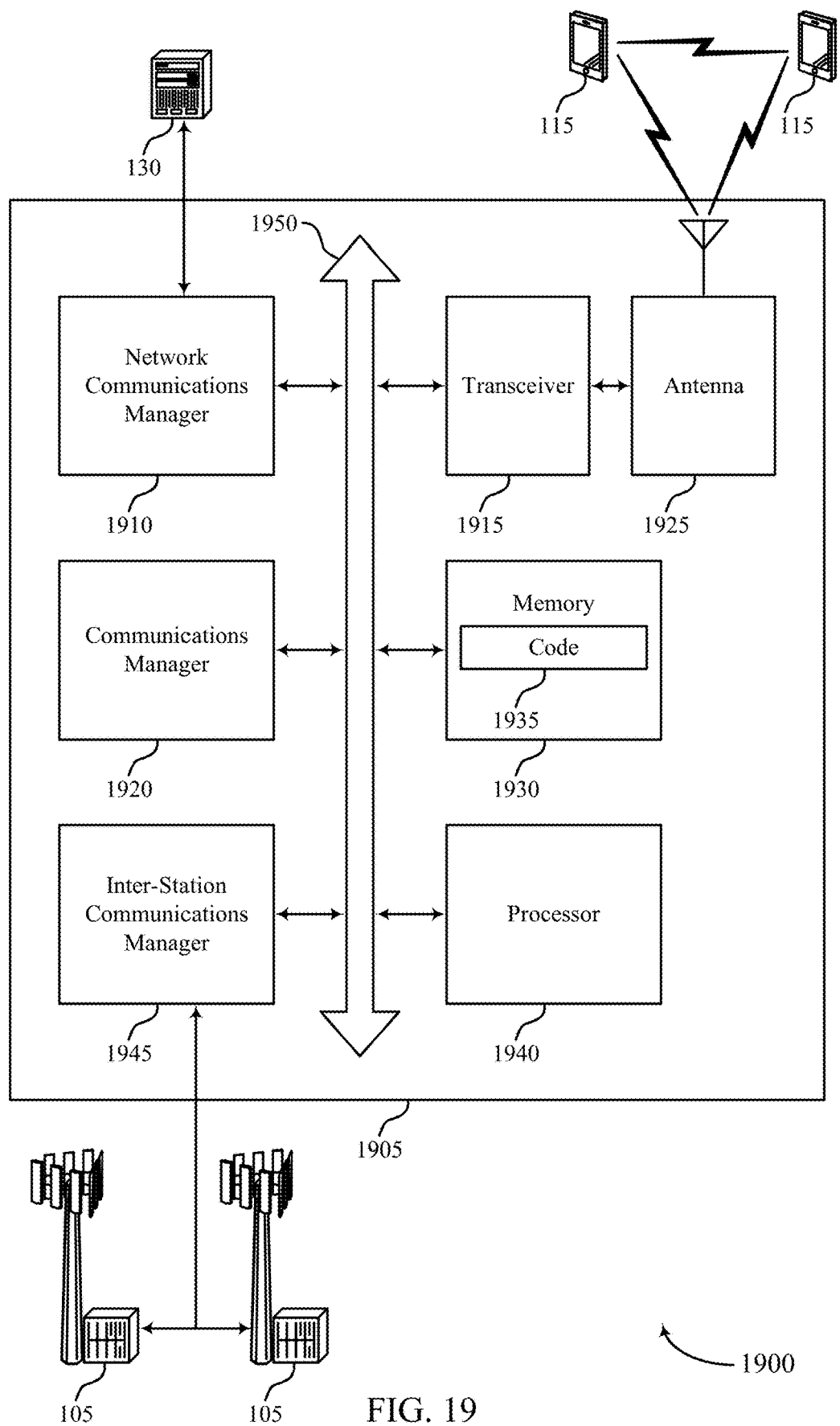
FIG. 19 shows a diagram of a system including a device that supports RFIs in BWP management for full-duplex resource allocation in accordance with aspects of the present disclosure.

FIG. 19 shows a diagram of a system 1900 including a device 1905 that supports RFIs in BWP management for full-duplex resource allocation in accordance with aspects of the present disclosure. The device 1905 may be an example of or include the components of a device 1605, a device 1705, or a base station 105 as described herein. The device 1905 may communicate wirelessly with one or more base stations 105, UEs 115, or any combination thereof. The device 1905 may include components for bi-directional voice and data communications including components for transmitting and receiving communications, such as a communications manager 1920, a network communications manager 1910, a transceiver 1915, an antenna 1925, a memory 1930, code 1935, a processor 1940, and an inter-station communications manager 1945. These components may be in electronic communication or otherwise coupled (e.g., operatively, communicatively, functionally, electronically, electrically) via one or more buses (e.g., a bus 1950).

The network communications manager 1910 may manage communications with a core network 130 (e.g., via one or more wired backhaul links). For example, the network communications manager 1910 may manage the transfer of data communications for client devices, such as one or more UEs 115.

In some cases, the device 1905 may include a single antenna 1925. However, in some other cases the device 1905 may have more than one antenna 1925, which may be capable of concurrently transmitting or receiving multiple wireless transmissions. The transceiver 1915 may communicate bi-directionally, via the one or more antennas 1925, wired, or wireless links as described herein. For example, the transceiver 1915 may represent a wireless transceiver and may communicate bi-directionally with another wireless transceiver. The transceiver 1915 may also include a modem to modulate the packets, to provide the modulated packets to one or more antennas 1925 for transmission, and to demodulate packets received from the one or more antennas 1925. The transceiver 1915, or the transceiver 1915 and one or more antennas 1925, may be an example of a transmitter 1615, a transmitter 1715, a receiver 1610, a receiver 1710, or any combination thereof or component thereof, as described herein.

The memory 1930 may include RAM and ROM. The memory 1930 may store computer-readable, computer-executable code 1935 including instructions that, when executed by the processor 1940, cause the device 1905 to perform various functions described herein. The code 1935 may be stored in a non-transitory computer-readable medium such as system memory or another type of memory. In some cases, the code 1935 may not be directly executable by the processor 1940 but may cause a computer (e.g., when compiled and executed) to perform functions described herein. In some cases, the memory 1930 may contain, among other things, a BIOS which may control basic hardware or software operation such as the interaction with peripheral components or devices.

The processor 1940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting RFIs in BWP management for full-duplex resource allocation). For example, the device 1905 or a component of the device 1905 may include a processor 1940 and memory 1930 coupled to the processor 1940, the processor 1940 and memory 1930 configured to perform various functions described herein.

The inter-station communications manager 1945 may manage communications with other base stations 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communications network technology to provide communication between base stations 105.

The communications manager 1920 may support wireless communication at a base station in accordance with examples as disclosed herein. For example, the communications manager 1920 may be configured as or otherwise support a means for communicating with a UE using an operating BWP for the UE including a first set of frequency resources in a carrier bandwidth. The communications manager 1920 may be configured as or otherwise support a means for transmitting a GC-DCI message including an RFI indicating a second set of frequency resources for the UE. The communications manager 1920 may be configured as or otherwise support a means for modifying the operating BWP for the UE based on the second set of frequency resources. The communications manager 1920 may be configured as or otherwise support a means for communicating with the UE using the modified operating BWP.

Additionally or alternatively, the communications manager 1920 may support wireless communication at a base station in accordance with examples as disclosed herein. For example, the communications manager 1920 may be configured as or otherwise support a means for identifying a configuration for interpreting RFIs associated with a UE, the RFIs indicating one or more resource formats associated with one or more time periods of communication resources allocated to the UE, the one or more resource formats including at least one of an uplink format, a downlink format, or a full-duplex format. The communications manager 1920 may be configured as or otherwise support a means for determining an RFI for the one or more time periods based on the configuration, where at least one time period of the one or more time periods includes a set of symbols having a full-duplex format. The communications manager 1920 may be configured as or otherwise support a means for determining a frequency resource allocation for uplink communications and downlink communications for the set of symbols having the full-duplex format based on the RFI and the configuration. The communications manager 1920 may be configured as or otherwise support a means for transmitting, to the UE, a control message including an indication of the RFI for the one or more time periods. The communications manager 1920 may be configured as or otherwise support a means for communicating with the UE based on the determined frequency resource allocation.

By including or configuring the communications manager 1920 in accordance with examples as described herein, the device 1905 may support techniques for improved communication reliability and reduced latency based on identifying a configuration for interpreting RFIs and transmitting a GC-DCI that indicates one or more RFIs.

In some examples, the communications manager 1920 may be configured to perform various operations (e.g., receiving, monitoring, transmitting) using or otherwise in cooperation with the transceiver 1915, the one or more antennas 1925, or any combination thereof. Although the communications manager 1920 is illustrated as a separate component, in some examples, one or more functions described with reference to the communications manager 1920 may be supported by or performed by the processor 1940, the memory 1930, the code 1935, or any combination thereof. For example, the code 1935 may include instructions executable by the processor 1940 to cause the device 1905 to perform various aspects of RFIs in BWP management for full-duplex resource allocation as described herein, or the processor 1940 and the memory 1930 may be otherwise configured to perform or support such operations.

Figure 20:
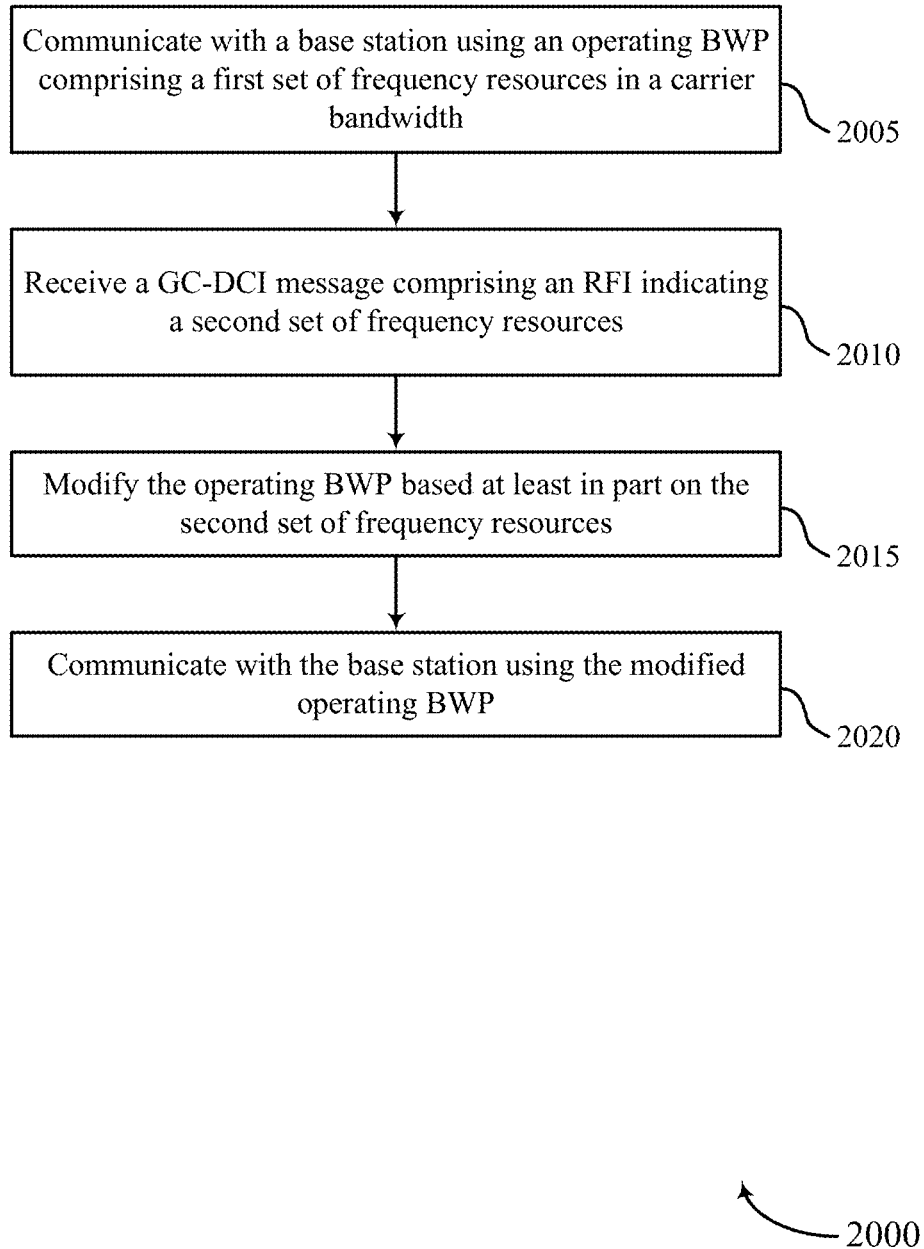
FIGS. 20 through 25 show flowcharts illustrating methods that support RFIs in BWP management for full-duplex resource allocation in accordance with aspects of the present disclosure.

FIG. 20 shows a flowchart illustrating a method 2000 that supports RFIs in BWP management for full-duplex resource allocation in accordance with aspects of the present disclosure. The operations of the method 2000 may be implemented by a UE or its components as described herein. For example, the operations of the method 2000 may be performed by a UE 115 as described with reference to FIGS. 1 through 15. In some examples, a UE may execute a set of instructions to control the functional elements of the UE to perform the described functions. Additionally or alternatively, the UE may perform aspects of the described functions using special-purpose hardware.

At 2005, the method may include communicating with a base station using an operating BWP including a first set of frequency resources in a carrier bandwidth. The operations of 2005 may be performed in accordance with examples as disclosed herein. In some examples, aspects of the operations of 2005 may be performed by a communication component 1425 as described with reference to FIG. 14.

At 2010, the method may include receiving a GC-DCI message including an RFI indicating a second set of frequency resources. The operations of 2010 may be performed in accordance with examples as disclosed herein. In some examples, aspects of the operations of 2010 may be performed by a message reception component 1430 as described with reference to FIG. 14.

At 2015, the method may include modifying the operating BWP based on the second set of frequency resources. The operations of 2015 may be performed in accordance with examples as disclosed herein. In some examples, aspects of the operations of 2015 may be performed by a BWP modification component 1435 as described with reference to FIG. 14.

At 2020, the method may include communicating with the base station using the modified operating BWP. The operations of 2020 may be performed in accordance with examples as disclosed herein. In some examples, aspects of the operations of 2020 may be performed by a communication component 1425 as described with reference to FIG. 14.

Figure 21:
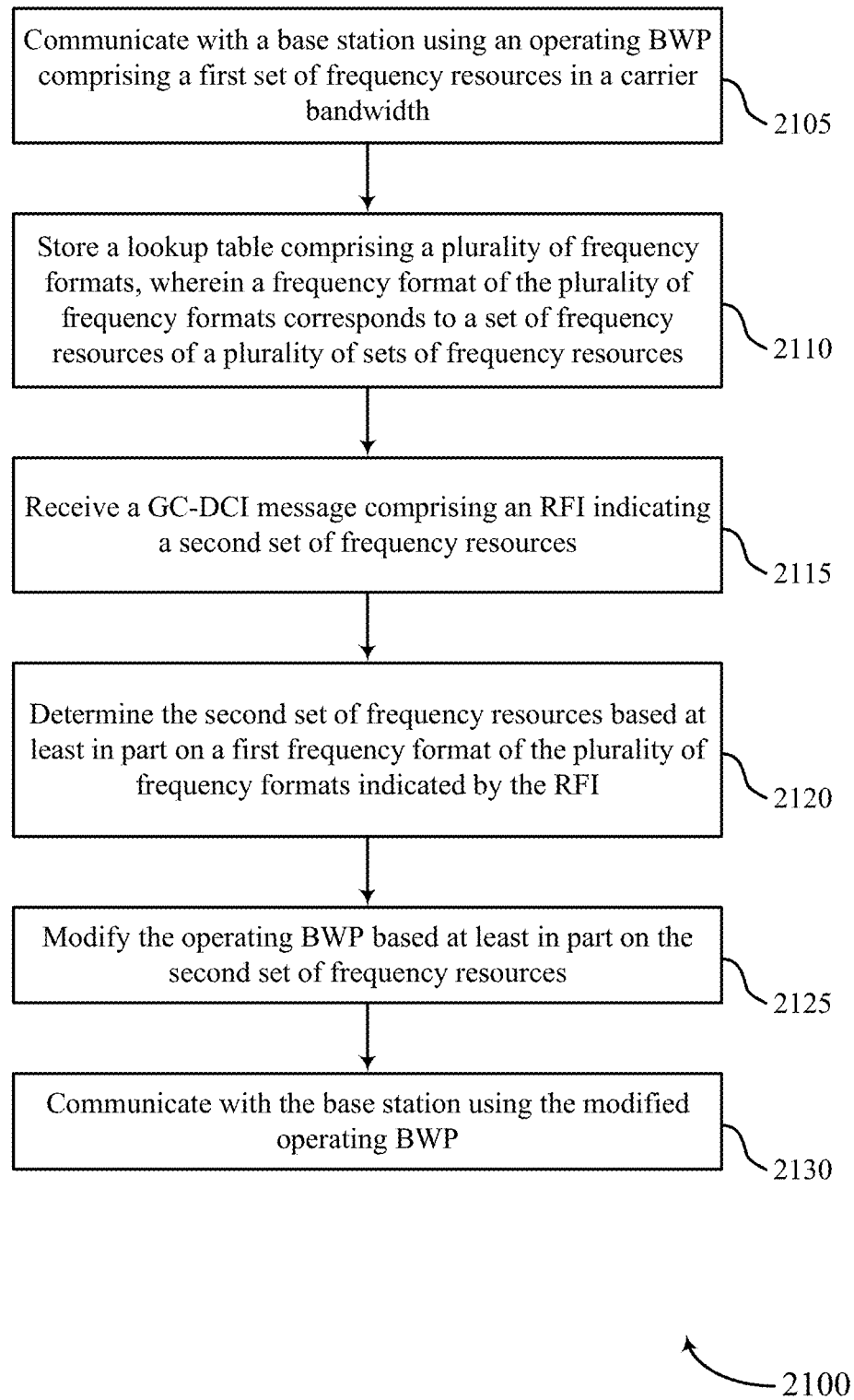

FIG. 21 shows a flowchart illustrating a method 2100 that supports RFIs in BWP management for full-duplex resource allocation in accordance with aspects of the present disclosure. The operations of the method 2100 may be implemented by a UE or its components as described herein. For example, the operations of the method 2100 may be performed by a UE 115 as described with reference to FIGS. 1 through 15. In some examples, a UE may execute a set of instructions to control the functional elements of the UE to perform the described functions. Additionally or alternatively, the UE may perform aspects of the described functions using special-purpose hardware.

At 2105, the method may include communicating with a base station using an operating BWP including a first set of frequency resources in a carrier bandwidth. The operations of 2105 may be performed in accordance with examples as disclosed herein. In some examples, aspects of the operations of 2105 may be performed by a communication component 1425 as described with reference to FIG. 14.

At 2110, the method may include storing a lookup table including a set of multiple frequency formats, where a frequency format of the set of multiple frequency formats corresponds to a set of frequency resources of a set of multiple sets of frequency resources. The operations of 2110 may be performed in accordance with examples as disclosed herein. In some examples, aspects of the operations of 2110 may be performed by a lookup table component 1450 as described with reference to FIG. 14.

At 2115, the method may include receiving a GC-DCI message including an RFI indicating a second set of frequency resources. The operations of 2115 may be performed in accordance with examples as disclosed herein. In some examples, aspects of the operations of 2115 may be performed by a message reception component 1430 as described with reference to FIG. 14.

At 2120, the method may include determining the second set of frequency resources based on a first frequency format of the set of multiple frequency formats indicated by the RFI. The operations of 2120 may be performed in accordance with examples as disclosed herein. In some examples, aspects of the operations of 2120 may be performed by a resource determination component 1445 as described with reference to FIG. 14.

At 2125, the method may include modifying the operating BWP based on the second set of frequency resources. The operations of 2125 may be performed in accordance with examples as disclosed herein. In some examples, aspects of the operations of 2125 may be performed by a BWP modification component 1435 as described with reference to FIG. 14.

At 2130, the method may include communicating with the base station using the modified operating BWP. The operations of 2130 may be performed in accordance with examples as disclosed herein. In some examples, aspects of the operations of 2130 may be performed by a communication component 1425 as described with reference to FIG. 14.

Figure 22:
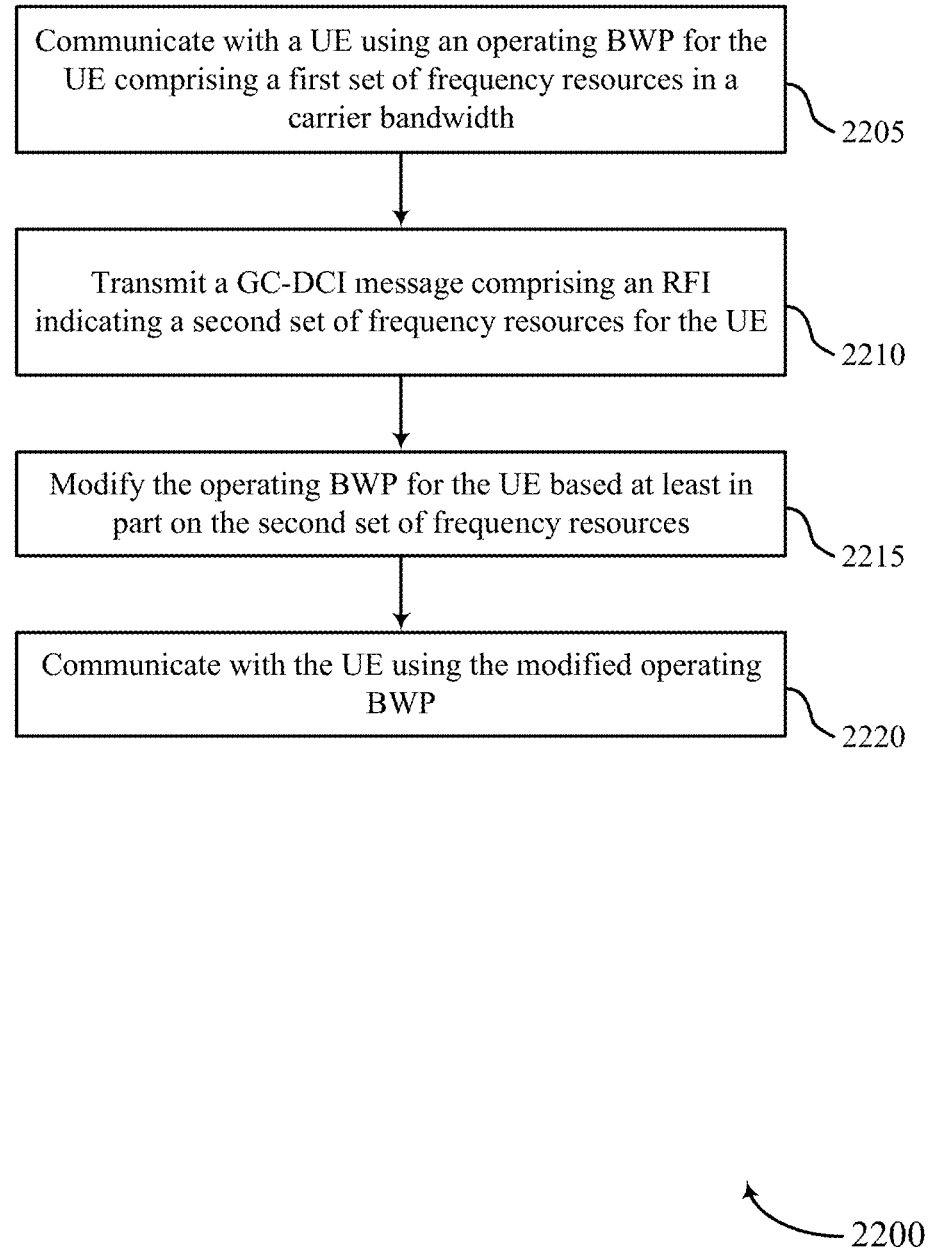

FIG. 22 shows a flowchart illustrating a method 2200 that supports RFIs in BWP management for full-duplex resource allocation in accordance with aspects of the present disclosure. The operations of the method 2200 may be implemented by a base station or its components as described herein. For example, the operations of the method 2200 may be performed by a base station 105 as described with reference to FIGS. 1 through 11 and 16 through 19. In some examples, a base station may execute a set of instructions to control the functional elements of the base station to perform the described functions. Additionally or alternatively, the base station may perform aspects of the described functions using special-purpose hardware.

At 2205, the method may include communicating with a UE using an operating BWP for the UE including a first set of frequency resources in a carrier bandwidth. The operations of 2205 may be performed in accordance with examples as disclosed herein. In some examples, aspects of the operations of 2205 may be performed by a communicating component 1825 as described with reference to FIG. 18.

At 2210, the method may include transmitting a GC-DCI message including an RFI indicating a second set of frequency resources for the UE. The operations of 2210 may be performed in accordance with examples as disclosed herein. In some examples, aspects of the operations of 2210 may be performed by a message transmitting component 1830 as described with reference to FIG. 18.

At 2215, the method may include modifying the operating BWP for the UE based on the second set of frequency resources. The operations of 2215 may be performed in accordance with examples as disclosed herein. In some examples, aspects of the operations of 2215 may be performed by a BWP modifying component 1835 as described with reference to FIG. 18.

At 2220, the method may include communicating with the UE using the modified operating BWP. The operations of 2220 may be performed in accordance with examples as disclosed herein. In some examples, aspects of the operations of 2220 may be performed by a communicating component 1825 as described with reference to FIG. 18.

Figure 23:
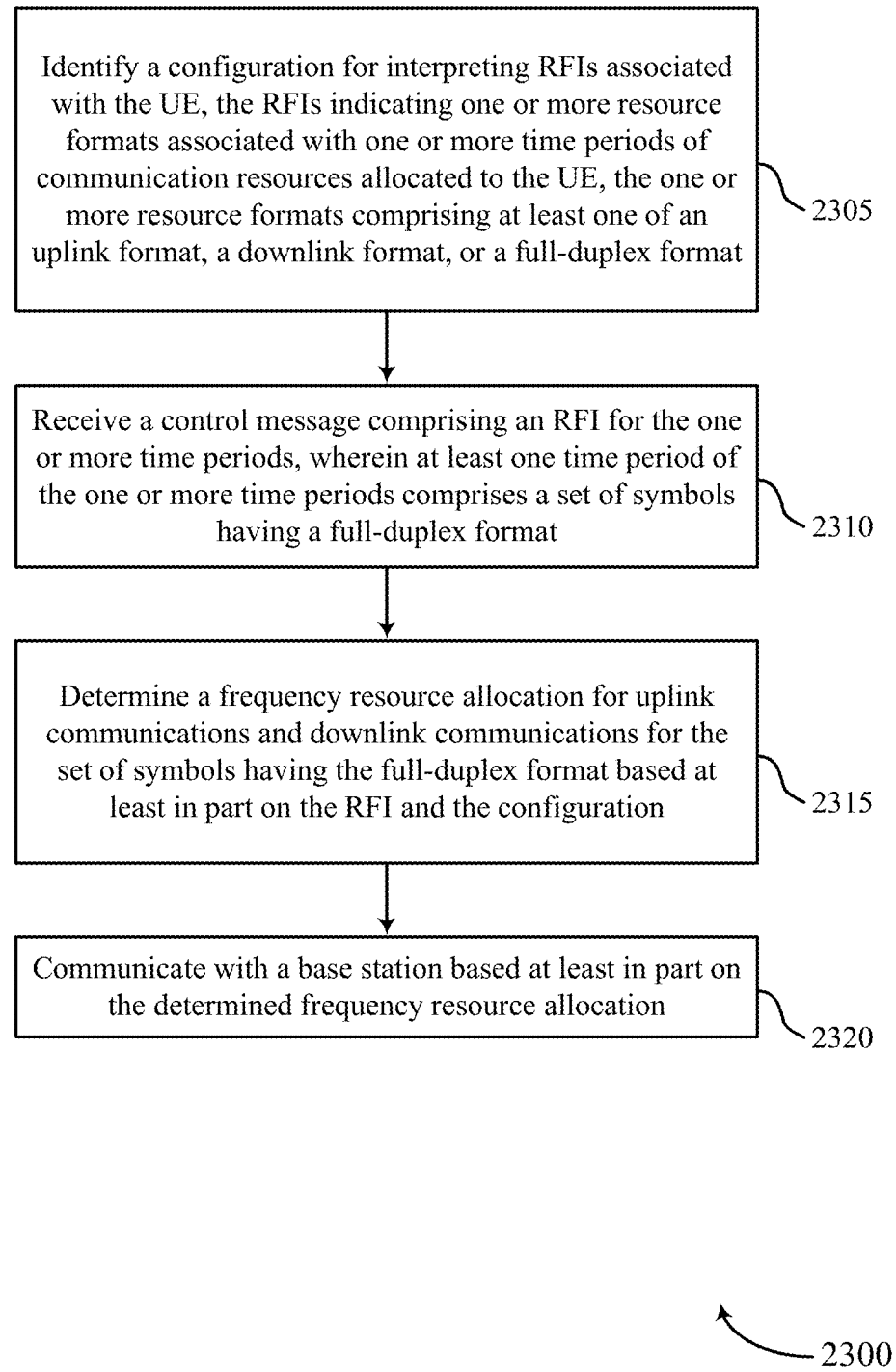

FIG. 23 shows a flowchart illustrating a method 2300 that supports RFIs in BWP management for full-duplex resource allocation in accordance with aspects of the present disclosure. The operations of the method 2300 may be implemented by a UE or its components as described herein. For example, the operations of the method 2300 may be performed by a UE 115 as described with reference to FIGS. 1 through 15. In some examples, a UE may execute a set of instructions to control the functional elements of the UE to perform the described functions. Additionally or alternatively, the UE may perform aspects of the described functions using special-purpose hardware.

At 2305, the method may include identifying a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format. The operations of 2305 may be performed in accordance with examples as disclosed herein. In some examples, aspects of the operations of 2305 may be performed by a configuration identification component 1440 as described with reference to FIG. 14.

At 2310, the method may include receiving a control message including an RFI for the one or more time periods, where at least one time period of the one or more time periods includes a set of symbols having a full-duplex format. The operations of 2310 may be performed in accordance with examples as disclosed herein. In some examples, aspects of the operations of 2310 may be performed by a message reception component 1430 as described with reference to FIG. 14.

At 2315, the method may include determining a frequency resource allocation for uplink communications and downlink communications for the set of symbols having the full-duplex format based on the RFI and the configuration. The operations of 2315 may be performed in accordance with examples as disclosed herein. In some examples, aspects of the operations of 2315 may be performed by a resource determination component 1445 as described with reference to FIG. 14.

At 2320, the method may include communicating with a base station based on the determined frequency resource allocation. The operations of 2320 may be performed in accordance with examples as disclosed herein. In some examples, aspects of the operations of 2320 may be performed by a communication component 1425 as described with reference to FIG. 14.

Figure 24:
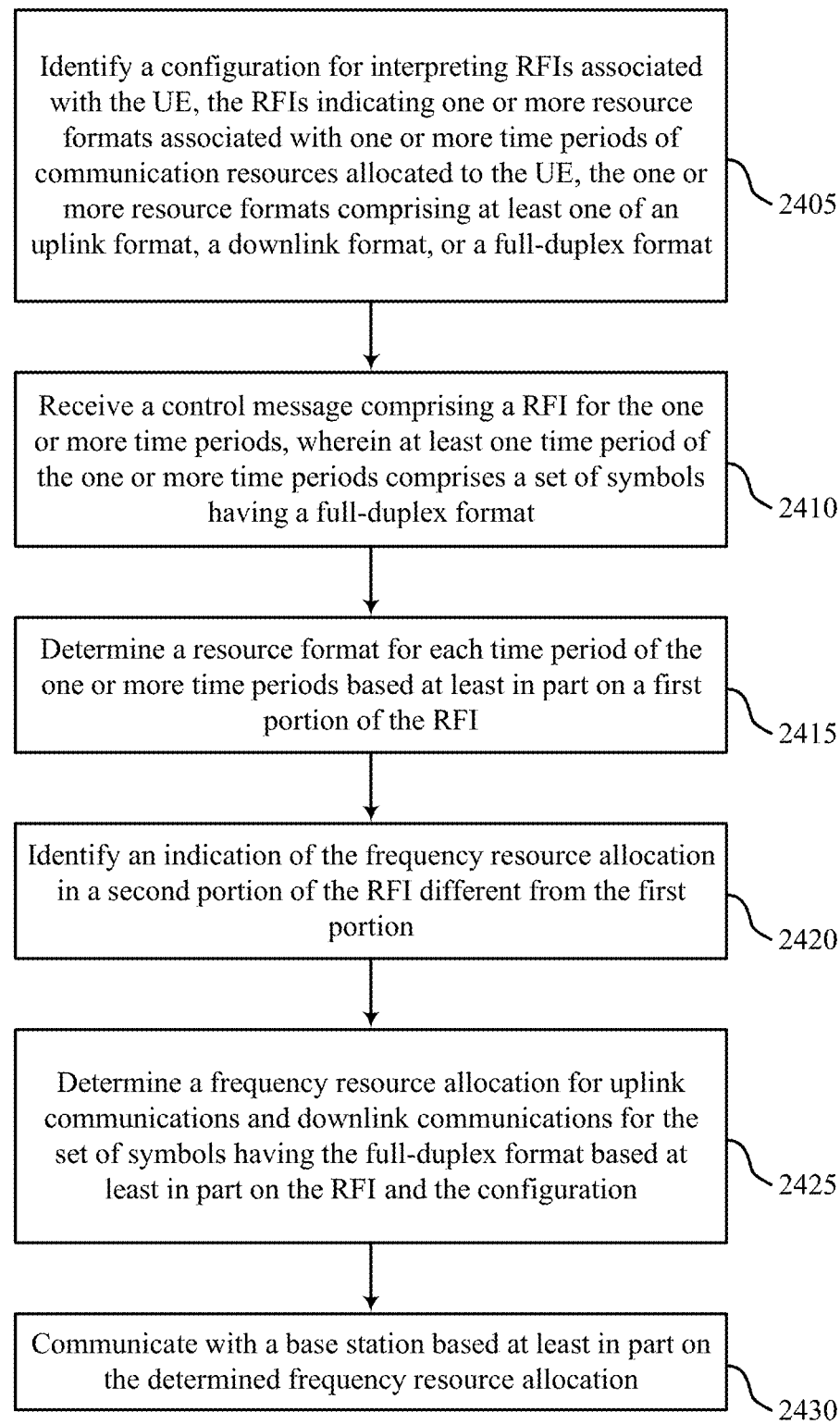

FIG. 24 shows a flowchart illustrating a method 2400 that supports RFIs in BWP management for full-duplex resource allocation in accordance with aspects of the present disclosure. The operations of the method 2400 may be implemented by a UE or its components as described herein. For example, the operations of the method 2400 may be performed by a UE 115 as described with reference to FIGS. 1 through 15. In some examples, a UE may execute a set of instructions to control the functional elements of the UE to perform the described functions. Additionally or alternatively, the UE may perform aspects of the described functions using special-purpose hardware.

At 2405, the method may include identifying a configuration for interpreting RFIs associated with the UE, the RFIs indicating one or more resource formats associated with one or more time periods of communication resources allocated to the UE, the one or more resource formats including at least one of an uplink format, a downlink format, or a full-duplex format. The operations of 2405 may be performed in accordance with examples as disclosed herein. In some examples, aspects of the operations of 2405 may be performed by a configuration identification component 1440 as described with reference to FIG. 14.

At 2410, the method may include receiving a control message including an RFI for the one or more time periods, where at least one time period of the one or more time periods includes a set of symbols having a full-duplex format. The operations of 2410 may be performed in accordance with examples as disclosed herein. In some examples, aspects of the operations of 2410 may be performed by a message reception component 1430 as described with reference to FIG. 14.

At 2415, the method may include determining a resource format for each time period of the one or more time periods based on a first portion of the RFI. The operations of 2415 may be performed in accordance with examples as disclosed herein. In some examples, aspects of the operations of 2415 may be performed by a resource determination component 1445 as described with reference to FIG. 14.

At 2420, the method may include identifying an indication of the frequency resource allocation in a second portion of the RFI different from the first portion. The operations of 2420 may be performed in accordance with examples as disclosed herein. In some examples, aspects of the operations of 2420 may be performed by a resource determination component 1445 as described with reference to FIG. 14.

At 2425, the method may include determining a frequency resource allocation for uplink communications and downlink communications for the set of symbols having the full-duplex format based on the RFI and the configuration. The operations of 2425 may be performed in accordance with examples as disclosed herein. In some examples, aspects of the operations of 2425 may be performed by a resource determination component 1445 as described with reference to FIG. 14.

At 2430, the method may include communicating with a base station based on the determined frequency resource allocation. The operations of 2430 may be performed in accordance with examples as disclosed herein. In some examples, aspects of the operations of 2430 may be performed by a communication component 1425 as described with reference to FIG. 14.

Figure 25:
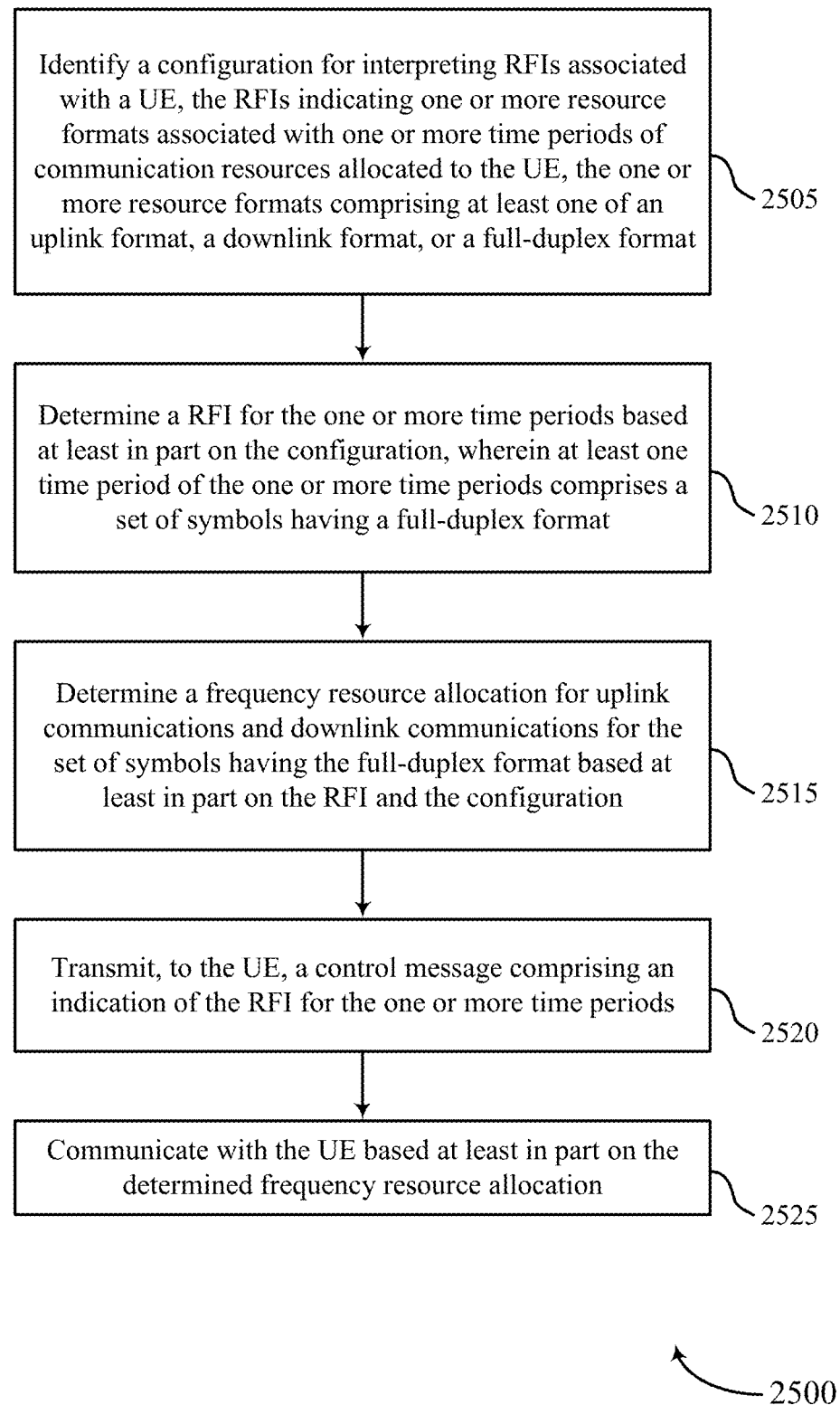

FIG. 25 shows a flowchart illustrating a method 2500 that supports RFIs in BWP management for full-duplex resource allocation in accordance with aspects of the present disclosure. The operations of the method 2500 may be implemented by a base station or its components as described herein. For example, the operations of the method 2500 may be performed by a base station 105 as described with reference to FIGS. 1 through 11 and 16 through 19. In some examples, a base station may execute a set of instructions to control the functional elements of the base station to perform the described functions. Additionally or alternatively, the base station may perform aspects of the described functions using special-purpose hardware.

At 2505, the method may include identifying a configuration for interpreting RFIs associated with a UE, the RFIs indicating one or more resource formats associated with one or more time periods of communication resources allocated to the UE, the one or more resource formats including at least one of an uplink format, a downlink format, or a full-duplex format. The operations of 2505 may be performed in accordance with examples as disclosed herein. In some examples, aspects of the operations of 2505 may be performed by a configuration component 1840 as described with reference to FIG. 18.

At 2510, the method may include determining an RFI for the one or more time periods based on the configuration, where at least one time period of the one or more time periods includes a set of symbols having a full-duplex format. The operations of 2510 may be performed in accordance with examples as disclosed herein. In some examples, aspects of the operations of 2510 may be performed by an RFI determining component 1845 as described with reference to FIG. 18.

At 2515, the method may include determining a frequency resource allocation for uplink communications and downlink communications for the set of symbols having the full-duplex format based on the RFI and the configuration. The operations of 2515 may be performed in accordance with examples as disclosed herein. In some examples, aspects of the operations of 2515 may be performed by a frequency resource component 1850 as described with reference to FIG. 18.

At 2520, the method may include transmitting, to the UE, a control message including an indication of the RFI for the one or more time periods. The operations of 2520 may be performed in accordance with examples as disclosed herein. In some examples, aspects of the operations of 2520 may be performed by a message transmitting component 1830 as described with reference to FIG. 18.

At 2525, the method may include communicating with the UE based on the determined frequency resource allocation. The operations of 2525 may be performed in accordance with examples as disclosed herein. In some examples, aspects of the operations of 2525 may be performed by a communicating component 1825 as described with reference to FIG. 18.

The following provides an overview of aspects of the present disclosure:

Aspect 1: A method for wireless communication at a user equipment (UE), comprising: communicating with a base station using an operating bandwidth part comprising a first set of frequency resources in a carrier bandwidth; receiving a group-common downlink control information message comprising a resource format indicator indicating a second set of frequency resources; modifying the operating bandwidth part based at least in part on the second set of frequency resources; and communicating with the base station using the modified operating bandwidth part.

Aspect 2: The method of aspect 1, wherein the modifying comprises: switching the operating bandwidth part to the second set of frequency resources based at least in part on receiving the group-common downlink control information message.

Aspect 3: The method of aspect 2, wherein the switching comprises: switching from a first active uplink bandwidth part to a second active uplink bandwidth part and from a first active downlink bandwidth part to a second active downlink bandwidth part based at least in part on receiving the group-common downlink control information message.

Aspect 4: The method of any of aspects 1 through 3, wherein the modifying comprises: determining a set of overlapping frequency resources based at least in part on an overlap between the first set of frequency resources and the second set of frequency resources; and reducing the operating bandwidth part to the set of overlapping frequency resources based at least in part on receiving the group-common downlink control information message.

Aspect 5: The method of any of aspects 1 through 4, further comprising: storing a lookup table comprising a plurality of frequency formats, wherein a frequency format of the plurality of frequency formats corresponds to a set of frequency resources of a plurality of sets of frequency resources; and determining the second set of frequency resources based at least in part on a first frequency format of the plurality of frequency formats indicated by the resource format indicator.

Aspect 6: The method of aspect 5, further comprising: receiving, from the base station, a radio resource control configuration message indicating the plurality of frequency formats; and configuring the lookup table based at least in part on the radio resource control configuration message.

Aspect 7: The method of any of aspects 5 through 6, wherein the lookup table comprises, for a set of resources comprising a set of resource elements, a set of resource blocks, a set of resource block groups, or a combination thereof, a plurality of bit maps corresponding to the plurality of sets of frequency resources; and a bit map of the plurality of bit maps comprises a set of indication bits for the set of resources, wherein a first bit value for an indication bit of the set of indication bits indicates an uplink resource configured for a corresponding resource and a second bit value for the indication bit of the set of indication bits indicates a downlink resource configured for the corresponding resource.

Aspect 8: The method of any of aspects 5 through 7, wherein the lookup table comprises, for a set of resources comprising a set of resource elements, a set of resource blocks, a set of resource block groups, or a combination thereof, a plurality of uplink bit maps and a plurality of downlink bit maps corresponding to the plurality of sets of frequency resources; an uplink bit map of the plurality of uplink bit maps comprises a set of uplink indication bits for the set of resources, wherein a first bit value for an uplink indication bit of the set of uplink indication bits indicates an uplink resource configured for a corresponding resource and a second bit value for the uplink indication bit of the set of uplink indication bits indicates an absence of an uplink resource configured for the corresponding resource; and a downlink bit map of the plurality of downlink bit maps comprises a set of downlink indication bits for the set of resources, wherein a first bit value for a downlink indication bit of the set of downlink indication bits indicates a downlink resource configured for the corresponding resource and a second bit value for the downlink indication bit of the set of downlink indication bits indicates an absence of a downlink resource configured for the corresponding resource.

Aspect 9: The method of any of aspects 5 through 8, wherein the lookup table comprises one or more resource indicator values corresponding to a set of frequency resources of the plurality of sets of frequency resources, a resource indicator value of the one or more resource indicator values comprises an indication of a starting resource and an indication of a number of resources corresponding to uplink resources or downlink resources.

Aspect 10: The method of any of aspects 5 through 9, wherein the lookup table comprises an indication of a uplink starting resource, an indication of a number of uplink resources, and an indication of one or more non-uplink reserved resources and an indication of a downlink starting resource, an indication of a number of downlink resources, and an indication of one or more non-downlink reserved resources corresponding to a set of frequency resources of the plurality of sets of frequency resources.

Aspect 11: The method of any of aspects 5 through 10, wherein the first frequency format of the plurality of frequency formats comprises a set of uplink resources, a set of downlink resources, and one or more guard bands, wherein the set of uplink resources is distinct from the set of downlink resources in a frequency domain and the one or more guard bands separate the set of uplink resources from the set of downlink resources in the frequency domain; or the first frequency format of the plurality of frequency formats comprises the set of uplink resources and the set of downlink resources, wherein the set of uplink resources at least partially overlaps with the set of downlink resources in the frequency domain.

Aspect 12: The method of any of aspects 1 through 11, wherein the resource format indicator indicates a slot frequency format identifier corresponding to the second set of frequency resources.

Aspect 13: The method of any of aspects 1 through 12, wherein the resource format indicator indicates a bandwidth part identifier corresponding to the second set of frequency resources.

Aspect 14: The method of aspect 13, wherein the resource format indicator further indicates a resource bandwidth, the bandwidth part identifier indicates a superset of frequency resources and the resource bandwidth indicates a set of usable resources of the superset of frequency resources, the second set of frequency resources comprising the set of usable resources of the superset of frequency resources.

Aspect 15: The method of any of aspects 1 through 14, wherein the group-common downlink control information message comprises a plurality of resource format indicators, the method further comprising: receiving, from the base station, a radio resource control configuration message indicating a position index for the UE; and identifying the resource format indicator corresponding to the UE from the plurality of resource format indicators corresponding to a plurality of UEs based at least in part on the position index for the UE.

Aspect 16: The method of any of aspects 1 through 15, wherein the communicating comprises: communicating with the base station in accordance with a full-duplex mode.

Aspect 17: The method of aspect 16, further comprising: identifying a slot configured with concurrent uplink resources and downlink resources based at least in part on the resource format indicator; and determining a same subcarrier spacing corresponding to the uplink resources and the downlink resources in the slot based at least in part on the full-duplex mode.

Aspect 18: The method of any of aspects 1 through 17, wherein the communicating comprises: communicating with the base station in accordance with a half-duplex mode.

Aspect 19: The method of aspect 18, further comprising: identifying a slot configured with concurrent uplink resources and downlink resources based at least in part on the resource format indicator and in accordance with a full-duplex-aware mode; and determining a first subcarrier spacing corresponding to the uplink resources in the slot and a second subcarrier spacing corresponding to the downlink resources in the slot based at least in part on the half-duplex mode.

Aspect 20: The method of any of aspects 1 through 19, wherein the operating bandwidth part comprises an active uplink bandwidth part and an active downlink bandwidth part.

Aspect 21: A method for wireless communication at a base station, comprising: communicating with a UE using an operating bandwidth part for the UE comprising a first set of frequency resources in a carrier bandwidth; transmitting a group-common downlink control information message comprising a resource format indicator indicating a second set of frequency resources for the UE; modifying the operating bandwidth part for the UE based at least in part on the second set of frequency resources; and communicating with the UE using the modified operating bandwidth part.

Aspect 22: The method of aspect 21, wherein the modifying comprises: switching the operating bandwidth part for the UE to the second set of frequency resources based at least in part on the group-common downlink control information message.

Aspect 23: The method of aspect 22, wherein the switching comprises: switching from a first active uplink bandwidth part for the UE to a second active uplink bandwidth part for the UE and from a first active downlink bandwidth part for the UE to a second active downlink bandwidth part for the UE based at least in part on the group-common downlink control information message.

Aspect 24: The method of any of aspects 21 through 23, wherein the modifying comprises: determining a set of overlapping frequency resources based at least in part on an overlap between the first set of frequency resources and the second set of frequency resources; and reducing the operating bandwidth part for the UE to the set of overlapping frequency resources based at least in part on the group-common downlink control information message.

Aspect 25: The method of aspect 24, further comprising: selecting the second set of frequency resources for the UE based at least in part on the first set of frequency resources.

Aspect 26: The method of any of aspects 21 through 25, further comprising: transmitting, to the UE, a radio resource control configuration message indicating a plurality of slot frequency formats, a plurality of bandwidth part formats, or a combination thereof, wherein the resource format indicator comprises a slot frequency format identifier indicating a slot frequency format of the plurality of slot frequency formats, a bandwidth part identifier indicating a bandwidth part format of the plurality of bandwidth part formats, or a combination thereof corresponding to the second set of frequency resources.

Aspect 27: The method of any of aspects 21 through 26, further comprising: transmitting, to the UE, a radio resource control configuration message indicating a position index for the UE, wherein the resource format indicator corresponds to the UE based at least in part on the position index for the UE.

Aspect 28: The method of aspect 27, wherein the group-common downlink control information message comprises an additional resource format indicator, the method further comprising: transmitting, to an additional UE, an additional radio resource control configuration message indicating an additional position index for the additional UE, wherein the additional resource format indicator corresponds to the additional UE based at least in part on the additional position index for the additional UE; and communicating with the additional UE based at least in part on the additional resource format indicator.

Aspect 29: The method of aspect 28, wherein the additional resource format indicator indicates one or more slot formats; and the additional resource format indicator does not indicate frequency resources based at least in part on the one or more slot formats not comprising concurrent uplink resources and downlink resources.

Aspect 30: The method of any of aspects 28 through 29, wherein the additional resource format indicator does not indicate frequency resources based at least in part on the additional UE operating according to a half-duplex mode.

Aspect 31: The method of any of aspects 21 through 30, further comprising: generating the resource format indicator to indicate one or more slots comprising concurrent uplink resources and downlink resources for at least a portion of the one or more slots and to indicate the second set of frequency resources based at least in part on the one or more slots comprising the concurrent uplink resources and downlink resources.

Aspect 32: A method for wireless communication at a user equipment (UE), comprising: identifying a configuration for interpreting resource format indicators associated with the UE, the resource format indicators indicating one or more resource formats associated with one or more time periods of communication resources allocated to the UE, the one or more resource formats comprising at least one of an uplink format, a downlink format, or a full-duplex format; receiving a control message comprising a resource format indicator for the one or more time periods, wherein at least one time period of the one or more time periods comprises a set of symbols having a full-duplex format; determining a frequency resource allocation for uplink communications and downlink communications for the set of symbols having the full-duplex format based at least in part on the resource format indicator and the configuration; and communicating with a base station based at least in part on the determined frequency resource allocation.

Aspect 33: The method of aspect 32, further comprising: determining a resource format for each time period of the one or more time periods based at least in part on a first portion of the resource format indicator; and identifying an indication of the frequency resource allocation in a second portion of the resource format indicator different from the first portion.

Aspect 34: The method of aspect 33, further comprising: identifying, within the control message, an index associated with the UE indicating a position of the resource format indicator within the control message; monitoring the first portion of the resource format indicator based at least in part on the index; and monitoring the second portion of the resource format indicator based at least in part on the at least one time period of the one or more time periods comprising the set of symbols having a full-duplex format.

Aspect 35: The method of any of aspects 32 through 34, further comprising: identifying an indication of the frequency resource allocation in a portion of the control message reserved for indications of frequency resource allocations for a plurality of resource format indicators of the control message.

Aspect 36: The method of aspect 35, further comprising: identifying, within the control message, a first index indicating for the UE to monitor a first portion of the control message; and identifying, within the control message, a second index indicating for the UE to monitor a second portion of the control message different from the first portion, the second portion comprising the portion of the control message reserved for indications of frequency resource allocations for the plurality of resource format indicators of the control message.

Aspect 37: The method of any of aspects 32 through 36, further comprising: determining a resource format for each time period of the one or more time periods based at least in part on a first portion of the resource format indicator; identifying a first time period of the one or more time periods comprising a first set of symbols having the full-duplex format and a second time period of the one or more time periods comprising a second set of symbols having a full-duplex format; monitoring a second portion of the resource format indicator based at least in part on identifying the first time period comprising the first set of symbols having the full-duplex format; and monitoring a third portion of the resource format indicator based at least in part on identifying the second time period comprising the second set of symbols having the full-duplex format.

Aspect 38: The method of aspect 37, further comprising: determining a first frequency resource allocation associated with the first set of symbols having the full-duplex format based at least in part on monitoring the second portion of the resource format indicator; and determining a second frequency resource allocation associated with the second set of symbols having the full-duplex format based at least in part on monitoring the third portion of the resource format indicator.

Aspect 39: The method of any of aspects 32 through 38, further comprising: determining a resource format for each time period of the one or more time periods based at least in part on the resource format indicator; identifying a first time period of the one or more time periods comprising a first set of symbols having a full-duplex format and a second time period of the one or more time periods comprising a second set of symbols having the full-duplex format; and monitoring a portion of the control message reserved for indications of frequency resource allocations for a plurality of resource format indicators of the control message based at least in part on identifying the first time period comprising the first set of symbols having the full-duplex format, the second time period comprising the second set of symbols having the full-duplex format, or both.

Aspect 40: The method of aspect 39, further comprising: determining a first frequency resource allocation associated with the first set of symbols having the full-duplex format based at least in part on monitoring the portion of the control message reserved for indications of frequency resource allocations for the plurality of resource format indicators of the control message; and determining a second frequency resource allocation associated with the second set of symbols having the full-duplex format based at least in part on monitoring the portion of the control message reserved for indications of frequency resource allocations for the plurality of resource format indicators of the control message.

Aspect 41: The method of any of aspects 32 through 40, further comprising: identifying, from the configuration for interpreting resource format indicators associated with the UE, a first configuration associated with resource format indicators indicating a single time period comprising a set of symbols having a full-duplex format; and identifying, from the configuration for interpreting resource format indicators associated with the UE, a second configuration associated with resource format indicators indicating two or more time periods comprising sets of symbols having the full-duplex format.

Aspect 42: The method of any of aspects 32 through 41, wherein the configuration for interpreting resource format indicators comprises a combined configuration comprising a time resource allocation scheme and a frequency resource allocation scheme, wherein the method further comprises: determining a resource format for each time period of the one or more time periods based at least in part on the resource format indicator and the time resource allocation scheme; and identifying an indication of the frequency resource allocation for the set of symbols having the full-duplex format based at least in part on the resource format indicator and the frequency resource allocation scheme.

Aspect 43: The method of any of aspects 32 through 42, further comprising: identifying, within the control message, an index for each of a plurality of component carriers associated with the UE, each index indicating a position of the resource format indicator within the control message for each of the plurality of component carriers.

Aspect 44: The method of any of aspects 32 through 43, further comprising: identifying, within the control message, an index for a first component carrier of a plurality of component carriers associated with the UE, the index for the first component carrier indicating a position of the resource format indicator within the control message for each of the plurality of component carriers.

Aspect 45: The method of any of aspects 32 through 44, wherein the configuration for interpreting resource format indicators associated with the UE is based at least in part on a capability of the UE to recognize the full-duplex format.

Aspect 46: The method of aspect 45, further comprising: identifying, within the control message, an index associated with the UE indicating a position of the resource format indicator within the control message, wherein the resource format indicator associated with the index is based at least in part on the configuration for interpreting resource format indicators and the capability of the UE to recognize the full-duplex format.

Aspect 47: The method of aspect 46, further comprising: identifying, within the control message, an index associated with the UE indicating a position of the resource format indicator within the control message, wherein identifying the index is based at least in part on the configuration for interpreting resource format indicators and the capability of the UE to recognize the full-duplex format.

Aspect 48: The method of any of aspects 32 through 47, wherein receiving the control message is based at least in part on a capability of the UE to recognize the full-duplex format.

Aspect 49: The method of any of aspects 32 through 48, further comprising: receiving, from the base station, a radio resource control message comprising an indication of the configuration for interpreting resource format indicators, wherein identifying the configuration is based at least in part on receiving the radio resource control message.

Aspect 50: The method of any of aspects 32 through 49, wherein the frequency resource allocation is associated with each symbol of the set of symbols having the full-duplex format.

Aspect 51: The method of any of aspects 32 through 50, wherein the control message comprises group-common downlink control information.

Aspect 52: The method of any of aspects 32 through 51, wherein the frequency resource allocation for uplink communications and downlink communications for the set of symbols having the full-duplex format comprises a guard band between frequency resources for uplink communications and frequency resources for downlink communications.

Aspect 53: The method of any of aspects 32 through 52, wherein the frequency resource allocation for uplink communications and downlink communications for the set of symbols having the full-duplex format comprises an overlap between frequency resources for uplink communications and frequency resources for downlink communications.

Aspect 54: A method for wireless communication at a base station, comprising: identifying a configuration for interpreting resource format indicators associated with a UE, the resource format indicators indicating one or more resource formats associated with one or more time periods of communication resources allocated to the UE, the one or more resource formats comprising at least one of an uplink format, a downlink format, or a full-duplex format; determining a resource format indicator for the one or more time periods based at least in part on the configuration, wherein at least one time period of the one or more time periods comprises a set of symbols having a full-duplex format; determining a frequency resource allocation for uplink communications and downlink communications for the set of symbols having the full-duplex format based at least in part on the resource format indicator and the configuration; transmitting, to the UE, a control message comprising an indication of the resource format indicator for the one or more time periods; and communicating with the UE based at least in part on the determined frequency resource allocation.

Aspect 55: The method of aspect 54, further comprising: indicating a resource format for each time period of the one or more time periods based at least in part on a first portion of the resource format indicator; and indicating the frequency resource allocation in a second portion of the resource format indicator different from the first portion.

Aspect 56: The method of any of aspects 54 through 55, further comprising: indicating the frequency resource allocation in a portion of the control message reserved for indications of frequency resource allocations for a plurality of resource format indicators of the control message.

Aspect 57: The method of aspect 56, further comprising: indicating, within the control message, a first index indicating for the UE to monitor a first portion of the control message; and indicating, within the control message, a second index indicating for the UE to monitor a second portion of the control message different from the first portion, the second portion comprising the portion of the control message reserved for indications of frequency resource allocations for the plurality of resource format indicators of the control message.

Aspect 58: The method of any of aspects 54 through 57, further comprising: determining a resource format for each time period of the one or more time periods based at least in part on a first portion of the resource format indicator; identifying a first time period of the one or more time periods comprising a first set of symbols having the full-duplex format and a second time period of the one or more time periods comprising a second set of symbols having the full-duplex format; indicating a first frequency resource allocation associated with the first set of symbols having the full-duplex format in a second portion of the resource format indicator; and indicating a second frequency resource allocation associated with the second set of symbols having the full-duplex format in a third portion of the resource format indicator.

Aspect 59: The method of any of aspects 54 through 58, further comprising: determining a resource format for each time period of the one or more time periods based at least in part on a first portion of the resource format indicator; identifying a first time period of the one or more time periods comprising a first set of symbols having the full-duplex format and a second time period of the one or more time periods comprising a second set of symbols having the full-duplex format; and indicating a first frequency resource allocation associated with the first set of symbols having the full-duplex format, a second frequency resource allocation associated with the second set of symbols having the full-duplex format, or both, in a portion of the control message reserved for indications of frequency resource allocations for a plurality of resource format indicators of the control message.

Aspect 60: The method of any of aspects 54 through 59, further comprising: indicating, to the UE via the configuration for interpreting resource format indicators associated with the UE, a first configuration associated with resource format indicators indicating a single time period comprising a set of symbols configure for full-duplex communications; and indicating, to the UE via the configuration for interpreting resource format indicators associated with the UE, a second configuration associated with resource format indicators indicating two or more time periods comprising sets of symbols having the full-duplex format.

Aspect 61: The method of any of aspects 54 through 60, wherein the configuration for interpreting resource format indicators comprises a combined configuration comprising a time resource allocation scheme and a frequency resource allocation scheme, wherein the method further comprises: indicating, to the UE, a resource format for each time period of the one or more time periods based at least in part on the resource format indicator and the time resource allocation scheme; and indicating, to the UE, the frequency resource allocation for the set of symbols having the full-duplex format based at least in part on the resource format indicator and the frequency resource allocation scheme.

Aspect 62: The method of any of aspects 54 through 61, further comprising: indicating, within the control message, an index for each of a plurality of component carriers associated with the UE, each index indicating a position of the resource format indicator within the control message for each of the plurality of component carriers.

Aspect 63: The method of any of aspects 54 through 62, further comprising: indicating, within the control message, an index for a first component carrier of a plurality of component carriers associated with the UE, the index for the first component carrier indicating a position of the resource format indicator within the control message for each of the plurality of component carriers.

Aspect 64: The method of any of aspects 54 through 63, wherein the configuration for interpreting resource format indicators associated with the UE is based at least in part on a capability of the UE to recognize the full-duplex format.

Aspect 65: The method of aspect 64, further comprising: indicating, within the control message, an index associated with the UE indicating a position of the resource format indicator within the control message, wherein the resource format indicator associated with the index is based at least in part on the configuration for interpreting resource format indicators and the capability of the UE to recognize the full-duplex format.

Aspect 66: The method of any of aspects 64 through 65, further comprising: indicating, within the control message, an index associated with the UE indicating a position of the resource format indicator within the control message, wherein indicating the index is based at least in part on the configuration for interpreting resource format indicators and the capability of the UE to recognize the full-duplex format.

Aspect 67: The method of any of aspects 54 through 66, wherein transmitting the control message is based at least in part on a capability of the UE to recognize the full-duplex format.

Aspect 68: The method of any of aspects 54 through 67, further comprising: transmitting, to the UE, a radio resource control message comprising an indication of the configuration for interpreting resource format indicators.

Aspect 69: The method of any of aspects 54 through 68, wherein the frequency resource allocation is associated with each symbol of the set of symbols having the full-duplex format.

Aspect 70: The method of any of aspects 54 through 69, wherein the control message comprises group-common downlink control information.

Aspect 71: The method of any of aspects 54 through 70, wherein the frequency resource allocation for uplink communications and downlink communications for the set of symbols having the full-duplex format comprises a guard band between frequency resources for uplink communications and frequency resources for downlink communications.

Aspect 72: The method of any of aspects 54 through 71, wherein the frequency resource allocation for uplink communications and downlink communications for the set of symbols having the full-duplex format comprises an overlap between frequency resources for uplink communications and frequency resources for downlink communications.

Aspect 73: An apparatus for wireless communication at a UE, comprising a processor; memory coupled with the processor; and instructions stored in the memory and executable by the processor to cause the apparatus to perform a method of any of aspects 1 through 20.

Aspect 74: An apparatus for wireless communication at a UE, comprising at least one means for performing a method of any of aspects 1 through 20.

Aspect 75: A non-transitory computer-readable medium storing code for wireless communication at a UE, the code comprising instructions executable by a processor to perform a method of any of aspects 1 through 20.

Aspect 76: An apparatus for wireless communication at a base station, comprising a processor; memory coupled with the processor; and instructions stored in the memory and executable by the processor to cause the apparatus to perform a method of any of aspects 21 through 31.

Aspect 77: An apparatus for wireless communication at a base station, comprising at least one means for performing a method of any of aspects 21 through 31.

Aspect 78: A non-transitory computer-readable medium storing code for wireless communication at a base station, the code comprising instructions executable by a processor to perform a method of any of aspects 21 through 31.

Aspect 79: An apparatus for wireless communication at a UE, comprising a processor; memory coupled with the processor; and instructions stored in the memory and executable by the processor to cause the apparatus to perform a method of any of aspects 32 through 53.

Aspect 80: An apparatus for wireless communication at a UE, comprising at least one means for performing a method of any of aspects 32 through 53.

Aspect 81: A non-transitory computer-readable medium storing code for wireless communication at a UE, the code comprising instructions executable by a processor to perform a method of any of aspects 32 through 53.

Aspect 82: An apparatus for wireless communication at a base station, comprising a processor; memory coupled with the processor; and instructions stored in the memory and executable by the processor to cause the apparatus to perform a method of any of aspects 54 through 72.

Aspect 83: An apparatus for wireless communication at a base station, comprising at least one means for performing a method of any of aspects 54 through 72.

Aspect 84: A non-transitory computer-readable medium storing code for wireless communication at a base station, the code comprising instructions executable by a processor to perform a method of any of aspects 54 through 72.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
  communicating with a network entity using an operating bandwidth part that comprises a first set of frequency resources of a carrier bandwidth;

receiving group-common downlink control information that comprises a resource format indicator indicating a second set of frequency resources;

modifying the operating bandwidth part based at least in part on the group-common downlink control information, wherein modifying the operating bandwidth part comprises reducing the operating bandwidth part to a subset of the first set of frequency resources that overlap with the second set of frequency resources; and communicating with the network entity using the modified operating bandwidth part.

2. The method of claim 1, wherein the modifying comprises:

switching the operating bandwidth part to the second set of frequency resources based at least in part on receiving the group-common downlink control information, wherein the switching comprises switching from a first active uplink bandwidth part to a second active uplink bandwidth part and from a first active downlink bandwidth part to a second active downlink bandwidth part based at least in part on receiving the group-common downlink control information.

3. The method of claim 1, wherein the modifying comprises:

determining a set of overlapping frequency resources based at least in part on an overlap between the first set of frequency resources and the second set of frequency resources; and reducing the operating bandwidth part to the set of overlapping frequency resources based at least in part on receiving the group-common downlink control information.

4. The method of claim 1, further comprising:

receiving, from the network entity, a radio resource control configuration message indicating a plurality of frequency formats;

configuring a lookup table comprising the plurality of frequency formats based at least in part on the radio resource control configuration message;

storing the lookup table, wherein a frequency format of the plurality of frequency formats corresponds to a set of frequency resources of a plurality of sets of frequency resources; and determining the second set of frequency resources based at least in part on a first frequency format of the plurality of frequency formats indicated by the resource format indicator.

5. The method of claim 4, wherein:

the lookup table comprises, for a set of resources comprising a set of resource elements, a set of resource blocks, a set of resource block groups, or a combination thereof, a plurality of bit maps corresponding to the plurality of sets of frequency resources; and a bit map of the plurality of bit maps comprises a set of indication bits for the set of resources, wherein a first bit value for an indication bit of the set of indication bits indicates an uplink resource configured for a corresponding resource and a second bit value for the indication bit of the set of indication bits indicates a downlink resource configured for the corresponding resource.

6. The method of claim 4, wherein:

the lookup table comprises, for a set of resources comprising a set of resource elements, a set of resource blocks, a set of resource block groups, or a combination thereof, a plurality of uplink bit maps and a plurality of downlink bit maps corresponding to the plurality of sets of frequency resources;

an uplink bit map of the plurality of uplink bit maps comprises a set of uplink indication bits for the set of resources, wherein a first bit value for an uplink indication bit of the set of uplink indication bits indicates an uplink resource configured for a corresponding resource and a second bit value for the uplink indication bit of the set of uplink indication bits indicates an absence of an uplink resource configured for the corresponding resource; and a downlink bit map of the plurality of downlink bit maps comprises a set of downlink indication bits for the set of resources, wherein a first bit value for a downlink indication bit of the set of downlink indication bits indicates a downlink resource configured for the corresponding resource and a second bit value for the downlink indication bit of the set of downlink indication bits indicates an absence of a downlink resource configured for the corresponding resource.

7. The method of claim 4, wherein:

the lookup table comprises one or more resource indicator values corresponding to a set of frequency resources of the plurality of sets of frequency resources; and a resource indicator value of the one or more resource indicator values comprises an indication of a starting resource and an indication of a number of resources corresponding to uplink resources or downlink resources.

8. The method of claim 4, wherein the lookup table comprises an indication of an uplink starting resource, an indication of a number of uplink resources, and an indication of one or more non-uplink reserved resources and an indication of a downlink starting resource, an indication of a number of downlink resources, and an indication of one or more non-downlink reserved resources corresponding to a set of frequency resources of the plurality of sets of frequency resources.

9. The method of claim 4, wherein:

the first frequency format of the plurality of frequency formats comprises a set of uplink resources, a set of downlink resources, and one or more guard bands, wherein the set of uplink resources is distinct from the set of downlink resources in a frequency domain and the one or more guard bands separate the set of uplink resources from the set of downlink resources in the frequency domain; or the first frequency format of the plurality of frequency formats comprises the set of uplink resources and the set of downlink resources, wherein the set of uplink resources at least partially overlaps with the set of downlink resources in the frequency domain.

10. The method of claim 1, wherein the resource format indicator indicates a slot frequency format identifier corresponding to the second set of frequency resources, a bandwidth part identifier corresponding to the second set of frequency resources, or both.

11. The method of claim 10, wherein:

the resource format indicator further indicates a resource bandwidth; and the bandwidth part identifier indicates a superset of frequency resources and the resource bandwidth indicates a set of usable resources of the superset of frequency resources, the second set of frequency resources comprising the set of usable resources of the superset of frequency resources.

12. The method of claim 1, wherein the group-common downlink control information comprises a plurality of resource format indicators, the method further comprising:
receiving, from the network entity, a radio resource control configuration message indicating a position index for the UE; and
identifying the resource format indicator corresponding to the UE from the plurality of resource format indicators corresponding to a plurality of UEs based at least in part on the position index for the UE.

13. The method of claim 1, wherein the communicating comprises:
communicating with the network entity in accordance with a full-duplex mode, the method further comprising:
identifying a slot configured with concurrent uplink resources and downlink resources based at least in part on the resource format indicator; and
determining a same subcarrier spacing corresponding to the uplink resources and the downlink resources in the slot based at least in part on the full-duplex mode.

14. The method of claim 1, wherein the communicating comprises:
communicating with the network entity in accordance with a half-duplex mode, the method further comprising:
identifying a slot configured with concurrent uplink resources and downlink resources based at least in part on the resource format indicator and in accordance with a full-duplex-aware mode; and
determining a first subcarrier spacing corresponding to the uplink resources in the slot and a second subcarrier spacing corresponding to the downlink resources in the slot based at least in part on the half-duplex mode.

15. A method for wireless communication at a network entity, comprising:
communicating with a user equipment (UE) using an operating bandwidth part that comprises a first set of frequency resources of a carrier bandwidth;
transmitting group-common downlink control information that comprises a resource format indicator indicating a second set of frequency resources;
modifying the operating bandwidth part based at least in part on the group-common downlink control information, wherein modifying the operating bandwidth part comprises reducing the operating bandwidth part to a subset of the first set of frequency resources that overlap with the second set of frequency resources; and
communicating with the UE using the modified operating bandwidth part.

16. The method of claim 15, wherein the modifying comprises:
switching the operating bandwidth part for the UE to the second set of frequency resources based at least in part on the group-common downlink control information, wherein the switching comprises switching from a first active uplink bandwidth part for the UE to a second active uplink bandwidth part for the UE and from a first active downlink bandwidth part for the UE to a second active downlink bandwidth part for the UE based at least in part on the group-common downlink control information.

17. The method of claim 15, wherein the modifying comprises:

determining a set of overlapping frequency resources based at least in part on an overlap between the first set of frequency resources and the second set of frequency resources; and
reducing the operating bandwidth part for the UE to the set of overlapping frequency resources based at least in part on the group-common downlink control information or selecting the second set of frequency resources for the UE based at least in part on the first set of frequency resources.

18. The method of claim 15, further comprising:
transmitting, to the UE, a radio resource control configuration message indicating a plurality of slot frequency formats, a plurality of bandwidth part formats, a position index for the UE, or a combination thereof, wherein the resource format indicator comprises a slot frequency format identifier indicating a slot frequency format of the plurality of slot frequency formats, a bandwidth part identifier indicating a bandwidth part format of the plurality of bandwidth part formats, or a combination thereof corresponding to the second set of frequency resources, and wherein the resource format indicator corresponds to the UE based at least in part on the position index for the UE.

19. The method of claim 18, wherein the group-common downlink control information comprises an additional resource format indicator, the method further comprising:
transmitting, to an additional UE, an additional radio resource control configuration message indicating an additional position index for the additional UE, wherein the additional resource format indicator corresponds to the additional UE based at least in part on the additional position index for the additional UE; and
communicating with the additional UE based at least in part on the additional resource format indicator.

20. The method of claim 19, wherein:
the additional resource format indicator indicates one or more slot formats; and
the additional resource format indicator does not indicate frequency resources based at least in part on the one or more slot formats not comprising concurrent uplink resources and downlink resources or the additional UE operating according to a half-duplex mode.

21. The method of claim 15, further comprising:
generating the resource format indicator to indicate one or more slots comprising concurrent uplink resources and downlink resources for at least a portion of the one or more slots and to indicate the second set of frequency resources based at least in part on the one or more slots comprising the concurrent uplink resources and downlink resources.

22. A method for wireless communication at a user equipment (UE), comprising:
receiving group-common downlink control information comprising a resource format indicator associated with a time period;
determining that a set of symbols within the time period has a full-duplex format based at least in part on the resource format indicator and a configuration for interpreting resource format indicators;
determining a downlink frequency resource allocation and an uplink frequency resource allocation for the set of symbols having the full-duplex format based at least in part on the group-common downlink control information and the configuration; and communicating with a network entity using the uplink frequency resource allocation and the downlink frequency resource allocation during the set of symbols.

23. The method of claim 22, further comprising:
determining a resource format for the time period based at least in part on a first portion of the resource format indicator; and
identifying an indication of the downlink frequency resource allocation and the uplink frequency resource allocation in a second portion of the resource format indicator different from the first portion.

24. The method of claim 23, further comprising:
identifying, within the group-common downlink control information, an index associated with the UE indicating a position of the resource format indicator within the group-common downlink control information;
monitoring the first portion of the resource format indicator based at least in part on the index; and
monitoring the second portion of the resource format indicator based at least in part on the time period comprising the set of symbols having a full-duplex format.

25. The method of claim 23, further comprising:
identifying, within the group-common downlink control information, a first index indicating for the UE to monitor a first portion of the group-common downlink control information;
identifying, within the group-common downlink control information, a second index indicating for the UE to monitor a second portion of the group-common downlink control information different from the first portion, the second portion comprising a portion of the group-common downlink control information reserved for indications of frequency resource allocations for a plurality of resource format indicators of the group-common downlink control information; and
identifying an indication of the downlink frequency resource allocation and the uplink frequency resource allocation in the second portion.

26. The method of claim 22, further comprising:
determining a resource format for the time period based at least in part on a first portion of the resource format indicator;
identifying a first time period comprising a first set of symbols having the full-duplex format and a second time period comprising a second set of symbols having a full-duplex format;
monitoring a second portion of the resource format indicator based at least in part on identifying the first time period comprising the first set of symbols having the full-duplex format; and
monitoring a third portion of the resource format indicator based at least in part on identifying the second time period comprising the second set of symbols having the full-duplex format.

27. The method of claim 26, further comprising:
determining a first frequency resource allocation associated with the first set of symbols having the full-duplex format based at least in part on monitoring the second portion of the resource format indicator; and
determining a second frequency resource allocation associated with the second set of symbols having the full-duplex format based at least in part on monitoring the third portion of the resource format indicator.

28. The method of claim 22, further comprising:
determining a resource format for the time period based at least in part on the resource format indicator;
identifying a first time period comprising a first set of symbols having a full-duplex format and a second time period comprising a second set of symbols having the full-duplex format; and
monitoring a portion of the group-common downlink control information reserved for indications of frequency resource allocations for a plurality of resource format indicators of the group-common downlink control information based at least in part on identifying the first time period comprising the first set of symbols having the full-duplex format, the second time period comprising the second set of symbols having the full-duplex format, or both.

29. The method of claim 28, further comprising:
determining a first frequency resource allocation associated with the first set of symbols having the full-duplex format based at least in part on monitoring the portion of the group-common downlink control information reserved for indications of frequency resource allocations for the plurality of resource format indicators of the group-common downlink control information; and
determining a second frequency resource allocation associated with the second set of symbols having the full-duplex format based at least in part on monitoring the portion of the group-common downlink control information reserved for indications of frequency resource allocations for the plurality of resource format indicators of the group-common downlink control information.

30. The method of claim 22, further comprising:
identifying, from the configuration for interpreting resource format indicators associated with the UE, a first configuration associated with resource format indicators indicating a single time period comprising a set of symbols having a full-duplex format; and
identifying, from the configuration for interpreting resource format indicators associated with the UE, a second configuration associated with resource format indicators indicating two or more time periods comprising sets of symbols having the full-duplex format.

31. The method of claim 22, wherein the configuration for interpreting resource format indicators comprises a combined configuration comprising a time resource allocation scheme and a frequency resource allocation scheme, wherein the method further comprises:
determining a resource format for each the time period based at least in part on the resource format indicator and the time resource allocation scheme; and
identifying an indication of the downlink frequency resource allocation and the uplink frequency resource allocation for the set of symbols having the full-duplex format based at least in part on the resource format indicator and the frequency resource allocation scheme.

32. The method of claim 22, further comprising:
identifying, within the group-common downlink control information, an index for each of a plurality of component carriers associated with the UE, each index indicating a position of the resource format indicator within the group-common downlink control information for each of the plurality of component carriers; or
identifying, within the group-common downlink control information, an index for a first component carrier of the plurality of component carriers associated with the UE, the index for the first component carrier indicating a position of the resource format indicator within the group-common downlink control information for each of the plurality of component carriers; or identifying, within the group-common downlink control information, an index associated with the UE indicating a position of the resource format indicator within the group-common downlink control information, wherein the resource format indicator associated with the index is based at least in part on the configuration for interpreting resource format indicators and a capability of the UE to recognize the full-duplex format; or identifying, within the group-common downlink control information, an index associated with the UE indicating a position of the resource format indicator within the group-common downlink control information, wherein identifying the index is based at least in part on the configuration for interpreting resource format indicators and a capability of the UE to recognize the full-duplex format.

33. The method of claim 22, wherein receiving the group-common downlink control information, identifying the configuration, or both are based at least in part on a capability of the UE to recognize the full-duplex format.

34. The method of claim 22, further comprising:
receiving, from the network entity, a radio resource control message comprising an indication of the configuration for interpreting resource format indicators, wherein identifying the configuration is based at least in part on receiving the radio resource control message.

35. The method of claim 22, wherein the uplink frequency resource allocation and the downlink frequency resource allocation are associated with each symbol of the set of symbols having the full-duplex format.

36. The method of claim 22, wherein the downlink frequency resource allocation and the uplink frequency resource allocation for the set of symbols having the full-duplex format comprises a guard band between frequency resources for uplink communications and frequency resources for downlink communications or an overlap between frequency resources for uplink communications and frequency resources for downlink communications.

37. A method for wireless communication at a network entity, comprising:
determining a downlink frequency resource allocation and an uplink frequency resource allocation for a set of symbols having a full-duplex format based at least in part on a configuration for interpreting resource format indicators;
transmitting group-common downlink control information comprising a resource format indicator associated with a time period that includes the set of symbols, wherein a first portion of the resource format indicator indicates the full-duplex format of the set of symbols and a second portion of the resource format indicator indicates both the downlink frequency resource allocation and the uplink frequency resource allocation for the set of symbols having the full-duplex format; and
communicating with a user equipment (UE) using the downlink frequency resource allocation and the uplink frequency resource allocation during the set of symbols.

38. The method of claim 37, further comprising:
indicating a resource format for the time period based at least in part on a first portion of the resource format indicator; and
indicating the downlink frequency resource allocation and the uplink frequency resource allocation in a second portion of the resource format indicator different from the first portion, wherein the second portion comprises a portion of the group-common downlink control information reserved for indications of frequency resource allocations for a plurality of resource format indicators of the group-common downlink control information.

39. The method of claim 38, further comprising:
indicating, within the group-common downlink control information, a first index indicating for the UE to monitor a first portion of the group-common downlink control information; and
indicating, within the group-common downlink control information, a second index indicating for the UE to monitor a second portion of the group-common downlink control information different from the first portion, the second portion comprising the portion of the group-common downlink control information reserved for indications of frequency resource allocations for the plurality of resource format indicators of the group-common downlink control information.

40. The method of claim 37, further comprising:
determining a resource format for the time period based at least in part on a first portion of the resource format indicator;
identifying a first time period comprising a first set of symbols having the full-duplex format and a second time period comprising a second set of symbols having the full-duplex format;
indicating a first frequency resource allocation associated with the first set of symbols having the full-duplex format in a second portion of the resource format indicator; and
indicating a second frequency resource allocation associated with the second set of symbols having the full-duplex format in a third portion of the resource format indicator.

41. The method of claim 37, further comprising:
determining a resource format for the time period based at least in part on a first portion of the resource format indicator;
identifying a first time period comprising a first set of symbols having the full-duplex format and a second time period comprising a second set of symbols having the full-duplex format; and
indicating a first frequency resource allocation associated with the first set of symbols having the full-duplex format, a second frequency resource allocation associated with the second set of symbols having the full-duplex format, or both, in a portion of the group-common downlink control information reserved for indications of frequency resource allocations for a plurality of resource format indicators of the group-common downlink control information.

42. The method of claim 37, further comprising:
indicating, to the UE via the configuration for interpreting resource format indicators associated with the UE, a first configuration associated with resource format indicators indicating a single time period comprising a set of symbols configure for full-duplex communications; and
indicating, to the UE via the configuration for interpreting resource format indicators associated with the UE, a second configuration associated with resource format indicators indicating two or more time periods comprising sets of symbols having the full-duplex format.

43. The method of claim 37, wherein the configuration for interpreting resource format indicators comprises a combined configuration comprising a time resource allocation scheme and a frequency resource allocation scheme, wherein the method further comprises:

indicating, to the UE, a resource format for the time period based at least in part on the resource format indicator and the time resource allocation scheme; and indicating, to the UE, the downlink frequency resource allocation and the uplink frequency resource allocation for the set of symbols having the full-duplex format based at least in part on the resource format indicator and the frequency resource allocation scheme.

44. The method of claim 37, further comprising:

indicating, within the group-common downlink control information, an index for each of a plurality of component carriers associated with the UE, each index indicating a position of the resource format indicator within the group-common downlink control information for each of the plurality of component carriers; or indicating, within the group-common downlink control information, an index for a first component carrier of the plurality of component carriers associated with the UE, the index for the first component carrier indicating a position of the resource format indicator within the group-common downlink control information for each of the plurality of component carriers; or indicating, within the group-common downlink control information, an index associated with the UE indicating a position of the resource format indicator within the group-common downlink control information, wherein the resource format indicator associated with the index is based at least in part on the configuration for interpreting resource format indicators and a capability of the UE to recognize the full-duplex format; or indicating, within the group-common downlink control information, an index associated with the UE indicating a position of the resource format indicator within the group-common downlink control information, wherein indicating the index is based at least in part on the configuration for interpreting resource format indicators and a capability of the UE to recognize the full-duplex format.

45. The method of claim 37, wherein transmitting the group-common downlink control information or identifying the configuration for interpreting resource format indicators associated with the UE is based at least in part on a capability of the UE to recognize the full-duplex format.

46. The method of claim 37, further comprising:

transmitting, to the UE, a radio resource control message comprising an indication of the configuration for interpreting resource format indicators.

47. The method of claim 37, wherein the downlink frequency resource allocation and the uplink frequency resource allocation is associated with each symbol of the set of symbols having the full-duplex format.

48. The method of claim 37, wherein the downlink frequency resource allocation and the uplink frequency resource allocation for the set of symbols having the full-duplex format comprises a guard band between frequency resources for uplink communications and frequency resources for downlink communications or an overlap between frequency resources for uplink communications and frequency resources for downlink communications.

49. An apparatus for wireless communication at a user equipment (UE), comprising:

a processor;

memory coupled with the processor; and instructions stored in the memory and executable by the processor to cause the apparatus to:

communicate with a network entity using an operating bandwidth part that comprises a first set of frequency resources of a carrier bandwidth;

receive group-common downlink control information that comprises a resource format indicator indicating a second set of frequency resources;

modify the operating bandwidth part based at least in part on the group-common downlink control information, wherein, to modify the operating bandwidth part, the instructions are executable by the processor to cause the apparatus to reduce the operating bandwidth part to a subset of the first set of frequency resources that overlap with the second set of frequency resources; and communicate with the network entity using the modified operating bandwidth part.

50. An apparatus for wireless communication at a user equipment (UE), comprising:

a processor;

memory coupled with the processor; and instructions stored in the memory and executable by the processor to cause the apparatus to:

receive group-common downlink control information comprising a resource format indicator associated with a time period;

determine that a set of symbols within the time period has a full-duplex format based at least in part on the resource format indicator and a configuration for interpreting resource format indicators;

determine a downlink frequency resource allocation and an uplink frequency resource allocation for the set of symbols having the full-duplex format based at least in part on the group-common downlink control information and the configuration; and communicate with a network entity using the uplink frequency resource allocation and the downlink frequency resource allocation during the set of symbols.

* * * * *